United States Patent
Donovan et al.

(10) Patent No.: US 12,433,668 B1
(45) Date of Patent: Oct. 7, 2025

(54) IMPEDANCE STOPPAGE MITIGATION DURING RADIOFREQUENCY TISSUE ABLATION PROCEDURES

(71) Applicant: Relievant Medsystems, Inc., Edina, MN (US)

(72) Inventors: Brian W. Donovan, San Jose, CA (US); Alexander Pruitt, San Jose, CA (US)

(73) Assignee: Relievant Medsystems, Inc., Edina, MN (US)

( * ) Notice: Subject to any disclaimer, the term of this patent is extended or adjusted under 35 U.S.C. 154(b) by 526 days.

(21) Appl. No.: 18/053,284

(22) Filed: Nov. 7, 2022

Related U.S. Application Data

(60) Provisional application No. 63/277,100, filed on Nov. 8, 2021.

(51) Int. Cl.
*A61B 18/14* (2006.01)
*A61B 18/12* (2006.01)
*A61B 18/00* (2006.01)

(52) U.S. Cl.
CPC .. *A61B 18/148* (2013.01); *A61B 2018/00434* (2013.01); *A61B 2018/00577* (2013.01); *A61B 2018/00702* (2013.01); *A61B 2018/00714* (2013.01); *A61B 2018/00732* (2013.01); *A61B 2018/00755* (2013.01); *A61B 2018/00761* (2013.01); *A61B 2018/00791* (2013.01); *A61B 2018/126* (2013.01)

(58) Field of Classification Search
CPC ........... A61B 2018/00434; A61B 2018/00577; A61B 2018/00702; A61B 2018/00714; A61B 2018/00732; A61B 2018/00755; A61B 2018/00761; A61B 2018/00791; A61B 2018/126; A91B 18/148
See application file for complete search history.

(56) References Cited

U.S. PATENT DOCUMENTS

| | | |
|---|---|---|
| 3,054,881 A | 9/1962 | Metz et al. |
| 3,062,876 A | 11/1962 | Pons, Jr. et al. |
| 3,565,062 A | 2/1971 | Kuris |
| 3,822,708 A | 7/1974 | Zilber |

(Continued)

FOREIGN PATENT DOCUMENTS

| | | |
|---|---|---|
| AU | 2001033279 | 2/2001 |
| AU | 2003248436 | 9/2003 |

(Continued)

OTHER PUBLICATIONS

U.S. Appl. No. 09/775,137 U.S. Pat. No. 6,699,242, filed Feb. 1, 2001, Methods and Devices for Intraosseous Nerve Ablation.

(Continued)

*Primary Examiner* — Michael F Peffley
*Assistant Examiner* — Samantha M Good
(74) *Attorney, Agent, or Firm* — Nelson Mullins Riley & Scarborough LLP

(57) ABSTRACT

Systems and methods for preventing, mitigating, or reducing the occurrence of impedance-related stoppages during radiofrequency procedures, such as intraosseous nerve or basivertebral nerve ablation procedures for treatment or prevention of back pain or other tissue ablation, stimulation, or other modulation or modification procedures are described.

20 Claims, 6 Drawing Sheets

(56) References Cited

U.S. PATENT DOCUMENTS

| | | |
|---|---|---|
| 3,845,771 A | 11/1974 | Vise |
| 3,920,021 A | 11/1975 | Hiltebrandt |
| 3,938,502 A | 2/1976 | Born |
| 3,997,408 A | 12/1976 | Barba et al. |
| 4,044,774 A | 8/1977 | Corgin et al. |
| 4,116,198 A | 9/1978 | Roos |
| 4,311,154 A | 1/1982 | Sterzer et al. |
| 4,312,364 A | 1/1982 | Convert et al. |
| 4,378,806 A | 4/1983 | Henley-Cohn |
| 4,448,198 A | 5/1984 | Turner |
| 4,449,528 A | 5/1984 | Auth et al. |
| 4,462,408 A | 7/1984 | Silverstein et al. |
| 4,528,979 A | 7/1985 | Marchenko et al. |
| 4,530,360 A | 7/1985 | Durate |
| 4,541,423 A | 9/1985 | Barber |
| 4,569,351 A | 2/1986 | Tang |
| 4,573,448 A | 3/1986 | Kambin |
| 4,586,512 A | 5/1986 | Do-huu |
| 4,601,296 A | 7/1986 | Yerushalmi |
| 4,612,940 A | 9/1986 | Kasevich et al. |
| 4,657,017 A | 4/1987 | Sorochenko |
| 4,662,383 A | 5/1987 | Sogawa et al. |
| 4,671,293 A | 6/1987 | Shalov |
| 4,676,258 A | 6/1987 | Inokuchi et al. |
| 4,679,561 A | 7/1987 | Doss |
| 4,681,122 A | 7/1987 | Winters et al. |
| 4,750,499 A | 6/1988 | Hoffer |
| 4,754,757 A | 7/1988 | Feucht |
| 4,757,820 A | 7/1988 | Itoh |
| 4,774,967 A | 10/1988 | Zanakis et al. |
| 4,800,899 A | 1/1989 | Elliott |
| 4,813,429 A | 3/1989 | Eshel et al. |
| 4,841,977 A | 6/1989 | Griffith et al. |
| 4,907,589 A | 3/1990 | Cosman |
| 4,924,863 A | 5/1990 | Sterzer |
| 4,936,281 A | 6/1990 | Stasz |
| 4,941,466 A | 7/1990 | Romano |
| 4,950,267 A | 8/1990 | Ishihara et al. |
| 4,951,677 A | 8/1990 | Crowley et al. |
| 4,955,377 A | 9/1990 | Lennox et al. |
| 4,959,063 A | 9/1990 | Kojima |
| 4,961,435 A | 10/1990 | Kitagawa et al. |
| 4,963,142 A | 10/1990 | Loertscher |
| 4,966,144 A | 10/1990 | Rochkind et al. |
| 4,967,765 A | 11/1990 | Turner et al. |
| 4,976,711 A | 12/1990 | Parins et al. |
| 4,977,902 A | 12/1990 | Sekino et al. |
| 5,000,185 A | 3/1991 | Yock |
| 5,002,058 A | 3/1991 | Marinelli |
| 5,002,059 A | 3/1991 | Crowley et al. |
| 5,007,437 A | 4/1991 | Sterzer |
| 5,025,778 A | 6/1991 | Silverstein et al. |
| 5,031,618 A | 7/1991 | Mullett |
| 5,061,266 A | 10/1991 | Hakky |
| 5,070,879 A | 12/1991 | Herres |
| RE33,791 E | 1/1992 | Carr |
| 5,078,736 A | 1/1992 | Behl |
| 5,080,660 A | 1/1992 | Buelna |
| 5,084,043 A | 1/1992 | Hertzmann et al. |
| 5,090,414 A | 2/1992 | Takano |
| 5,098,431 A | 3/1992 | Rydell |
| 5,106,376 A | 4/1992 | Mononen et al. |
| 5,108,404 A | 4/1992 | Scholten et al. |
| 5,131,397 A | 7/1992 | Crowley et al. |
| 5,147,355 A | 9/1992 | Friedman et al. |
| 5,156,157 A | 10/1992 | Valenta, Jr. et al. |
| 5,158,536 A | 10/1992 | Sekins et al. |
| 5,161,533 A | 11/1992 | Prass et al. |
| 5,167,231 A | 12/1992 | Matsui |
| 5,186,177 A | 2/1993 | O'Donnell et al. |
| 5,190,540 A | 3/1993 | Lee |
| 5,190,546 A | 3/1993 | Jervis |
| 5,201,729 A | 4/1993 | Hertzmann et al. |
| 5,207,672 A | 5/1993 | Martinelli et al. |
| 5,209,748 A | 5/1993 | Daikuzono |
| 5,222,953 A | 6/1993 | Dowlatshahi |
| 5,226,430 A | 7/1993 | Spear et al. |
| 5,242,439 A | 9/1993 | Larsen et al. |
| 5,255,679 A | 10/1993 | Imran |
| 5,271,408 A | 12/1993 | Breyer et al. |
| 5,273,026 A | 12/1993 | Wilk |
| 5,281,213 A | 1/1994 | Milder et al. |
| 5,281,215 A | 1/1994 | Milder et al. |
| 5,282,468 A | 2/1994 | Klepinski |
| 5,292,321 A | 3/1994 | Lee |
| 5,295,484 A | 3/1994 | Marcus et al. |
| 5,300,085 A | 4/1994 | Yock |
| 5,304,214 A | 4/1994 | DeFord et al. |
| 5,305,756 A | 4/1994 | Entrekin et al. |
| 5,314,463 A | 5/1994 | Camps et al. |
| 5,320,617 A | 6/1994 | Leach |
| 5,324,255 A | 6/1994 | Pasafaro et al. |
| 5,325,860 A | 7/1994 | Seward et al. |
| 5,342,292 A | 8/1994 | Nita et al. |
| 5,342,357 A | 8/1994 | Nardella |
| 5,342,409 A | 8/1994 | Mullett |
| 5,344,435 A | 9/1994 | Turner et al. |
| 5,345,940 A | 9/1994 | Seward et al. |
| 5,348,554 A | 9/1994 | Imran et al. |
| 5,350,377 A | 9/1994 | Winston et al. |
| 5,351,691 A | 10/1994 | Brommersma |
| 5,366,443 A | 11/1994 | Eggers et al. |
| 5,366,490 A | 11/1994 | Edwards et al. |
| 5,368,031 A | 11/1994 | Cline et al. |
| 5,368,035 A | 11/1994 | Hamm et al. |
| 5,368,557 A | 11/1994 | Nita et al. |
| 5,368,558 A | 11/1994 | Nita |
| 5,370,675 A | 12/1994 | Edwards et al. |
| 5,370,678 A | 12/1994 | Edwards et al. |
| 5,372,138 A | 12/1994 | Crowley et al. |
| 5,374,265 A | 12/1994 | Sand |
| 5,383,876 A | 1/1995 | Nardella |
| 5,385,148 A | 1/1995 | Lesh et al. |
| 5,385,544 A | 1/1995 | Edwards et al. |
| 5,391,197 A | 2/1995 | Burdette et al. |
| 5,391,199 A | 2/1995 | Ben-Haim |
| 5,405,376 A | 4/1995 | Mulier et al. |
| 5,411,527 A | 5/1995 | Alt |
| 5,417,719 A | 5/1995 | Hull et al. |
| 5,419,767 A | 5/1995 | Eggers et al. |
| 5,421,338 A | 6/1995 | Crowley |
| 5,423,811 A | 6/1995 | Imran et al. |
| 5,431,649 A | 7/1995 | Mulier et al. |
| 5,433,739 A | 7/1995 | Sluijter et al. |
| D361,555 S | 8/1995 | Bettin et al. |
| 5,437,661 A | 8/1995 | Rieser |
| 5,441,499 A | 8/1995 | Fritzsch |
| 5,441,527 A | 8/1995 | Erickson et al. |
| 5,443,463 A | 8/1995 | Stern et al. |
| 5,447,509 A | 9/1995 | Millis et al. |
| 5,449,380 A | 9/1995 | Chin |
| 5,454,373 A | 10/1995 | Koger et al. |
| 5,458,596 A | 10/1995 | Lax et al. |
| 5,458,597 A | 10/1995 | Edwards et al. |
| 5,471,988 A | 12/1995 | Fujio et al. |
| 5,472,441 A | 12/1995 | Edwards et al. |
| 5,474,530 A | 12/1995 | Passafaro et al. |
| 5,484,432 A | 1/1996 | Sand |
| 5,486,170 A | 1/1996 | Winston et al. |
| 5,501,703 A | 3/1996 | Holsheimer et al. |
| 5,505,730 A | 4/1996 | Edwarrds |
| 5,514,130 A | 5/1996 | Baker |
| 5,524,624 A | 6/1996 | Tepper et al. |
| 5,526,815 A | 6/1996 | Granz et al. |
| 5,529,580 A | 6/1996 | Hagino et al. |
| 5,540,679 A | 7/1996 | Fram et al. |
| 5,540,681 A | 7/1996 | Strul et al. |
| 5,540,684 A | 7/1996 | Hassler, Jr. |
| 5,545,161 A | 8/1996 | Imran |
| 5,560,362 A | 10/1996 | Silwa, Jr. et al. |
| 5,565,005 A | 10/1996 | Erickson et al. |
| 5,569,242 A | 10/1996 | Lax et al. |
| 5,571,088 A | 11/1996 | Lennox et al. |
| 5,571,147 A | 11/1996 | Sluijter et al. |

(56) References Cited

U.S. PATENT DOCUMENTS

| | | |
|---|---|---|
| 5,575,772 A | 11/1996 | Lennox |
| 5,575,788 A | 11/1996 | Baker et al. |
| 5,588,432 A | 12/1996 | Crowley |
| 5,596,988 A | 1/1997 | Markle et al. |
| 5,601,526 A | 2/1997 | Chapelon et al. |
| 5,606,974 A | 3/1997 | Castellano et al. |
| 5,609,151 A | 3/1997 | Mulier et al. |
| 5,620,479 A | 4/1997 | Diederich |
| 5,628,317 A | 5/1997 | Starkebaum et al. |
| 5,630,426 A | 5/1997 | Shmulewitz et al. |
| 5,630,837 A | 5/1997 | Crowley |
| 5,643,319 A | 7/1997 | Green et al. |
| 5,643,330 A | 7/1997 | Holshiemer et al. |
| 5,647,361 A | 7/1997 | Damadian |
| 5,647,871 A | 7/1997 | Levine et al. |
| 5,658,278 A | 8/1997 | Imran et al. |
| 5,672,173 A | 9/1997 | Gough et al. |
| 5,681,282 A | 10/1997 | Eggers et al. |
| 5,683,366 A | 11/1997 | Eggers et al. |
| 5,685,839 A | 11/1997 | Baker et al. |
| 5,687,729 A | 11/1997 | Schaetzle |
| 5,688,267 A | 11/1997 | Panescu |
| 5,693,052 A | 12/1997 | Weaver |
| 5,697,281 A | 12/1997 | Eggers et al. |
| 5,697,536 A | 12/1997 | Eggers et al. |
| 5,697,882 A | 12/1997 | Eggers et al. |
| 5,697,909 A | 12/1997 | Eggers et al. |
| 5,697,927 A | 12/1997 | Imran et al. |
| 5,700,262 A | 12/1997 | Acosta et al. |
| 5,718,231 A | 2/1998 | Chen et al. |
| 5,720,286 A | 2/1998 | Chapelon et al. |
| 5,720,287 A | 2/1998 | Chapelon et al. |
| 5,722,403 A | 3/1998 | McGee et al. |
| 5,725,494 A | 3/1998 | Brisken |
| 5,728,062 A | 3/1998 | Brisken |
| 5,730,706 A | 3/1998 | Garnies |
| 5,733,315 A | 3/1998 | Burdette et al. |
| 5,735,280 A | 4/1998 | Sherman et al. |
| 5,735,811 A | 4/1998 | Brisken |
| 5,735,846 A | 4/1998 | Fleischman et al. |
| 5,735,847 A | 4/1998 | Gough et al. |
| 5,738,680 A | 4/1998 | Mueller et al. |
| 5,741,249 A | 4/1998 | Moss et al. |
| 5,743,904 A | 4/1998 | Edwards |
| 5,746,737 A | 5/1998 | Saadat |
| 5,752,969 A | 5/1998 | Cunci et al. |
| 5,755,663 A | 5/1998 | Johnson et al. |
| 5,762,066 A | 6/1998 | Law et al. |
| 5,762,616 A | 6/1998 | Talish |
| 5,766,153 A | 6/1998 | Eggers et al. |
| 5,766,231 A | 6/1998 | Erickson et al. |
| 5,776,092 A | 7/1998 | Farin et al. |
| 5,785,705 A | 7/1998 | Baker |
| 5,800,378 A | 9/1998 | Edwards et al. |
| 5,800,429 A | 9/1998 | Edwards |
| 5,800,432 A | 9/1998 | Swanson |
| 5,807,237 A | 9/1998 | Tindel |
| 5,807,391 A | 9/1998 | Wijkamp |
| 5,807,392 A | 9/1998 | Eggers |
| 5,807,395 A | 9/1998 | Mulier et al. |
| 5,810,764 A | 9/1998 | Eggers et al. |
| 5,817,021 A | 10/1998 | Reichenberger |
| 5,824,021 A | 10/1998 | Rise |
| 5,840,031 A | 11/1998 | Crowley |
| 5,843,019 A | 12/1998 | Eggers et al. |
| 5,843,021 A | 12/1998 | Edwards et al. |
| 5,844,092 A | 12/1998 | Presta et al. |
| 5,846,218 A | 12/1998 | Brisken et al. |
| 5,849,011 A | 12/1998 | Jones et al. |
| 5,855,576 A | 1/1999 | LeVeen et al. |
| 5,860,951 A | 1/1999 | Eggers et al. |
| 5,865,788 A | 2/1999 | Edwards et al. |
| 5,865,801 A | 2/1999 | Houser |
| 5,868,740 A | 2/1999 | LeVeen et al. |
| 5,871,469 A | 2/1999 | Eggers et al. |
| 5,871,470 A | 2/1999 | McWha |
| 5,871,481 A | 2/1999 | Kannenberg et al. |
| 5,873,855 A | 2/1999 | Eggers et al. |
| 5,873,877 A | 2/1999 | McGaffigan et al. |
| 5,876,398 A | 3/1999 | Mulier et al. |
| 5,888,198 A | 3/1999 | Eggers et al. |
| 5,891,095 A | 4/1999 | Eggers et al. |
| 5,895,370 A | 4/1999 | Edwards et al. |
| 5,902,272 A | 5/1999 | Eggers et al. |
| 5,902,308 A | 5/1999 | Murphy |
| 5,904,681 A | 5/1999 | West, Jr. |
| 5,906,613 A | 5/1999 | Mulier et al. |
| 5,916,213 A | 6/1999 | Haissaguerre et al. |
| 5,916,214 A | 6/1999 | Cosio |
| 5,919,188 A | 7/1999 | Shearon et al. |
| 5,931,805 A | 8/1999 | Brisken |
| 5,935,123 A | 8/1999 | Edwards et al. |
| 5,938,582 A | 8/1999 | Ciamacco et al. |
| 5,941,722 A | 8/1999 | Chen |
| 5,941,876 A | 8/1999 | Nardella et al. |
| 5,944,715 A | 8/1999 | Goble et al. |
| 5,948,007 A | 9/1999 | Starkebaum et al. |
| 5,948,008 A | 9/1999 | Daikuzono |
| 5,954,716 A | 9/1999 | Sharkey et al. |
| 5,964,727 A | 10/1999 | Edwards et al. |
| 5,967,988 A | 10/1999 | Briscoe et al. |
| 5,972,015 A | 10/1999 | Scribner et al. |
| 5,976,105 A | 11/1999 | Marcove et al. |
| 5,983,141 A | 11/1999 | Sluijter et al. |
| 5,997,497 A | 12/1999 | Nita et al. |
| 6,001,095 A | 12/1999 | de la Rama et al. |
| 6,007,533 A | 12/1999 | Casscells et al. |
| 6,007,570 A | 12/1999 | Sharkey et al. |
| 6,012,457 A | 1/2000 | Lesh |
| 6,014,588 A | 1/2000 | Fitz |
| 6,016,452 A | 1/2000 | Kasevich |
| 6,016,809 A | 1/2000 | Mulier et al. |
| 6,017,356 A | 1/2000 | Frederick et al. |
| 6,019,776 A | 2/2000 | Preissman et al. |
| 6,022,334 A | 2/2000 | Edwards et al. |
| 6,024,733 A | 2/2000 | Eggers et al. |
| 6,024,740 A | 2/2000 | Lesh et al. |
| 6,030,374 A | 2/2000 | McDaniel |
| 6,030,402 A | 2/2000 | Thompson et al. |
| 6,032,673 A | 3/2000 | Langberg et al. |
| 6,032,674 A | 3/2000 | Eggers et al. |
| 6,033,411 A | 3/2000 | Preissman et al. |
| 6,035,238 A | 3/2000 | Ingle et al. |
| 6,038,480 A | 3/2000 | Hrdlicka et al. |
| 6,045,532 A | 4/2000 | Eggers et al. |
| 6,046,187 A | 4/2000 | Berde et al. |
| 6,047,214 A | 4/2000 | Mueller et al. |
| 6,050,995 A | 4/2000 | Durgin |
| 6,053,172 A | 4/2000 | Hovda et al. |
| 6,053,909 A | 4/2000 | Shadduck et al. |
| 6,056,745 A | 5/2000 | Panescu et al. |
| 6,063,078 A | 5/2000 | Wittkampf |
| 6,063,079 A | 5/2000 | Hovda et al. |
| 6,066,134 A | 5/2000 | Eggers et al. |
| 6,066,139 A | 5/2000 | Ryan et al. |
| 6,068,642 A | 5/2000 | Johnson et al. |
| 6,071,279 A | 6/2000 | Whayne et al. |
| 6,073,051 A | 6/2000 | Sharkey et al. |
| 6,074,352 A | 6/2000 | Hynynen et al. |
| 6,086,585 A | 7/2000 | Hovda et al. |
| 6,090,105 A | 7/2000 | Zepeda et al. |
| 6,095,149 A | 8/2000 | Sharkey et al. |
| 6,099,499 A | 8/2000 | Ciamacco |
| 6,099,514 A | 8/2000 | Sharkey et al. |
| 6,099,524 A | 8/2000 | Lipson et al. |
| 6,102,046 A | 8/2000 | Weinstein et al. |
| 6,104,957 A | 8/2000 | Alo et al. |
| 6,105,581 A | 8/2000 | Eggers et al. |
| 6,106,454 A | 8/2000 | Berg et al. |
| 6,109,268 A | 8/2000 | Thapliyal et al. |
| 6,112,122 A | 8/2000 | Schwardt et al. |
| 6,113,597 A | 9/2000 | Eggers et al. |
| 6,117,101 A | 9/2000 | Diederich et al. |
| 6,117,109 A | 9/2000 | Eggers et al. |

(56) References Cited

U.S. PATENT DOCUMENTS

| | | |
|---|---|---|
| 6,117,128 A | 9/2000 | Gregory |
| 6,120,467 A | 9/2000 | Schallhorn |
| 6,120,502 A | 9/2000 | Michelson |
| 6,122,549 A | 9/2000 | Sharkey et al. |
| 6,126,682 A | 10/2000 | Ashley et al. |
| 6,137,209 A | 10/2000 | Dahlberg et al. |
| 6,139,545 A | 10/2000 | Utley et al. |
| 6,142,992 A | 11/2000 | Cheng et al. |
| 6,143,019 A | 11/2000 | Motamedi et al. |
| 6,146,380 A | 11/2000 | Racz et al. |
| 6,149,620 A | 11/2000 | Baker et al. |
| 6,159,194 A | 12/2000 | Eggers et al. |
| 6,159,208 A | 12/2000 | Hovda et al. |
| 6,161,048 A | 12/2000 | Sluijter et al. |
| 6,164,283 A | 12/2000 | Lesh |
| 6,165,172 A | 12/2000 | Farley et al. |
| 6,168,593 B1 | 1/2001 | Sharkey et al. |
| 6,169,924 B1 | 1/2001 | Meloy et al. |
| 6,171,239 B1 | 1/2001 | Humphrey |
| 6,176,857 B1 | 1/2001 | Ashley |
| 6,179,824 B1 | 1/2001 | Eggers et al. |
| 6,179,836 B1 | 1/2001 | Eggers et al. |
| 6,179,858 B1 | 1/2001 | Squire et al. |
| 6,183,469 B1 | 2/2001 | Thapliyal et al. |
| 6,190,381 B1 | 2/2001 | Olsen et al. |
| 6,190,383 B1 | 2/2001 | Schmaltz et al. |
| 6,193,715 B1 | 2/2001 | Wrublewski et al. |
| 6,203,542 B1 | 3/2001 | Ellsberry et al. |
| 6,206,842 B1 | 3/2001 | Tu et al. |
| 6,210,393 B1 | 4/2001 | Brisken |
| 6,210,402 B1 | 4/2001 | Olsen et al. |
| 6,210,415 B1 | 4/2001 | Bester |
| 6,216,704 B1 | 4/2001 | Ingle et al. |
| 6,221,038 B1 | 4/2001 | Brisken |
| 6,224,592 B1 | 5/2001 | Eggers et al. |
| 6,228,046 B1 | 5/2001 | Brisken |
| 6,228,078 B1 | 5/2001 | Eggers et al. |
| 6,228,082 B1 | 5/2001 | Baker et al. |
| 6,231,516 B1 | 5/2001 | Keilman et al. |
| 6,231,528 B1 | 5/2001 | Kaufman et al. |
| 6,231,571 B1 | 5/2001 | Ellman et al. |
| 6,231,615 B1 | 5/2001 | Preissman |
| 6,233,488 B1 | 5/2001 | Hess |
| 6,235,020 B1 | 5/2001 | Cheng et al. |
| 6,235,022 B1 | 5/2001 | Hallock et al. |
| 6,235,024 B1 | 5/2001 | Tu |
| 6,237,604 B1 | 5/2001 | Burnside et al. |
| 6,238,391 B1 | 5/2001 | Olsen et al. |
| 6,238,393 B1 | 5/2001 | Mulier et al. |
| 6,241,665 B1 | 6/2001 | Negus et al. |
| 6,241,725 B1 | 6/2001 | Cosman |
| 6,241,734 B1 | 6/2001 | Scribner et al. |
| 6,245,064 B1 | 6/2001 | Lesh et al. |
| 6,246,912 B1 | 6/2001 | Sluijter et al. |
| 6,248,110 B1 | 6/2001 | Reiley et al. |
| 6,248,345 B1 | 6/2001 | Goldenheim et al. |
| 6,254,553 B1 | 7/2001 | Lidgren et al. |
| 6,254,599 B1 | 7/2001 | Lesh et al. |
| 6,254,600 B1 | 7/2001 | Willink et al. |
| 6,258,086 B1 | 7/2001 | Ashley et al. |
| 6,259,952 B1 | 7/2001 | Sluijter |
| 6,261,311 B1 | 7/2001 | Sharkey et al. |
| 6,264,650 B1 | 7/2001 | Hovda et al. |
| 6,264,651 B1 | 7/2001 | Underwood et al. |
| 6,264,652 B1 | 7/2001 | Eggers et al. |
| 6,264,659 B1 | 7/2001 | Ross et al. |
| 6,267,770 B1 | 7/2001 | Truwit |
| 6,270,498 B1 | 8/2001 | Michelson |
| 6,277,112 B1 | 8/2001 | Underwood et al. |
| 6,277,122 B1 | 8/2001 | McGahan et al. |
| 6,280,441 B1 | 8/2001 | Ryan |
| 6,280,456 B1 | 8/2001 | Scribner et al. |
| 6,283,961 B1 | 9/2001 | Underwood et al. |
| 6,287,114 B1 | 9/2001 | Meller et al. |
| 6,287,272 B1 | 9/2001 | Brisken et al. |
| 6,287,304 B1 | 9/2001 | Eggers et al. |
| 6,290,715 B1 | 9/2001 | Sharkey et al. |
| 6,292,699 B1 | 9/2001 | Simon et al. |
| 6,296,619 B1 | 10/2001 | Brisken et al. |
| 6,296,636 B1 | 10/2001 | Cheng et al. |
| 6,296,638 B1 | 10/2001 | Davison et al. |
| 6,305,378 B1 | 10/2001 | Lesh et al. |
| 6,309,387 B1 | 10/2001 | Eggers et al. |
| 6,309,420 B1 | 10/2001 | Preissman |
| 6,312,408 B1 | 11/2001 | Eggers et al. |
| 6,312,425 B1 | 11/2001 | Simpson et al. |
| 6,312,426 B1 | 11/2001 | Goldberg et al. |
| 6,319,241 B1 | 11/2001 | King et al. |
| 6,322,549 B1 | 11/2001 | Eggers et al. |
| 6,348,055 B1 | 2/2002 | Preissman |
| 6,355,032 B1 | 3/2002 | Hovda et al. |
| 6,356,790 B1 | 3/2002 | Maguire et al. |
| 6,361,531 B1 | 3/2002 | Hissong |
| 6,363,937 B1 | 4/2002 | Hovda et al. |
| 6,368,292 B1 | 4/2002 | Ogden et al. |
| 6,379,351 B1 | 4/2002 | Thapliyal et al. |
| 6,383,190 B1 | 5/2002 | Preissman |
| 6,391,025 B1 | 5/2002 | Weinstein et al. |
| 6,398,782 B1 | 6/2002 | Pecor et al. |
| 6,416,507 B1 | 7/2002 | Eggers et al. |
| 6,416,508 B1 | 7/2002 | Eggers et al. |
| 6,423,057 B1 | 7/2002 | He et al. |
| 6,423,059 B1 | 7/2002 | Hanson et al. |
| 6,425,887 B1 | 7/2002 | McGuckin et al. |
| 6,426,339 B1 | 7/2002 | Berde et al. |
| 6,428,491 B1 | 8/2002 | Weiss |
| 6,432,103 B1 | 8/2002 | Ellsberry et al. |
| 6,436,060 B1 | 8/2002 | Talish |
| 6,436,098 B1 | 8/2002 | Michelson |
| 6,440,138 B1 | 8/2002 | Reiley et al. |
| 6,447,448 B1 | 9/2002 | Ishikawa et al. |
| 6,451,013 B1 | 9/2002 | Bays et al. |
| 6,454,727 B1 | 9/2002 | Burbank et al. |
| 6,461,350 B1 | 10/2002 | Underwood et al. |
| 6,461,354 B1 | 10/2002 | Olsen et al. |
| 6,464,695 B2 | 10/2002 | Hovda et al. |
| 6,468,270 B1 | 10/2002 | Hovda et al. |
| 6,468,274 B1 | 10/2002 | Alleyne et al. |
| 6,470,220 B1 | 10/2002 | Kraus et al. |
| 6,478,793 B1 | 11/2002 | Cosman et al. |
| 6,482,201 B1 | 11/2002 | Olsen et al. |
| 6,485,271 B1 | 11/2002 | Tack |
| 6,487,446 B1 | 11/2002 | Hill et al. |
| 6,491,893 B1 | 12/2002 | Babich |
| 6,493,592 B1 | 12/2002 | Leonard et al. |
| 6,494,902 B2 | 12/2002 | Hoey et al. |
| 6,500,173 B2 | 12/2002 | Underwood et al. |
| 6,505,075 B1 | 1/2003 | Weiner |
| 6,508,839 B1 | 1/2003 | Lambrecht et al. |
| 6,524,261 B2 | 2/2003 | Talish et al. |
| 6,527,759 B1 | 3/2003 | Tachibana et al. |
| 6,537,306 B1 | 3/2003 | Burdette et al. |
| 6,540,741 B1 | 4/2003 | Underwood et al. |
| 6,544,261 B2 | 4/2003 | Ellsberry et al. |
| 6,557,559 B1 | 5/2003 | Eggers et al. |
| 6,558,385 B1 | 5/2003 | McClurken et al. |
| 6,558,390 B2 | 5/2003 | Cragg |
| 6,560,486 B1 | 5/2003 | Osorio et al. |
| 6,562,033 B2 | 5/2003 | Shah et al. |
| 6,575,919 B1 | 6/2003 | Reiley et al. |
| 6,575,968 B1 | 6/2003 | Eggers et al. |
| 6,575,969 B1 | 6/2003 | Rittman, III et al. |
| 6,575,979 B1 | 6/2003 | Cragg |
| 6,578,579 B2 | 6/2003 | Burnside et al. |
| 6,582,423 B1 | 6/2003 | Thapliyal et al. |
| 6,585,656 B2 | 7/2003 | Masters |
| 6,589,237 B2 | 7/2003 | Woloszko et al. |
| 6,592,559 B1 | 7/2003 | Pakter et al. |
| 6,595,990 B1 | 7/2003 | Weinstein et al. |
| 6,599,288 B2 | 7/2003 | Maguire et al. |
| 6,602,248 B1 | 8/2003 | Sharps et al. |
| 6,604,003 B2 | 8/2003 | Fredricks et al. |
| 6,607,502 B1 | 8/2003 | Maguire et al. |
| 6,607,529 B1 | 8/2003 | Jones et al. |

(56) References Cited

U.S. PATENT DOCUMENTS

| | | |
|---|---|---|
| 6,608,502 B2 | 8/2003 | Aoki et al. |
| 6,622,731 B2 | 9/2003 | Daniel et al. |
| 6,623,505 B2 | 9/2003 | Scribner et al. |
| 6,632,193 B1 | 10/2003 | Davison et al. |
| 6,632,220 B1 | 10/2003 | Eggers et al. |
| 6,645,202 B1 | 11/2003 | Pless et al. |
| 6,648,883 B2 | 11/2003 | Francischelli et al. |
| 6,651,669 B1 | 11/2003 | Burnside |
| 6,659,106 B1 | 12/2003 | Hovda et al. |
| 6,663,627 B2 | 12/2003 | Francischelli et al. |
| 6,663,647 B2 | 12/2003 | Reiley et al. |
| 6,673,063 B2 | 1/2004 | Brett |
| 6,689,086 B1 | 2/2004 | Nita et al. |
| 6,689,125 B1 | 2/2004 | Keith et al. |
| 6,692,450 B1 | 2/2004 | Coleman |
| 6,699,240 B2 | 3/2004 | Francischelli |
| 6,699,242 B2 | 3/2004 | Heggeness |
| 6,709,432 B2 | 3/2004 | Ferek-Patric |
| 6,718,208 B2 | 4/2004 | Hill et al. |
| 6,719,761 B1 | 4/2004 | Reiley et al. |
| 6,723,087 B2 | 4/2004 | O'Neill et al. |
| 6,723,094 B1 | 4/2004 | Desinger |
| 6,726,684 B1 | 4/2004 | Woloszko et al. |
| 6,736,810 B2 | 5/2004 | Hoey et al. |
| 6,736,835 B2 | 5/2004 | Pelegrino et al. |
| 6,745,079 B2 | 6/2004 | King |
| 6,746,447 B2 | 6/2004 | Davison et al. |
| 6,746,451 B2 | 6/2004 | Middleton et al. |
| 6,749,604 B1 | 6/2004 | Eggers et al. |
| 6,758,846 B2 | 7/2004 | Goble et al. |
| 6,770,071 B2 | 8/2004 | Woloszko et al. |
| 6,772,012 B2 | 8/2004 | Ricart et al. |
| 6,773,431 B2 | 8/2004 | Eggers et al. |
| 6,795,737 B2 | 9/2004 | Gielen et al. |
| 6,805,697 B1 | 10/2004 | Helm et al. |
| 6,827,715 B2 | 12/2004 | Francischelli et al. |
| 6,827,716 B2 | 12/2004 | Ryan et al. |
| 6,832,996 B2 | 12/2004 | Woloszko et al. |
| 6,837,887 B2 | 1/2005 | Woloszko et al. |
| 6,837,888 B2 | 1/2005 | Ciarrocca et al. |
| 6,852,091 B2 | 2/2005 | Edwards et al. |
| 6,863,672 B2 | 3/2005 | Reiley et al. |
| 6,875,219 B2 | 4/2005 | Arramon et al. |
| 6,881,214 B2 | 4/2005 | Cosman et al. |
| 6,896,674 B1 | 5/2005 | Woloszko et al. |
| 6,896,675 B2 | 5/2005 | Leung et al. |
| 6,907,884 B2 | 6/2005 | Pellegrino et al. |
| 6,915,806 B2 | 7/2005 | Pacek et al. |
| 6,922,579 B2 | 7/2005 | Taimisto et al. |
| 6,923,813 B2 | 8/2005 | Phillips et al. |
| 6,936,046 B2 | 8/2005 | Hissong et al. |
| 6,955,674 B2 | 10/2005 | Eick et al. |
| 6,960,204 B2 | 11/2005 | Eggers et al. |
| 6,962,589 B2 | 11/2005 | Mulier et al. |
| 6,974,453 B2 | 12/2005 | Woloszko et al. |
| 6,980,849 B2 | 12/2005 | Sasso |
| 6,981,981 B2 | 1/2006 | Reiley et al. |
| 6,989,010 B2 | 1/2006 | Francischelli et al. |
| 6,997,941 B2 | 2/2006 | Sharkey et al. |
| 7,001,383 B2 | 2/2006 | Keidar |
| 7,041,096 B2 | 5/2006 | Malis et al. |
| 7,044,954 B2 | 5/2006 | Reiley et al. |
| 7,048,743 B2 | 5/2006 | Miller et al. |
| 7,065,408 B2 | 6/2006 | Herman et al. |
| 7,081,122 B1 | 7/2006 | Reiley et al. |
| 7,090,672 B2 | 8/2006 | Underwood et al. |
| 7,094,215 B2 | 8/2006 | Davison et al. |
| 7,104,989 B2 | 9/2006 | Skarda |
| 7,118,574 B2 | 10/2006 | Patel et al. |
| 7,131,969 B1 | 11/2006 | Hovda et al. |
| 7,153,307 B2 | 12/2006 | Scribner et al. |
| 7,163,536 B2 | 1/2007 | Godara |
| 7,177,678 B1 | 2/2007 | Osorio et al. |
| 7,179,255 B2 | 2/2007 | Lettice et al. |
| 7,186,234 B2 | 3/2007 | Dahla et al. |
| 7,192,428 B2 | 3/2007 | Eggers et al. |
| 7,201,731 B1 | 4/2007 | Lundquist et al. |
| 7,201,750 B1 | 4/2007 | Eggers et al. |
| 7,211,055 B2 | 5/2007 | Diederich et al. |
| 7,217,268 B2 | 5/2007 | Eggers et al. |
| 7,238,184 B2 | 7/2007 | Megerman et al. |
| 7,241,297 B2 | 7/2007 | Shaolian et al. |
| 7,250,048 B2 | 7/2007 | Francischelli et al. |
| 7,258,690 B2 | 8/2007 | Sutton et al. |
| 7,270,659 B2 | 9/2007 | Ricart et al. |
| 7,270,661 B2 | 9/2007 | Dahla et al. |
| 7,276,063 B2 | 10/2007 | Davison et al. |
| 7,294,127 B2 | 11/2007 | Leung et al. |
| 7,305,264 B2 | 12/2007 | Larson et al. |
| 7,306,596 B2 | 12/2007 | Hillier et al. |
| 7,306,598 B2 | 12/2007 | Truckai et al. |
| 7,318,823 B2 | 1/2008 | Sharps et al. |
| 7,318,826 B2 | 1/2008 | Teitelbaum et al. |
| 7,326,203 B2 | 2/2008 | Papineau et al. |
| 7,331,956 B2 | 2/2008 | Hovda et al. |
| 7,331,957 B2 | 2/2008 | Woloszko et al. |
| RE40,156 E | 3/2008 | Sharps et al. |
| 7,346,391 B1 | 3/2008 | Osorio et al. |
| 7,386,350 B2 | 6/2008 | Vilims |
| 7,387,625 B2 | 6/2008 | Hovda et al. |
| 7,393,351 B2 | 7/2008 | Woloszko et al. |
| 7,399,306 B2 | 7/2008 | Reiley et al. |
| 7,422,585 B1 | 9/2008 | Eggers et al. |
| 7,429,262 B2 | 9/2008 | Woloszko et al. |
| 7,435,247 B2 | 10/2008 | Woloszko et al. |
| 7,435,250 B2 | 10/2008 | Francischelli et al. |
| 7,442,191 B2 | 10/2008 | Hovda et al. |
| 7,468,059 B2 | 12/2008 | Eggers et al. |
| 7,480,533 B2 | 1/2009 | Cosman et al. |
| 7,502,652 B2 | 3/2009 | Gaunt et al. |
| 7,503,920 B2 | 3/2009 | Siegal |
| 7,503,921 B2 | 3/2009 | Siegal |
| 7,507,236 B2 | 3/2009 | Eggers et al. |
| 7,546,164 B2 | 6/2009 | King |
| 7,553,307 B2 | 6/2009 | Bleich et al. |
| 7,553,309 B2 | 6/2009 | Buysse et al. |
| 7,555,343 B2 | 6/2009 | Bleich |
| 7,559,932 B2 | 7/2009 | Truckai et al. |
| 7,569,626 B2 | 8/2009 | Truckai |
| 7,574,257 B2 | 8/2009 | Rittman, III |
| 7,585,300 B2 | 9/2009 | Cha |
| 7,593,778 B2 | 9/2009 | Chandran et al. |
| 7,594,913 B2 | 9/2009 | Ormsby et al. |
| 7,604,636 B1 | 10/2009 | Walters et al. |
| 7,621,952 B2 | 11/2009 | Truckai et al. |
| 7,645,277 B2 | 1/2010 | McClurken et al. |
| 7,678,111 B2 | 3/2010 | Mulier et al. |
| 7,678,116 B2 | 3/2010 | Truckai et al. |
| 7,682,378 B2 | 3/2010 | Truckai et al. |
| 7,708,733 B2 | 5/2010 | Sanders et al. |
| 7,717,918 B2 | 5/2010 | Truckai et al. |
| 7,722,620 B2 | 5/2010 | Truckai et al. |
| 7,731,720 B2 | 6/2010 | Sand et al. |
| 7,738,968 B2 | 6/2010 | Bleich |
| 7,740,631 B2 | 6/2010 | Bleich et al. |
| 7,749,218 B2 | 7/2010 | Pellegrino et al. |
| 7,749,220 B2 | 7/2010 | Schmaltz et al. |
| 7,780,733 B2 | 8/2010 | Carver et al. |
| 7,792,588 B2 | 9/2010 | Harding |
| 7,799,021 B2 | 9/2010 | Leung et al. |
| 7,819,826 B2 | 10/2010 | Diederich et al. |
| 7,819,869 B2 | 10/2010 | Godara et al. |
| 7,824,398 B2 | 11/2010 | Woloszko et al. |
| 7,824,404 B2 | 11/2010 | Godara et al. |
| 7,828,804 B2 | 11/2010 | Li et al. |
| 7,846,156 B2 | 12/2010 | Malis et al. |
| 7,850,685 B2 | 12/2010 | Kunis et al. |
| 7,853,326 B2 | 12/2010 | Rittman, III |
| 7,857,813 B2 | 12/2010 | Schmitz et al. |
| 7,879,032 B1 | 2/2011 | Garito et al. |
| 7,887,534 B2 | 2/2011 | Hamel et al. |
| 7,887,543 B2 | 2/2011 | Sand et al. |
| 7,892,235 B2 | 2/2011 | Ellis |
| 7,896,870 B2 | 3/2011 | Arless et al. |

(56) References Cited

U.S. PATENT DOCUMENTS

| | | |
|---|---|---|
| 7,896,909 B2 | 3/2011 | Sharkey et al. |
| 7,901,403 B2 | 3/2011 | Woloszko et al. |
| 7,909,827 B2 | 3/2011 | Reiley et al. |
| 7,909,873 B2 | 3/2011 | Tan-Malecki et al. |
| 7,914,526 B2 | 3/2011 | Lehmann et al. |
| 7,914,535 B2 | 3/2011 | Assell et al. |
| 7,917,222 B1 | 3/2011 | Osorio et al. |
| 7,918,849 B2 | 4/2011 | Bleich et al. |
| 7,918,874 B2 | 4/2011 | Siegal |
| 7,938,835 B2 | 5/2011 | Boucher et al. |
| 7,945,331 B2 | 5/2011 | Vilims |
| 7,951,140 B2 | 5/2011 | Arless et al. |
| 7,959,634 B2 | 6/2011 | Sennett |
| 7,963,915 B2 | 6/2011 | Bleich |
| 7,967,827 B2 | 6/2011 | Osorio et al. |
| 7,972,340 B2 | 7/2011 | Sand et al. |
| 8,000,785 B2 | 8/2011 | Ritmann, III |
| 8,021,401 B2 | 9/2011 | Carl et al. |
| 8,025,688 B2 | 9/2011 | Diederich et al. |
| 8,034,052 B2 | 10/2011 | Podhajsky |
| 8,034,071 B2 | 10/2011 | Scribner et al. |
| 8,043,287 B2 | 10/2011 | Conquergood et al. |
| 8,048,030 B2 | 11/2011 | McGuckin, Jr. et al. |
| 8,048,071 B2 | 11/2011 | Youssef et al. |
| 8,048,083 B2 | 11/2011 | Shadduck et al. |
| 8,052,661 B2 | 11/2011 | McGuckin, Jr. et al. |
| 8,062,290 B2 | 11/2011 | Buysse et al. |
| 8,066,702 B2 | 11/2011 | Rittman, III et al. |
| 8,066,712 B2 | 11/2011 | Truckai et al. |
| 8,070,753 B2 | 12/2011 | Truckai et al. |
| 8,082,043 B2 | 12/2011 | Sharkey et al. |
| 8,083,736 B2 | 12/2011 | McClurken et al. |
| 8,092,456 B2 | 1/2012 | Bleich et al. |
| 8,096,957 B2 | 1/2012 | Conquergood et al. |
| 8,100,896 B2 | 1/2012 | Podhajsky |
| 8,109,933 B2 | 2/2012 | Truckai et al. |
| 8,123,750 B2 | 2/2012 | Norton et al. |
| 8,123,756 B2 | 2/2012 | Miller et al. |
| 8,128,619 B2 | 3/2012 | Sharkey et al. |
| 8,128,633 B2 | 3/2012 | Linderman et al. |
| 8,162,933 B2 | 4/2012 | Francischelli et al. |
| 8,163,031 B2 | 4/2012 | Truckai et al. |
| 8,172,846 B2 | 5/2012 | Brunnett et al. |
| 8,182,477 B2 | 5/2012 | Orszulak et al. |
| 8,187,268 B2 | 5/2012 | Godara et al. |
| 8,187,312 B2 | 5/2012 | Sharkey et al. |
| 8,192,424 B2 | 6/2012 | Woloszko et al. |
| 8,192,435 B2 | 6/2012 | Bleich et al. |
| 8,192,442 B2 | 6/2012 | Truckai et al. |
| 8,216,223 B2 | 7/2012 | Wham et al. |
| 8,226,697 B2 | 7/2012 | Sharkey et al. |
| 8,231,616 B2 | 7/2012 | McPherson et al. |
| 8,241,335 B2 | 8/2012 | Truckai et al. |
| 8,246,627 B2 | 8/2012 | Vanleeuwen et al. |
| 8,265,747 B2 | 9/2012 | Rittman, III et al. |
| 8,282,628 B2 | 10/2012 | Paul et al. |
| 8,292,882 B2 | 10/2012 | Danek et al. |
| 8,292,887 B2 | 10/2012 | Woloszko et al. |
| 8,323,277 B2 | 12/2012 | Vilims |
| 8,323,279 B2 | 12/2012 | Dahla et al. |
| 8,343,146 B2 | 1/2013 | Godara et al. |
| 8,348,946 B2 | 1/2013 | McClurken et al. |
| 8,348,955 B2 | 1/2013 | Truckai et al. |
| 8,355,799 B2 | 1/2013 | Marion et al. |
| 8,361,063 B2 | 1/2013 | Godara |
| 8,361,067 B2 | 1/2013 | Pellegrino et al. |
| 8,406,886 B2 | 3/2013 | Gaunt et al. |
| 8,409,289 B2 | 4/2013 | Truckai et al. |
| 8,414,509 B2 | 4/2013 | Diederich et al. |
| 8,414,571 B2 | 4/2013 | Pellegrino et al. |
| 8,419,730 B2 | 4/2013 | Pellegrino et al. |
| 8,419,731 B2 | 4/2013 | Pellegrino et al. |
| 8,425,430 B2 | 4/2013 | Pond, Jr. et al. |
| 8,425,507 B2 | 4/2013 | Pellegrino et al. |
| 8,430,881 B2 | 4/2013 | Bleich et al. |
| 8,430,887 B2 | 4/2013 | Truckai et al. |
| 8,444,636 B2 | 5/2013 | Shadduck et al. |
| 8,444,640 B2 | 5/2013 | Demarais et al. |
| 8,454,594 B2 | 6/2013 | Demarais et al. |
| 8,460,382 B2 | 6/2013 | Helm et al. |
| 8,475,449 B2 | 7/2013 | Werneth et al. |
| 8,486,063 B2 | 7/2013 | Werneth et al. |
| 8,487,021 B2 | 7/2013 | Truckai et al. |
| 8,504,147 B2 | 8/2013 | Deem et al. |
| 8,505,545 B2 | 8/2013 | Conquergood et al. |
| 8,518,036 B2 | 8/2013 | Leung et al. |
| 8,523,871 B2 | 9/2013 | Truckai et al. |
| 8,535,309 B2 | 9/2013 | Pellegrino et al. |
| 8,540,723 B2 | 9/2013 | Shadduck et al. |
| 8,556,891 B2 | 10/2013 | Mathur |
| 8,556,910 B2 | 10/2013 | Truckai et al. |
| 8,556,911 B2 | 10/2013 | Mehta et al. |
| 8,560,062 B2 | 10/2013 | Rittman, III et al. |
| 8,562,598 B2 | 10/2013 | Falkenstein et al. |
| 8,562,607 B2 | 10/2013 | Truckai et al. |
| 8,562,620 B2 | 10/2013 | Truckai et al. |
| 8,579,903 B2 | 11/2013 | Carl |
| 8,585,694 B2 | 11/2013 | Amoah et al. |
| 8,591,507 B2 | 11/2013 | Kramer et al. |
| 8,597,301 B2 | 12/2013 | Mitchell |
| 8,603,088 B2 | 12/2013 | Stern et al. |
| 8,613,744 B2 | 12/2013 | Pellegrino et al. |
| 8,617,156 B2 | 12/2013 | Werneth et al. |
| 8,623,014 B2 | 1/2014 | Pellegrino et al. |
| 8,623,025 B2 | 1/2014 | Tan-Malecki et al. |
| 8,628,528 B2 | 1/2014 | Pellegrino et al. |
| 8,636,736 B2 | 1/2014 | Yates et al. |
| 8,644,941 B2 | 2/2014 | Rooney et al. |
| 8,657,814 B2 | 2/2014 | Werneth et al. |
| 8,663,266 B1 | 3/2014 | Obsuth |
| 8,672,934 B2 | 3/2014 | Benamou et al. |
| 8,676,309 B2 | 3/2014 | Deem et al. |
| 8,679,023 B2 | 3/2014 | Kobayashi et al. |
| 8,690,884 B2 | 4/2014 | Linderman et al. |
| 8,696,679 B2 | 4/2014 | Shadduck et al. |
| RE44,883 E | 5/2014 | Cha |
| 8,740,897 B2 | 6/2014 | Leung et al. |
| 8,747,359 B2 | 6/2014 | Pakter et al. |
| 8,747,398 B2 | 6/2014 | Behnke |
| 8,758,349 B2 | 6/2014 | Germain et al. |
| 8,764,761 B2 | 7/2014 | Truckai et al. |
| 8,771,265 B2 | 7/2014 | Truckai |
| 8,771,276 B2 | 7/2014 | Linderman |
| 8,774,913 B2 | 7/2014 | Demarais et al. |
| 8,774,924 B2 | 7/2014 | Weiner |
| 8,777,479 B2 | 7/2014 | Kwan et al. |
| 8,784,411 B2 | 7/2014 | Leuthardt et al. |
| 8,795,270 B2 | 8/2014 | Drake |
| 8,808,161 B2 | 8/2014 | Gregg et al. |
| 8,808,284 B2 | 8/2014 | Pellegrino et al. |
| 8,814,873 B2 | 8/2014 | Schaller et al. |
| 8,818,503 B2 | 8/2014 | Rittman, III |
| 8,821,488 B2 | 9/2014 | Stewart et al. |
| 8,828,001 B2 | 9/2014 | Stearns et al. |
| 8,845,631 B2 | 9/2014 | Werneth et al. |
| 8,864,759 B2 | 10/2014 | Godara et al. |
| 8,864,760 B2 | 10/2014 | Kramer et al. |
| 8,864,777 B2 | 10/2014 | Harrison et al. |
| 8,880,189 B2 | 11/2014 | Lipani |
| 8,882,755 B2 | 11/2014 | Leung et al. |
| 8,882,759 B2 | 11/2014 | Manley et al. |
| 8,882,764 B2 | 11/2014 | Pellegrino et al. |
| 8,894,658 B2 | 11/2014 | Linderman et al. |
| 8,911,497 B2 | 12/2014 | Chavatte et al. |
| 8,915,949 B2 | 12/2014 | Diederich et al. |
| 8,926,620 B2 | 1/2015 | Chasmawala et al. |
| 8,932,300 B2 | 1/2015 | Shadduck et al. |
| 8,939,969 B2 | 1/2015 | Temelli et al. |
| 8,968,288 B2 | 3/2015 | Brannan |
| 8,989,859 B2 | 3/2015 | Deem et al. |
| 8,992,521 B2 | 3/2015 | VanWyk |
| 8,992,522 B2 | 3/2015 | Pellegrino et al. |
| 8,992,523 B2 | 3/2015 | Pellegrino et al. |
| 8,992,524 B1 | 3/2015 | Ellman |

(56) References Cited

U.S. PATENT DOCUMENTS

| | | |
|---|---|---|
| 9,005,210 B2 | 4/2015 | Truckai et al. |
| 9,008,793 B1 | 4/2015 | Cosman, Sr. et al. |
| 9,017,325 B2 | 4/2015 | Pellegrino et al. |
| 9,023,038 B2 | 5/2015 | Pellegrino et al. |
| 9,028,488 B2 | 5/2015 | Goshayeshgar |
| 9,028,538 B2 | 5/2015 | Paul et al. |
| 9,039,701 B2 | 5/2015 | Pellegrino et al. |
| 9,044,245 B2 | 6/2015 | Condie et al. |
| 9,044,254 B2 | 6/2015 | Ladtkow et al. |
| 9,044,575 B2 | 6/2015 | Beasley et al. |
| 9,050,109 B2 | 6/2015 | Smith |
| 9,050,112 B2 | 6/2015 | Greenhalgh et al. |
| 9,066,769 B2 | 6/2015 | Truckai et al. |
| 9,078,761 B2 | 7/2015 | Godara et al. |
| 9,095,359 B2 | 8/2015 | Robert et al. |
| 9,113,896 B2 | 8/2015 | Mulier et al. |
| 9,113,911 B2 | 8/2015 | Sherman |
| 9,113,925 B2 | 8/2015 | Smith et al. |
| 9,113,950 B2 | 8/2015 | Schutlz et al. |
| 9,113,974 B2 | 8/2015 | Germain |
| 9,119,623 B2 | 9/2015 | Malis et al. |
| 9,119,639 B2 | 9/2015 | Kuntz |
| 9,119,647 B2 | 9/2015 | Brannan |
| 9,119,650 B2 | 9/2015 | Brannan et al. |
| 9,125,671 B2 | 9/2015 | Germain et al. |
| 9,131,597 B2 | 9/2015 | Taft et al. |
| 9,149,652 B2 | 10/2015 | Wenz et al. |
| 9,151,680 B2 | 10/2015 | Brannan |
| 9,155,895 B2 | 10/2015 | Wacnik et al. |
| 9,161,735 B2 | 10/2015 | Bradford et al. |
| 9,161,797 B2 | 10/2015 | Truckai et al. |
| 9,161,798 B2 | 10/2015 | Truckai et al. |
| 9,161,805 B2 | 10/2015 | Isenberg |
| 9,161,809 B2 | 10/2015 | Germain et al. |
| 9,161,814 B2 | 10/2015 | Brannan et al. |
| 9,168,047 B2 | 10/2015 | To et al. |
| 9,168,054 B2 | 10/2015 | Turner et al. |
| 9,168,078 B2 | 10/2015 | Linderman et al. |
| 9,168,085 B2 | 10/2015 | Juzkiw |
| 9,173,676 B2 | 11/2015 | Pellegrino et al. |
| 9,173,700 B2 | 11/2015 | Godara et al. |
| 9,179,970 B2 | 11/2015 | Utley et al. |
| 9,179,972 B2 | 11/2015 | Olson |
| 9,180,416 B2 | 11/2015 | Phan et al. |
| 9,186,197 B2 | 11/2015 | McKay |
| 9,192,308 B2 | 11/2015 | Brannan et al. |
| 9,192,397 B2 | 11/2015 | Sennett et al. |
| 9,198,684 B2 | 12/2015 | Arthur et al. |
| 9,216,053 B2 | 12/2015 | Godara et al. |
| 9,216,195 B2 | 12/2015 | Truckai et al. |
| 9,226,756 B2 | 1/2016 | Teisen et al. |
| 9,232,954 B2 | 1/2016 | Steiner et al. |
| 9,237,916 B2 | 1/2016 | Crainich et al. |
| 9,238,139 B2 | 1/2016 | Degiorgio et al. |
| 9,241,057 B2 | 1/2016 | Van Wyk et al. |
| 9,241,729 B2 | 1/2016 | Kuntz et al. |
| 9,241,760 B2 | 1/2016 | Godara et al. |
| 9,247,970 B2 | 2/2016 | Teisen |
| 9,247,992 B2 | 2/2016 | Ladtkow et al. |
| 9,247,993 B2 | 2/2016 | Ladtkow et al. |
| 9,248,278 B2 | 2/2016 | Crosby et al. |
| 9,248,289 B2 | 2/2016 | Bennett et al. |
| 9,254,168 B2 | 2/2016 | Palanker |
| 9,254,386 B2 | 2/2016 | Lee et al. |
| 9,259,241 B2 | 2/2016 | Pellegrino et al. |
| 9,259,248 B2 | 2/2016 | Leuthardt et al. |
| 9,259,269 B2 | 2/2016 | Ladtkow et al. |
| 9,259,569 B2 | 2/2016 | Brounstein et al. |
| 9,259,577 B2 | 2/2016 | Kaula et al. |
| 9,265,522 B2 | 2/2016 | Pellegrino et al. |
| 9,265,557 B2 | 2/2016 | Sherman et al. |
| 9,277,969 B2 | 3/2016 | Brannan et al. |
| 9,282,979 B2 | 3/2016 | O'Neil et al. |
| 9,282,988 B2 | 3/2016 | Goshayeshgar |
| 9,283,015 B2 | 3/2016 | Tan-Malecki et al. |
| 9,289,607 B2 | 3/2016 | Su et al. |
| 9,295,479 B2 | 3/2016 | Hibri et al. |
| 9,295,517 B2 | 3/2016 | Peyman et al. |
| 9,295,841 B2 | 3/2016 | Fang et al. |
| 9,301,723 B2 | 4/2016 | Brannan et al. |
| 9,301,804 B2 | 4/2016 | Bonn |
| 9,302,117 B2 | 4/2016 | De Vincentiis |
| 9,308,036 B2 | 4/2016 | Robinson |
| 9,308,045 B2 | 4/2016 | Kim et al. |
| 9,314,252 B2 | 4/2016 | Schaller et al. |
| 9,314,613 B2 | 4/2016 | Mashiach |
| 9,314,618 B2 | 4/2016 | Imran et al. |
| 9,333,033 B2 | 5/2016 | Gliner |
| 9,333,144 B2 | 5/2016 | Baxter et al. |
| 9,333,339 B2 | 5/2016 | Weiner |
| 9,333,361 B2 | 5/2016 | Li et al. |
| 9,333,373 B2 | 5/2016 | Imran |
| 9,339,655 B2 | 5/2016 | Carbunaru |
| 9,345,530 B2 | 5/2016 | Ballakur et al. |
| 9,345,537 B2 | 5/2016 | Harrison et al. |
| 9,345,538 B2 | 5/2016 | Deem et al. |
| 9,351,739 B2 | 5/2016 | Mahoney et al. |
| 9,358,059 B2 | 6/2016 | Linderman et al. |
| 9,358,067 B2 | 6/2016 | Lee et al. |
| 9,358,396 B2 | 6/2016 | Holley |
| 9,364,242 B2 | 6/2016 | Tornier et al. |
| 9,364,286 B2 | 6/2016 | Werneth et al. |
| 9,370,348 B2 | 6/2016 | Tally et al. |
| 9,370,373 B2 | 6/2016 | Smith |
| 9,370,392 B2 | 6/2016 | Sharonov |
| 9,370,398 B2 | 6/2016 | Ladtkow et al. |
| 9,375,274 B2 | 6/2016 | Reid |
| 9,375,275 B2 | 6/2016 | Lee et al. |
| 9,375,278 B2 | 6/2016 | Robert et al. |
| 9,375,279 B2 | 6/2016 | Brannan |
| 9,375,283 B2 | 6/2016 | Arts et al. |
| 9,381,024 B2 | 7/2016 | Globerman et al. |
| 9,381,045 B2 | 7/2016 | Donner et al. |
| 9,381,050 B2 | 7/2016 | Lee et al. |
| 9,381,359 B2 | 7/2016 | Parramon et al. |
| 9,387,094 B2 | 7/2016 | Manrique et al. |
| 9,393,416 B2 | 7/2016 | Rooney et al. |
| 9,398,931 B2 | 7/2016 | Wittenberger et al. |
| 9,399,144 B2 | 7/2016 | Howard |
| 9,403,038 B2 | 8/2016 | Tyler |
| 9,409,023 B2 | 8/2016 | Burdick et al. |
| 9,414,884 B2 | 8/2016 | Faehndrich et al. |
| 9,421,057 B2 | 8/2016 | Germain |
| 9,421,064 B2 | 8/2016 | Pellegrino et al. |
| 9,421,123 B2 | 8/2016 | Lee et al. |
| 9,421,371 B2 | 8/2016 | Pless et al. |
| 9,421,378 B2 | 8/2016 | Lian et al. |
| 9,439,693 B2 | 9/2016 | Childs et al. |
| 9,439,721 B2 | 9/2016 | Werneth et al. |
| 9,445,859 B2 | 9/2016 | Pageard |
| 9,446,229 B2 | 9/2016 | Omar-Pasha |
| 9,446,235 B2 | 9/2016 | Su et al. |
| 9,452,286 B2 | 9/2016 | Cowan et al. |
| 9,456,836 B2 | 10/2016 | Boling et al. |
| 9,457,182 B2 | 10/2016 | Koop |
| 9,468,485 B2 | 10/2016 | Wittenberger et al. |
| 9,468,495 B2 | 10/2016 | Kunis et al. |
| 9,474,565 B2 | 10/2016 | Shikhman et al. |
| 9,474,906 B2 | 10/2016 | Sachs et al. |
| 9,480,485 B2 | 11/2016 | Aho et al. |
| 9,486,279 B2 | 11/2016 | Pellegrino et al. |
| 9,486,447 B2 | 11/2016 | Peterson et al. |
| 9,486,621 B2 | 11/2016 | Howard et al. |
| 9,492,657 B2 | 11/2016 | Gerber |
| 9,492,664 B2 | 11/2016 | Peterson |
| 9,504,372 B2 | 11/2016 | Kim |
| 9,504,481 B2 | 11/2016 | Germain et al. |
| 9,504,506 B2 | 11/2016 | Crainich et al. |
| 9,504,518 B2 | 11/2016 | Condie et al. |
| 9,504,530 B2 | 11/2016 | Hartmann et al. |
| 9,504,818 B2 | 11/2016 | Moffitt et al. |
| 9,511,229 B2 | 12/2016 | Bradley |
| 9,511,231 B1 | 12/2016 | Kent et al. |
| 9,513,761 B2 | 12/2016 | Shikhman et al. |

(56) References Cited

U.S. PATENT DOCUMENTS

| | | |
|---|---|---|
| 9,517,077 B2 | 12/2016 | Blain et al. |
| 9,517,200 B2 | 12/2016 | Bleier |
| 9,526,507 B2 | 12/2016 | Germain |
| 9,526,551 B2 | 12/2016 | Linderman |
| 9,526,559 B2 | 12/2016 | Banamou et al. |
| 9,532,828 B2 | 1/2017 | Condie et al. |
| 9,545,283 B2 | 1/2017 | Sack et al. |
| 9,549,772 B2 | 1/2017 | Carl |
| 9,550,041 B2 | 1/2017 | Bedell |
| 9,555,037 B2 | 1/2017 | Podhajsky |
| 9,556,101 B2 | 1/2017 | Robertson et al. |
| 9,556,449 B2 | 1/2017 | Basu et al. |
| 9,566,108 B2 | 2/2017 | Brustad et al. |
| 9,566,449 B2 | 2/2017 | Perryman et al. |
| 9,572,976 B2 | 2/2017 | Howard et al. |
| 9,572,986 B2 | 2/2017 | Moffitt |
| 9,579,127 B2 | 2/2017 | Kostuik et al. |
| 9,579,518 B2 | 2/2017 | Gertner |
| 9,597,091 B2 | 3/2017 | Bromer |
| 9,597,148 B2 | 3/2017 | Olson |
| RE46,356 E | 4/2017 | Pellegrino et al. |
| 9,610,083 B2 | 4/2017 | Kuntz |
| 9,610,117 B2 | 4/2017 | Germain |
| 9,636,175 B2 | 5/2017 | Stern et al. |
| 9,642,629 B2 | 5/2017 | Griffiths et al. |
| 9,649,116 B2 | 5/2017 | Germain |
| 9,675,408 B2 | 6/2017 | Godara et al. |
| 9,681,889 B1 | 6/2017 | Greenhalgh et al. |
| 9,687,255 B2 | 6/2017 | Sennett et al. |
| 9,717,551 B2 | 8/2017 | Krueger et al. |
| 9,724,107 B2 | 8/2017 | Pellegrino et al. |
| 9,724,151 B2 | 8/2017 | Edidin |
| 9,730,707 B2 | 8/2017 | Sasaki et al. |
| 9,743,854 B2 | 8/2017 | Stewart et al. |
| 9,743,938 B2 | 8/2017 | Germain et al. |
| 9,750,560 B2 | 9/2017 | Ballakur et al. |
| 9,750,570 B2 | 9/2017 | Condie et al. |
| 9,757,193 B2 | 9/2017 | Zarins et al. |
| 9,770,280 B2 | 9/2017 | Diederich et al. |
| 9,775,627 B2 | 10/2017 | Patel et al. |
| 9,782,221 B2 | 10/2017 | Srinivasan |
| 9,795,802 B2 | 10/2017 | Mohamed et al. |
| 9,814,514 B2 | 11/2017 | Shelton, IV et al. |
| 9,826,985 B2 | 11/2017 | Slobitker et al. |
| 9,844,406 B2 | 12/2017 | Edwards et al. |
| 9,848,890 B2 | 12/2017 | Yoon et al. |
| 9,848,944 B2 | 12/2017 | Sutton et al. |
| 9,872,687 B2 | 1/2018 | Tornier et al. |
| 9,872,691 B2 | 1/2018 | Griffiths et al. |
| 9,877,707 B2 | 1/2018 | Godara et al. |
| 9,901,392 B2 | 2/2018 | Phan et al. |
| 9,913,675 B2 | 3/2018 | Germain |
| 9,918,786 B2 | 3/2018 | Wang et al. |
| 9,980,771 B2 | 5/2018 | Carter et al. |
| 9,993,285 B2 | 6/2018 | Govari et al. |
| 10,022,140 B2 | 7/2018 | Germain et al. |
| 10,028,753 B2 | 7/2018 | Pellegrino et al. |
| 10,028,784 B2 | 7/2018 | Kramer et al. |
| 10,052,152 B2 | 8/2018 | Tegg et al. |
| 10,052,153 B2 | 8/2018 | Olson |
| 10,058,336 B2 | 8/2018 | Truckai et al. |
| 10,105,175 B2 | 10/2018 | Godara et al. |
| 10,111,674 B2 | 10/2018 | Crainich et al. |
| 10,111,704 B2 | 10/2018 | Pellegrino et al. |
| 10,123,809 B2 | 11/2018 | Germain |
| 10,159,497 B2 | 12/2018 | Kuntz et al. |
| 10,245,092 B2 | 4/2019 | Germain |
| 10,265,099 B2 | 4/2019 | Pellegrino et al. |
| 10,272,271 B2 | 4/2019 | Diederich et al. |
| 10,292,716 B2 | 5/2019 | Aho et al. |
| 10,292,719 B2 | 5/2019 | Burger et al. |
| 10,299,805 B2 | 5/2019 | Germain et al. |
| 10,314,633 B2 | 6/2019 | Linderman et al. |
| 10,327,841 B2 | 6/2019 | Germain |
| 10,357,258 B2 | 7/2019 | Patel et al. |
| 10,357,307 B2 | 7/2019 | Harrison et al. |
| 10,376,271 B2 | 8/2019 | Mehta et al. |
| 10,383,641 B2 | 8/2019 | LeRoy et al. |
| 10,390,877 B2 | 8/2019 | Heggeness et al. |
| 10,441,295 B2 | 10/2019 | Brockman et al. |
| 10,441,354 B2 | 10/2019 | Govari et al. |
| 10,448,995 B2 | 10/2019 | Olson |
| 10,456,187 B2 | 10/2019 | Edidin |
| 10,463,380 B2 | 11/2019 | Purdy et al. |
| 10,463,423 B2 | 11/2019 | Sutton et al. |
| 10,470,781 B2 | 11/2019 | Purdy et al. |
| 10,478,241 B2 | 11/2019 | Purdy et al. |
| 10,478,246 B2 | 11/2019 | Pellegrino et al. |
| 10,493,247 B2 | 12/2019 | Goshayeshgar |
| 10,499,960 B2 | 12/2019 | Sinnott et al. |
| 10,517,611 B2 | 12/2019 | Patel et al. |
| 10,524,805 B2 | 1/2020 | Zilberman et al. |
| 10,582,966 B2 | 3/2020 | Orczy-Timko et al. |
| 10,588,691 B2 | 3/2020 | Pellegino et al. |
| 10,589,131 B2 | 3/2020 | Diederich et al. |
| 10,603,522 B2 | 3/2020 | Diederich et al. |
| 10,624,652 B2 | 4/2020 | Germain et al. |
| 10,660,656 B2 | 5/2020 | Purdy et al. |
| 10,835,234 B2 | 11/2020 | Harari et al. |
| 10,849,613 B2 | 12/2020 | Rosner et al. |
| 10,864,040 B2 | 12/2020 | Dastjerdi et al. |
| 10,898,254 B2 | 1/2021 | Diederich et al. |
| 10,905,440 B2 | 2/2021 | Pellegrino et al. |
| 10,918,363 B2 | 2/2021 | Godara et al. |
| RE48,460 E | 3/2021 | Pellegrino et al. |
| 10,952,771 B2 | 3/2021 | Pellegrino |
| 11,007,010 B2 | 5/2021 | Donovan et al. |
| 11,026,734 B2 | 6/2021 | Truckai et al. |
| 11,026,744 B2 | 6/2021 | Purdy et al. |
| 11,052,267 B2 | 7/2021 | Diederich et al. |
| 11,065,046 B2 | 7/2021 | Edidin |
| 11,116,570 B2 | 9/2021 | Purdy et al. |
| 11,123,103 B2 | 9/2021 | Donovan et al. |
| 11,147,684 B2 | 10/2021 | Neubardt |
| 11,160,503 B2 | 11/2021 | Peesapati et al. |
| 11,160,563 B2 | 11/2021 | Patel et al. |
| 11,166,747 B2 | 11/2021 | Brockman et al. |
| 11,191,575 B2 | 12/2021 | Kidman et al. |
| 11,207,100 B2 | 12/2021 | Donovan et al. |
| 11,224,475 B2 | 1/2022 | Godara et al. |
| 11,234,764 B1 | 2/2022 | Patel et al. |
| 11,259,818 B2 | 3/2022 | Brockman et al. |
| 11,291,502 B2 | 4/2022 | Patel et al. |
| 11,344,350 B2 | 5/2022 | Purdy et al. |
| 11,364,069 B2 | 6/2022 | Heggeness |
| 11,376,021 B2 | 7/2022 | Marino et al. |
| 11,389,181 B2 | 7/2022 | Dutertre et al. |
| 11,419,614 B2 | 8/2022 | Weitzman et al. |
| 11,426,199 B2 | 8/2022 | Donovan et al. |
| 11,471,171 B2 | 10/2022 | Pellegrino et al. |
| 11,471,210 B2 | 10/2022 | Pellegrino et al. |
| 11,497,543 B2 | 11/2022 | Sprinkle et al. |
| 11,510,723 B2 | 11/2022 | Defosset et al. |
| 11,596,468 B2 | 3/2023 | Pellegrino et al. |
| 11,690,667 B2 | 7/2023 | Pellegrino et al. |
| 2001/0001314 A1 | 5/2001 | Davison et al. |
| 2001/0001811 A1 | 5/2001 | Burney et al. |
| 2001/0020167 A1 | 9/2001 | Woloszko et al. |
| 2001/0023348 A1 | 9/2001 | Ashley et al. |
| 2001/0025176 A1 | 9/2001 | Ellsberry et al. |
| 2001/0025177 A1 | 9/2001 | Woloszko et al. |
| 2001/0027295 A1 | 10/2001 | Dulak et al. |
| 2001/0029370 A1 | 10/2001 | Hovda et al. |
| 2001/0029373 A1 | 10/2001 | Baker et al. |
| 2001/0029393 A1 | 10/2001 | Tierney et al. |
| 2001/0032001 A1 | 10/2001 | Ricart et al. |
| 2001/0047167 A1 | 11/2001 | Heggeness |
| 2001/0049522 A1 | 12/2001 | Eggers et al. |
| 2001/0049527 A1 | 12/2001 | Cragg |
| 2001/0051802 A1 | 12/2001 | Woloszko et al. |
| 2001/0053885 A1 | 12/2001 | Gielen et al. |
| 2001/0056280 A1 | 12/2001 | Underwood et al. |
| 2002/0016583 A1 | 2/2002 | Cragg |
| 2002/0016600 A1 | 2/2002 | Cosman |

(56) References Cited

U.S. PATENT DOCUMENTS

| | | |
|---|---|---|
| 2002/0019626 A1 | 2/2002 | Sharkey et al. |
| 2002/0026186 A1 | 2/2002 | Woloszko et al. |
| 2002/0049438 A1 | 4/2002 | Sharkey et al. |
| 2002/0052600 A1 | 5/2002 | Davison et al. |
| 2002/0068930 A1 | 6/2002 | Tasto et al. |
| 2002/0095144 A1 | 7/2002 | Carl |
| 2002/0095151 A1 | 7/2002 | Dahla et al. |
| 2002/0095152 A1 | 7/2002 | Ciarrocca et al. |
| 2002/0099366 A1 | 7/2002 | Dahla et al. |
| 2002/0111661 A1 | 8/2002 | Cross et al. |
| 2002/0115945 A1 | 8/2002 | D'Luzansky et al. |
| 2002/0120259 A1 | 8/2002 | Lettice et al. |
| 2002/0133148 A1 | 9/2002 | Daniel et al. |
| 2002/0147444 A1 | 10/2002 | Shah et al. |
| 2002/0151885 A1 | 10/2002 | Underwood et al. |
| 2002/0165532 A1 | 11/2002 | Hill et al. |
| 2002/0183758 A1 | 12/2002 | Middleton et al. |
| 2002/0188284 A1 | 12/2002 | To et al. |
| 2002/0188290 A1 | 12/2002 | Sharkey et al. |
| 2002/0193708 A1 | 12/2002 | Thompson et al. |
| 2002/0193789 A1 | 12/2002 | Underwood et al. |
| 2003/0009164 A1 | 1/2003 | Woloszko et al. |
| 2003/0014047 A1 | 1/2003 | Woloszko et al. |
| 2003/0014088 A1 | 1/2003 | Fang et al. |
| 2003/0028147 A1 | 2/2003 | Aves et al. |
| 2003/0028189 A1 | 2/2003 | Woloszko et al. |
| 2003/0040710 A1 | 2/2003 | Polidoro |
| 2003/0040742 A1 | 2/2003 | Underwood et al. |
| 2003/0040743 A1 | 2/2003 | Cosman et al. |
| 2003/0055418 A1 | 3/2003 | Tasto et al. |
| 2003/0069569 A1 | 4/2003 | Burdette et al. |
| 2003/0083592 A1 | 5/2003 | Faciszewski |
| 2003/0084907 A1 | 5/2003 | Pacek et al. |
| 2003/0097126 A1 | 5/2003 | Woloszko et al. |
| 2003/0097129 A1 | 5/2003 | Davison et al. |
| 2003/0130655 A1 | 7/2003 | Woloszko et al. |
| 2003/0139652 A1 | 7/2003 | Kang et al. |
| 2003/0158545 A1 | 8/2003 | Hovda et al. |
| 2003/0181963 A1 | 9/2003 | Pellegrino et al. |
| 2003/0208194 A1 | 11/2003 | Hovda et al. |
| 2003/0216725 A1 | 11/2003 | Woloszko et al. |
| 2003/0216726 A1 | 11/2003 | Eggers et al. |
| 2003/0225364 A1 | 12/2003 | Kraft |
| 2004/0006339 A1 | 1/2004 | Underwood et al. |
| 2004/0015163 A1 | 1/2004 | Buysse et al. |
| 2004/0024399 A1 | 2/2004 | Sharps et al. |
| 2004/0054366 A1 | 3/2004 | Davison et al. |
| 2004/0064023 A1 | 4/2004 | Thomas et al. |
| 2004/0064136 A1 | 4/2004 | Crombie et al. |
| 2004/0064137 A1 | 4/2004 | Pellegrino et al. |
| 2004/0068242 A1 | 4/2004 | McGuckin, Jr. |
| 2004/0082942 A1 | 4/2004 | Katzman |
| 2004/0082946 A1 | 4/2004 | Malis et al. |
| 2004/0087937 A1 | 5/2004 | Eggers et al. |
| 2004/0111087 A1 | 6/2004 | Stern et al. |
| 2004/0116922 A1 | 6/2004 | Hovda et al. |
| 2004/0120668 A1 | 6/2004 | Loeb |
| 2004/0120891 A1 | 6/2004 | Hill et al. |
| 2004/0133124 A1 | 7/2004 | Bates et al. |
| 2004/0162559 A1 | 8/2004 | Arramon |
| 2004/0186544 A1 | 9/2004 | King |
| 2004/0193151 A1 | 9/2004 | To et al. |
| 2004/0193152 A1 | 9/2004 | Sutton |
| 2004/0220577 A1 | 11/2004 | Cragg et al. |
| 2004/0225228 A1 | 11/2004 | Ferree |
| 2004/0230190 A1 | 11/2004 | Dahla et al. |
| 2004/0267269 A1 | 12/2004 | Middleton et al. |
| 2005/0004634 A1 | 1/2005 | Ricart et al. |
| 2005/0010095 A1 | 1/2005 | Stewart et al. |
| 2005/0010203 A1 | 1/2005 | Edwards et al. |
| 2005/0010205 A1 | 1/2005 | Hovda et al. |
| 2005/0043737 A1 | 2/2005 | Reiley et al. |
| 2005/0055096 A1 | 3/2005 | Serhan et al. |
| 2005/0124989 A1 | 6/2005 | Suddaby |
| 2005/0177209 A1 | 8/2005 | Leung et al. |
| 2005/0177210 A1 | 8/2005 | Leung et al. |
| 2005/0177211 A1 | 8/2005 | Leung et al. |
| 2005/0182417 A1 | 8/2005 | Pagano |
| 2005/0192564 A1 | 9/2005 | Cosman et al. |
| 2005/0209610 A1 | 9/2005 | Carrison |
| 2005/0209659 A1 | 9/2005 | Pellegrino et al. |
| 2005/0216018 A1 | 9/2005 | Sennett |
| 2005/0234445 A1 | 10/2005 | Conquergood et al. |
| 2005/0261754 A1 | 11/2005 | Woloszko |
| 2005/0267552 A1 | 12/2005 | Conquergood et al. |
| 2005/0278007 A1 | 12/2005 | Godara |
| 2005/0283148 A1 | 12/2005 | Janssen et al. |
| 2006/0004369 A1 | 1/2006 | Patel et al. |
| 2006/0036264 A1 | 2/2006 | Selover et al. |
| 2006/0052743 A1 | 3/2006 | Reynolds |
| 2006/0064101 A1 | 3/2006 | Arramon |
| 2006/0095026 A1 | 5/2006 | Ricart et al. |
| 2006/0095028 A1 | 5/2006 | Bleich |
| 2006/0106375 A1 | 5/2006 | Werneth et al. |
| 2006/0106376 A1 | 5/2006 | Godara et al. |
| 2006/0122458 A1 | 6/2006 | Bleich |
| 2006/0129101 A1 | 6/2006 | McGuckin |
| 2006/0178670 A1 | 8/2006 | Woloszko et al. |
| 2006/0200121 A1 | 9/2006 | Mowery |
| 2006/0206128 A1 | 9/2006 | Conquergood et al. |
| 2006/0206129 A1 | 9/2006 | Conquergood et al. |
| 2006/0206130 A1 | 9/2006 | Conquergood et al. |
| 2006/0206132 A1 | 9/2006 | Conquergood et al. |
| 2006/0206133 A1 | 9/2006 | Conquergood et al. |
| 2006/0206134 A1 | 9/2006 | Conquergood et al. |
| 2006/0206166 A1 | 9/2006 | Weiner |
| 2006/0217736 A1 | 9/2006 | Kaneko et al. |
| 2006/0229625 A1 | 10/2006 | Truckai et al. |
| 2006/0247746 A1 | 11/2006 | Danek et al. |
| 2006/0253117 A1 | 11/2006 | Hovda et al. |
| 2006/0259026 A1 | 11/2006 | Godara et al. |
| 2006/0264957 A1 | 11/2006 | Cragg et al. |
| 2006/0264965 A1 | 11/2006 | Shadduck et al. |
| 2006/0265014 A1 | 11/2006 | Demarais et al. |
| 2006/0276749 A1 | 12/2006 | Selmon et al. |
| 2006/0287649 A1 | 12/2006 | Ormsby et al. |
| 2007/0021803 A1 | 1/2007 | Deem et al. |
| 2007/0027449 A1 | 2/2007 | Godara et al. |
| 2007/0055316 A1 | 3/2007 | Godara et al. |
| 2007/0066987 A1 | 3/2007 | Scanlan, Jr. et al. |
| 2007/0074719 A1 | 4/2007 | Danek et al. |
| 2007/0118142 A1 | 5/2007 | Krueger et al. |
| 2007/0129715 A1 | 6/2007 | Eggers et al. |
| 2007/0142791 A1 | 6/2007 | Yeung et al. |
| 2007/0142842 A1 | 6/2007 | Krueger et al. |
| 2007/0149966 A1 | 6/2007 | Dahla et al. |
| 2007/0179497 A1 | 8/2007 | Eggers et al. |
| 2007/0185231 A1 | 8/2007 | Liu et al. |
| 2007/0213584 A1 | 9/2007 | Kim et al. |
| 2007/0213735 A1 | 9/2007 | Saadat et al. |
| 2007/0260237 A1 | 11/2007 | Sutton et al. |
| 2008/0004621 A1 | 1/2008 | Dahla et al. |
| 2008/0004675 A1 | 1/2008 | King et al. |
| 2008/0009847 A1 | 1/2008 | Ricart et al. |
| 2008/0021447 A1 | 1/2008 | Davison et al. |
| 2008/0021463 A1 | 1/2008 | Georgy |
| 2008/0058707 A1 | 3/2008 | Ashley et al. |
| 2008/0065062 A1 | 3/2008 | Leung et al. |
| 2008/0091207 A1 | 4/2008 | Truckai et al. |
| 2008/0114364 A1 | 5/2008 | Goldin et al. |
| 2008/0119844 A1 | 5/2008 | Woloszko et al. |
| 2008/0119846 A1 | 5/2008 | Rioux |
| 2008/0132890 A1 | 6/2008 | Woloszko et al. |
| 2008/0161804 A1 | 7/2008 | Rioux et al. |
| 2008/0275458 A1 | 11/2008 | Bleich et al. |
| 2008/0281322 A1 | 11/2008 | Sherman et al. |
| 2008/0294166 A1 | 11/2008 | Goldin et al. |
| 2008/0294167 A1 | 11/2008 | Schumacher et al. |
| 2009/0030308 A1 | 1/2009 | Bradford et al. |
| 2009/0054951 A1 | 2/2009 | Leuthardt et al. |
| 2009/0069807 A1 | 3/2009 | Eggers et al. |
| 2009/0076520 A1 | 3/2009 | Choi |
| 2009/0105775 A1 | 4/2009 | Mitchell et al. |
| 2009/0112278 A1 | 4/2009 | Wingeier et al. |

(56) References Cited

U.S. PATENT DOCUMENTS

| | | |
|---|---|---|
| 2009/0118731 A1 | 5/2009 | Young et al. |
| 2009/0131867 A1 | 5/2009 | Liu et al. |
| 2009/0131886 A1 | 5/2009 | Liu et al. |
| 2009/0149846 A1 | 6/2009 | Hoey et al. |
| 2009/0149878 A1 | 6/2009 | Truckai et al. |
| 2009/0204192 A1 | 8/2009 | Carlton et al. |
| 2009/0222053 A1 | 9/2009 | Gaunt et al. |
| 2009/0312764 A1 | 12/2009 | Marino |
| 2010/0010392 A1 | 1/2010 | Skelton et al. |
| 2010/0016929 A1 | 1/2010 | Prochazka |
| 2010/0023006 A1 | 1/2010 | Ellman |
| 2010/0023065 A1 | 1/2010 | Welch et al. |
| 2010/0082033 A1 | 4/2010 | Germain |
| 2010/0094269 A1 | 4/2010 | Pellegrino et al. |
| 2010/0114098 A1 | 5/2010 | Carl |
| 2010/0145424 A1 | 6/2010 | Podhajsky et al. |
| 2010/0179556 A1 | 7/2010 | Scribner et al. |
| 2010/0185082 A1 | 7/2010 | Chandran et al. |
| 2010/0185161 A1 | 7/2010 | Pellegrino et al. |
| 2010/0211076 A1 | 8/2010 | Germain et al. |
| 2010/0222777 A1 | 9/2010 | Sutton et al. |
| 2010/0261989 A1 | 10/2010 | Boseck et al. |
| 2010/0261990 A1 | 10/2010 | Gillis et al. |
| 2010/0286487 A1 | 11/2010 | Van Lue |
| 2010/0298737 A1 | 11/2010 | Koehler |
| 2010/0298822 A1 | 11/2010 | Behnke |
| 2010/0298832 A1 | 11/2010 | Lau et al. |
| 2010/0305559 A1 | 12/2010 | Brannan et al. |
| 2010/0324506 A1 | 12/2010 | Pellegrino et al. |
| 2011/0022133 A1 | 1/2011 | Diederich et al. |
| 2011/0034884 A9 | 2/2011 | Pellegrino et al. |
| 2011/0040362 A1 | 2/2011 | Godara et al. |
| 2011/0077628 A1 | 3/2011 | Hoey et al. |
| 2011/0087314 A1 | 4/2011 | Diederich et al. |
| 2011/0118735 A1 | 5/2011 | Abou-Marie et al. |
| 2011/0130751 A1 | 6/2011 | Malis et al. |
| 2011/0144524 A1 | 6/2011 | Fish et al. |
| 2011/0152855 A1 | 6/2011 | Mayse et al. |
| 2011/0196361 A1 | 8/2011 | Vilims |
| 2011/0206260 A1 | 8/2011 | Bergmans et al. |
| 2011/0264098 A1 | 10/2011 | Cobbs |
| 2011/0270238 A1 | 11/2011 | Rizq et al. |
| 2011/0276001 A1 | 11/2011 | Schultz et al. |
| 2011/0295245 A1 | 12/2011 | Willyard et al. |
| 2011/0295261 A1 | 12/2011 | Germain |
| 2011/0319765 A1 | 12/2011 | Gertner et al. |
| 2012/0029420 A1 | 2/2012 | Rittman et al. |
| 2012/0116266 A1 | 5/2012 | House et al. |
| 2012/0136346 A1 | 5/2012 | Condie et al. |
| 2012/0136348 A1 | 5/2012 | Condie et al. |
| 2012/0143090 A1 | 6/2012 | Hay et al. |
| 2012/0143341 A1 | 6/2012 | Zipnick |
| 2012/0172858 A1 | 7/2012 | Harrison et al. |
| 2012/0172859 A1 | 7/2012 | Condie et al. |
| 2012/0191095 A1 | 7/2012 | Burger et al. |
| 2012/0196251 A1 | 8/2012 | Taft et al. |
| 2012/0197344 A1 | 8/2012 | Taft et al. |
| 2012/0203219 A1 | 8/2012 | Evans et al. |
| 2012/0226145 A1 | 9/2012 | Chang et al. |
| 2012/0226273 A1 | 9/2012 | Nguyen et al. |
| 2012/0239049 A1 | 9/2012 | Truckai et al. |
| 2012/0239050 A1 | 9/2012 | Linderman |
| 2012/0265186 A1 | 10/2012 | Burger et al. |
| 2012/0330180 A1 | 12/2012 | Pellegrino et al. |
| 2012/0330300 A1 | 12/2012 | Pellegrino et al. |
| 2012/0330301 A1 | 12/2012 | Pellegrino et al. |
| 2013/0006232 A1 | 1/2013 | Pellegrino et al. |
| 2013/0006233 A1 | 1/2013 | Pellegrino et al. |
| 2013/0012933 A1 | 1/2013 | Pellegrino et al. |
| 2013/0012935 A1 | 1/2013 | Pellegrino et al. |
| 2013/0012936 A1 | 1/2013 | Pellegrino et al. |
| 2013/0012951 A1 | 1/2013 | Linderman |
| 2013/0060244 A1 | 3/2013 | Godara et al. |
| 2013/0079810 A1 | 3/2013 | Isenberg |
| 2013/0103022 A1 | 4/2013 | Sutton et al. |
| 2013/0197508 A1 | 8/2013 | Shikhman et al. |
| 2013/0231654 A1 | 9/2013 | Germain |
| 2013/0237979 A1 | 9/2013 | Shikhman et al. |
| 2013/0261507 A1 | 10/2013 | Diederich et al. |
| 2013/0274784 A1 | 10/2013 | Lenker et al. |
| 2013/0296767 A1 | 11/2013 | Zarins et al. |
| 2013/0324993 A1 | 12/2013 | McCarthy et al. |
| 2013/0324994 A1 | 12/2013 | Pellegrino et al. |
| 2013/0324996 A1 | 12/2013 | Pellegrino et al. |
| 2013/0324997 A1 | 12/2013 | Pellegrino et al. |
| 2013/0331840 A1 | 12/2013 | Teisen et al. |
| 2013/0345765 A1 | 12/2013 | Brockman et al. |
| 2014/0031715 A1 | 1/2014 | Sherar et al. |
| 2014/0039500 A1 | 2/2014 | Pellegrino et al. |
| 2014/0046245 A1 | 2/2014 | Cornacchia |
| 2014/0046328 A1 | 2/2014 | Schumacher et al. |
| 2014/0066913 A1 | 3/2014 | Sherman |
| 2014/0088575 A1 | 3/2014 | Loeb |
| 2014/0148801 A1 | 5/2014 | Asher et al. |
| 2014/0148805 A1 | 5/2014 | Stewart et al. |
| 2014/0171942 A1 | 6/2014 | Werneth et al. |
| 2014/0194887 A1 | 7/2014 | Shenoy |
| 2014/0221967 A1 | 8/2014 | Childs et al. |
| 2014/0236137 A1 | 8/2014 | Tran et al. |
| 2014/0236144 A1 | 8/2014 | Krueger et al. |
| 2014/0243823 A1 | 8/2014 | Godara et al. |
| 2014/0243943 A1 | 8/2014 | Rao et al. |
| 2014/0257265 A1 | 9/2014 | Godara et al. |
| 2014/0257296 A1 | 9/2014 | Morgenstern Lopez |
| 2014/0271717 A1 | 9/2014 | Goshayeshgar et al. |
| 2014/0275760 A1 | 9/2014 | Lee et al. |
| 2014/0276713 A1 | 9/2014 | Lee et al. |
| 2014/0276728 A1 | 9/2014 | Goshayeshgar et al. |
| 2014/0276744 A1 | 9/2014 | Arthur et al. |
| 2014/0288544 A1 | 9/2014 | Diederich et al. |
| 2014/0288546 A1 | 9/2014 | Sherman et al. |
| 2014/0296850 A1 | 10/2014 | Condie et al. |
| 2014/0303610 A1 | 10/2014 | McCarthy et al. |
| 2014/0303614 A1 | 10/2014 | McCarthy et al. |
| 2014/0316405 A1 | 10/2014 | Pellegrino et al. |
| 2014/0316413 A1 | 10/2014 | Burger et al. |
| 2014/0324051 A1 | 10/2014 | Pellegrino et al. |
| 2014/0330332 A1 | 11/2014 | Danek et al. |
| 2014/0336630 A1 | 11/2014 | Woloszko et al. |
| 2014/0336667 A1 | 11/2014 | Pellegrino et al. |
| 2014/0364842 A1 | 12/2014 | Werneth et al. |
| 2014/0371740 A1 | 12/2014 | Germain et al. |
| 2015/0005614 A1 | 1/2015 | Heggeness et al. |
| 2015/0005767 A1 | 1/2015 | Werneth et al. |
| 2015/0045783 A1 | 2/2015 | Edidin |
| 2015/0057658 A1 | 2/2015 | Sutton et al. |
| 2015/0065945 A1 | 3/2015 | Zarins et al. |
| 2015/0073515 A1 | 3/2015 | Turovskiy et al. |
| 2015/0105701 A1 | 4/2015 | Mayer et al. |
| 2015/0141876 A1 | 5/2015 | Diederich et al. |
| 2015/0157402 A1 | 6/2015 | Kunis et al. |
| 2015/0164546 A1 | 6/2015 | Pellegrino et al. |
| 2015/0196358 A1 | 7/2015 | Goshayeshgar |
| 2015/0216588 A1 | 8/2015 | Deem et al. |
| 2015/0231417 A1 | 8/2015 | Metcalf et al. |
| 2015/0272655 A1 | 10/2015 | Condie et al. |
| 2015/0273208 A1 | 10/2015 | Hamilton |
| 2015/0297246 A1 | 10/2015 | Patel et al. |
| 2015/0297282 A1 | 10/2015 | Cadouri |
| 2015/0320480 A1 | 11/2015 | Cosman, Jr. et al. |
| 2015/0335349 A1 | 11/2015 | Pellegrino et al. |
| 2015/0335382 A1 | 11/2015 | Pellegrino et al. |
| 2015/0342619 A1 | 12/2015 | Weitzman |
| 2015/0342660 A1 | 12/2015 | Nash |
| 2015/0342670 A1 | 12/2015 | Pellegrino et al. |
| 2015/0359586 A1 | 12/2015 | Heggeness |
| 2015/0374432 A1 | 12/2015 | Godara et al. |
| 2015/0374992 A1 | 12/2015 | Crosby et al. |
| 2015/0374995 A1 | 12/2015 | Foreman et al. |
| 2016/0000601 A1 | 1/2016 | Burger et al. |
| 2016/0001096 A1 | 1/2016 | Mishelevich |
| 2016/0002627 A1 | 1/2016 | Bennett et al. |
| 2016/0008593 A1 | 1/2016 | Cairns |
| 2016/0008618 A1 | 1/2016 | Omar-Pasha |

(56) References Cited

U.S. PATENT DOCUMENTS

| | | |
|---|---|---|
| 2016/0008628 A1 | 1/2016 | Morries et al. |
| 2016/0016012 A1 | 1/2016 | Youn et al. |
| 2016/0022988 A1 | 1/2016 | Thieme et al. |
| 2016/0022994 A1 | 1/2016 | Moffitt et al. |
| 2016/0024208 A1 | 1/2016 | MacDonald et al. |
| 2016/0029930 A1 | 2/2016 | Plumley et al. |
| 2016/0030276 A1 | 2/2016 | Spanyer |
| 2016/0030408 A1 | 2/2016 | Levin |
| 2016/0030748 A1 | 2/2016 | Edgerton et al. |
| 2016/0030765 A1 | 2/2016 | Towne et al. |
| 2016/0045207 A1 | 2/2016 | Kovacs et al. |
| 2016/0045256 A1 | 2/2016 | Godara et al. |
| 2016/0051831 A1 | 2/2016 | Lundmark et al. |
| 2016/0059007 A1 | 3/2016 | Koop |
| 2016/0074068 A1 | 3/2016 | Patwardhan |
| 2016/0074133 A1 | 3/2016 | Shikhman et al. |
| 2016/0074279 A1 | 3/2016 | Shin |
| 2016/0074661 A1 | 3/2016 | Lipani |
| 2016/0081716 A1 | 3/2016 | Boling et al. |
| 2016/0081810 A1 | 3/2016 | Reiley et al. |
| 2016/0095721 A1 | 4/2016 | Schell et al. |
| 2016/0106443 A1 | 4/2016 | Kuntz et al. |
| 2016/0106985 A1 | 4/2016 | Zhu |
| 2016/0106994 A1 | 4/2016 | Crosby et al. |
| 2016/0113704 A1 | 4/2016 | Godara et al. |
| 2016/0115173 A1 | 4/2016 | Bois et al. |
| 2016/0136310 A1 | 5/2016 | Bradford et al. |
| 2016/0144182 A1 | 5/2016 | Bennett et al. |
| 2016/0144187 A1 | 5/2016 | Caparso et al. |
| 2016/0158551 A1 | 6/2016 | Kent et al. |
| 2016/0166302 A1 | 6/2016 | Tan-Malecki et al. |
| 2016/0166835 A1 | 6/2016 | De Ridder |
| 2016/0175586 A1 | 6/2016 | Edgerton et al. |
| 2016/0199097 A1 | 7/2016 | Linderman et al. |
| 2016/0199117 A1 | 7/2016 | Druma |
| 2016/0213927 A1 | 7/2016 | McGee et al. |
| 2016/0220317 A1 | 8/2016 | Shikhman et al. |
| 2016/0220393 A1 | 8/2016 | Slivka et al. |
| 2016/0220638 A1 | 8/2016 | Dony et al. |
| 2016/0220672 A1 | 8/2016 | Chalasani et al. |
| 2016/0228131 A1 | 8/2016 | Brockman et al. |
| 2016/0228696 A1 | 8/2016 | Imran et al. |
| 2016/0235471 A1 | 8/2016 | Godara et al. |
| 2016/0235474 A1 | 8/2016 | Prisco et al. |
| 2016/0243353 A1 | 8/2016 | Ahmed |
| 2016/0246944 A1 | 8/2016 | Jain et al. |
| 2016/0250469 A1 | 9/2016 | Kim et al. |
| 2016/0250472 A1 | 9/2016 | Carbunaru |
| 2016/0262830 A1 | 9/2016 | Werneth et al. |
| 2016/0262904 A1 | 9/2016 | Schaller et al. |
| 2016/0271405 A1 | 9/2016 | Angara et al. |
| 2016/0278791 A1 | 9/2016 | Pellegrino et al. |
| 2016/0278846 A1 | 9/2016 | Harrison et al. |
| 2016/0278861 A1 | 9/2016 | Ko |
| 2016/0279190 A1 | 9/2016 | Watts et al. |
| 2016/0279408 A1 | 9/2016 | Grigsby et al. |
| 2016/0279411 A1 | 9/2016 | Rooney et al. |
| 2016/0279441 A1 | 9/2016 | Imran |
| 2016/0296739 A1 | 10/2016 | Cleveland |
| 2016/0302925 A1 | 10/2016 | Keogh et al. |
| 2016/0302936 A1 | 10/2016 | Billon et al. |
| 2016/0310739 A1 | 10/2016 | Burdick et al. |
| 2016/0317053 A1 | 11/2016 | Srivastava |
| 2016/0317211 A1 | 11/2016 | Harrison et al. |
| 2016/0317621 A1 | 11/2016 | Bright |
| 2016/0324541 A1 | 11/2016 | Pellegrino et al. |
| 2016/0324677 A1 | 11/2016 | Hyde et al. |
| 2016/0325100 A1 | 11/2016 | Lian et al. |
| 2016/0339251 A1 | 11/2016 | Kent et al. |
| 2016/0354093 A1 | 12/2016 | Pellegrino et al. |
| 2016/0354233 A1 | 12/2016 | Sansone et al. |
| 2016/0367797 A1 | 12/2016 | Eckermann |
| 2016/0367823 A1 | 12/2016 | Cowan et al. |
| 2016/0375259 A1 | 12/2016 | Davis et al. |
| 2017/0000501 A1 | 1/2017 | Aho et al. |
| 2017/0001026 A1 | 1/2017 | Schwarz et al. |
| 2017/0007277 A1 | 1/2017 | Drapeau et al. |
| 2017/0014169 A1 | 1/2017 | Dean et al. |
| 2017/0027618 A1 | 2/2017 | Lee et al. |
| 2017/0028198 A1 | 2/2017 | Degiorgio et al. |
| 2017/0028201 A1 | 2/2017 | Howard |
| 2017/0035483 A1 | 2/2017 | Crainich et al. |
| 2017/0036009 A1 | 2/2017 | Hughes et al. |
| 2017/0036025 A1 | 2/2017 | Sachs et al. |
| 2017/0036033 A9 | 2/2017 | Perryman et al. |
| 2017/0042834 A1 | 2/2017 | Westphal et al. |
| 2017/0049500 A1 | 2/2017 | Shikhman et al. |
| 2017/0049503 A1 | 2/2017 | Cosman |
| 2017/0049507 A1 | 2/2017 | Cosman |
| 2017/0049513 A1 | 2/2017 | Cosman |
| 2017/0050017 A1 | 2/2017 | Cosman |
| 2017/0050021 A1 | 2/2017 | Cosman |
| 2017/0050024 A1 | 2/2017 | Bhadra et al. |
| 2017/0056028 A1 | 3/2017 | Germain et al. |
| 2017/0065329 A1 | 3/2017 | Benamou et al. |
| 2017/0112507 A1 | 4/2017 | Crainich et al. |
| 2017/0119461 A1 | 5/2017 | Godara et al. |
| 2017/0128080 A1 | 5/2017 | Torrie |
| 2017/0128112 A1 | 5/2017 | Germain |
| 2017/0135742 A1 | 5/2017 | Lee et al. |
| 2017/0164998 A1 | 6/2017 | Klimovitch |
| 2017/0172650 A1 | 6/2017 | Germain |
| 2017/0181788 A1 | 6/2017 | Dastjerdi et al. |
| 2017/0202613 A1 | 7/2017 | Pellegrino et al. |
| 2017/0238943 A1 | 8/2017 | Sennett et al. |
| 2017/0246481 A1 | 8/2017 | Mischelevich |
| 2017/0266419 A1 | 9/2017 | Goshayeshgar |
| 2017/0303983 A1 | 10/2017 | Linderman et al. |
| 2017/0312007 A1 | 11/2017 | Harlev et al. |
| 2017/0333052 A1 | 11/2017 | Ding et al. |
| 2018/0021048 A1 | 1/2018 | Pellegrino et al. |
| 2018/0042656 A1 | 2/2018 | Edidin |
| 2018/0055539 A1 | 3/2018 | Pellegino |
| 2018/0103964 A1 | 4/2018 | Patel et al. |
| 2018/0140245 A1 | 5/2018 | Videman |
| 2018/0153604 A1 | 6/2018 | Ayvazyan et al. |
| 2018/0161047 A1 | 6/2018 | Purdy et al. |
| 2018/0193088 A1 | 7/2018 | Sutton et al. |
| 2018/0303509 A1 | 10/2018 | Germain et al. |
| 2019/0029698 A1 | 1/2019 | Pellegrino et al. |
| 2019/0038296 A1 | 2/2019 | Pellegrino |
| 2019/0038343 A1 | 2/2019 | Sutton et al. |
| 2019/0038344 A1 | 2/2019 | Pellegrino |
| 2019/0038345 A1 | 2/2019 | Pellegrino |
| 2019/0090933 A1 | 3/2019 | Pellegrino et al. |
| 2019/0110833 A1 | 4/2019 | Pellegrino et al. |
| 2019/0118003 A1 | 4/2019 | Diederich et al. |
| 2019/0118004 A1 | 4/2019 | Diederich et al. |
| 2019/0118005 A1 | 4/2019 | Diederich et al. |
| 2019/0175252 A1 | 6/2019 | Heggeness |
| 2019/0216486 A1 | 7/2019 | Weitzman |
| 2019/0282268 A1 | 9/2019 | Pellegrino et al. |
| 2019/0290296 A1 | 9/2019 | Patel et al. |
| 2019/0298392 A1 | 10/2019 | Capote et al. |
| 2019/0365416 A1 | 12/2019 | Brockman et al. |
| 2020/0000480 A1 | 1/2020 | Alambeigi et al. |
| 2020/0022709 A1 | 1/2020 | Burger et al. |
| 2020/0022749 A1 | 1/2020 | Malkevich et al. |
| 2020/0030601 A1 | 1/2020 | Molnar et al. |
| 2020/0060695 A1 | 2/2020 | Purdy et al. |
| 2020/0060747 A1 | 2/2020 | Edidin |
| 2020/0069920 A1 | 3/2020 | Goshayeshgar |
| 2020/0078083 A1 | 3/2020 | Sprinkle et al. |
| 2020/0138454 A1 | 5/2020 | Patel et al. |
| 2020/0146743 A1 | 5/2020 | Defosset et al. |
| 2020/0146744 A1 | 5/2020 | Defosset et al. |
| 2020/0179033 A1 | 6/2020 | Banamou et al. |
| 2020/0214762 A1 | 7/2020 | Pellegrino et al. |
| 2020/0281646 A1 | 9/2020 | Pellegrino et al. |
| 2020/0352639 A1* | 11/2020 | Batchelor .......... A61B 18/1233 |
| 2020/0390493 A1 | 12/2020 | Orczy-Timko et al. |
| 2020/0405499 A1 | 12/2020 | Gerbec et al. |
| 2021/0022814 A1 | 1/2021 | Crawford et al. |
| 2021/0077170 A1 | 3/2021 | Wiersdorf et al. |

(56) References Cited

U.S. PATENT DOCUMENTS

| | | | |
|---|---|---|---|
| 2021/0093373 A1 | 4/2021 | Dastjerdi et al. | |
| 2021/0113238 A1 | 4/2021 | Donovan et al. | |
| 2021/0145416 A1 | 5/2021 | Godara et al. | |
| 2021/0177502 A1 | 6/2021 | Wright et al. | |
| 2021/0220043 A1* | 7/2021 | Iranitalab | A61B 18/1492 |
| 2021/0290254 A1 | 9/2021 | Serrahima Tornel et al. | |
| 2021/0361350 A1 | 11/2021 | Pellegrino et al. | |
| 2021/0361351 A1 | 11/2021 | Pellegrino et al. | |
| 2021/0369323 A1 | 12/2021 | Edidin | |
| 2021/0386491 A1 | 12/2021 | Shmayahu et al. | |
| 2021/0401496 A1 | 12/2021 | Purdy et al. | |
| 2022/0022930 A1 | 1/2022 | Brockman et al. | |
| 2022/0031390 A1 | 2/2022 | Ebersole et al. | |
| 2022/0096143 A1 | 3/2022 | Godara et al. | |
| 2022/0110639 A1 | 4/2022 | Brockman et al. | |
| 2022/0192702 A1 | 6/2022 | Donovan et al. | |
| 2022/0192722 A1 | 6/2022 | Harshman et al. | |
| 2022/0202471 A1 | 6/2022 | Schepis et al. | |
| 2022/0218411 A1 | 7/2022 | Druma et al. | |
| 2022/0218434 A1 | 7/2022 | Druma | |
| 2022/0240916 A1 | 8/2022 | Jung et al. | |
| 2022/0296255 A1 | 9/2022 | Patel et al. | |
| 2022/0401114 A1 | 12/2022 | Marino et al. | |
| 2023/0046328 A1 | 2/2023 | Weitzman et al. | |
| 2023/0138303 A1 | 5/2023 | Pellegrino et al. | |
| 2023/0172656 A1 | 6/2023 | Druma | |
| 2023/0255676 A1 | 8/2023 | Donovan et al. | |

FOREIGN PATENT DOCUMENTS

| | | |
|---|---|---|
| AU | 2008249202 | 9/2003 |
| AU | 2011218612 | 9/2003 |
| AU | 2009296474 | 9/2009 |
| AU | 2015234376 | 9/2009 |
| AU | 2018223007 | 9/2009 |
| AU | 2011204278 | 1/2011 |
| AU | 2012362524 | 12/2012 |
| AU | 2013337680 | 11/2013 |
| AU | 2012244378 B2 | 5/2015 |
| AU | 2019201705 | 3/2019 |
| AU | 2019206037 | 7/2019 |
| AU | 2020201962 | 3/2020 |
| AU | 2021200382 | 1/2021 |
| AU | 2020346827 | 3/2022 |
| AU | 2021306313 | 1/2023 |
| AU | 2023204019 | 6/2023 |
| AU | 2021409967 | 7/2023 |
| AU | 2022239314 | 9/2023 |
| CA | 2397413 | 2/2001 |
| CA | 2723071 | 2/2001 |
| CA | 2443491 | 9/2003 |
| CA | 2737374 | 9/2009 |
| CA | 2957010 | 9/2009 |
| CA | 2785207 | 1/2011 |
| CA | 2889478 | 11/2013 |
| CA | 3093398 | 9/2020 |
| CA | 3150339 | 3/2022 |
| CA | 3202650 | 6/2023 |
| CA | 3211365 | 9/2023 |
| EP | 0040658 | 12/1981 |
| EP | 0584959 | 3/1994 |
| EP | 0597463 | 5/1994 |
| EP | 0880938 | 12/1998 |
| EP | 1013228 | 6/2000 |
| EP | 1059067 | 12/2000 |
| EP | 1059087 | 12/2000 |
| EP | 1905397.4 | 2/2001 |
| EP | 7010394 | 2/2001 |
| EP | 7010581.2 | 2/2001 |
| EP | 7010649.7 | 2/2001 |
| EP | 10012521 | 2/2001 |
| EP | 16197060.3 | 2/2001 |
| EP | 3256168 | 9/2003 |
| EP | 5021597.9 | 9/2003 |
| EP | 10012523.6 | 9/2003 |
| EP | 1402821 A2 | 3/2004 |
| EP | 1402838 A1 | 3/2004 |
| EP | 1652486 A1 | 5/2006 |
| EP | 1641406 B1 | 3/2007 |
| EP | 1294323 B1 | 4/2007 |
| EP | 1832244 A2 | 9/2007 |
| EP | 1938765 A1 | 7/2008 |
| EP | 9816892.5 | 9/2009 |
| EP | 1471836 B1 | 4/2010 |
| EP | 11732213.1 | 1/2011 |
| EP | 2438876 A1 | 4/2012 |
| EP | 1968472 B1 | 2/2013 |
| EP | 13852217.2 | 11/2013 |
| EP | 1824424 B1 | 1/2014 |
| EP | 2785260 | 8/2015 |
| EP | 2965782 | 1/2016 |
| EP | 2508225 | 9/2016 |
| EP | 3078395 | 10/2016 |
| EP | 2205313 B1 | 11/2016 |
| EP | 3097946 | 11/2016 |
| EP | 2913081 | 1/2017 |
| EP | 2642931 B1 | 3/2017 |
| EP | 3187132 A1 | 7/2017 |
| EP | 18166323.8 | 4/2018 |
| EP | 19162385.9 | 3/2019 |
| EP | 2590579 B1 | 8/2019 |
| EP | 20161054.0 | 3/2020 |
| EP | 3057517 B1 | 4/2020 |
| EP | 2978373 B1 | 7/2021 |
| EP | 21912257.9 | 10/2021 |
| EP | 20862138.3 | 3/2022 |
| EP | 3410961 B1 | 11/2022 |
| EP | 22771962.2 | 9/2023 |
| HK | 8102841.9 | 2/2001 |
| HK | 8103900.5 | 2/2001 |
| HK | 17108246.6 | 2/2001 |
| HK | 12100034.4 | 9/2009 |
| HK | 13105656.9 | 1/2011 |
| HK | 16100183.9 | 11/2013 |
| HK | 19124269.2 | 5/2019 |
| IL | 220747 | 1/2011 |
| IL | 245665 | 1/2011 |
| IL | 238516 | 11/2013 |
| IL | 303851 | 6/2023 |
| JP | 53-139791 | 11/1978 |
| JP | 6-47058 | 2/1994 |
| JP | 10-290806 | 11/1998 |
| JP | 2001-037760 | 2/2001 |
| JP | 2001-556439 | 2/2001 |
| JP | 2003-341164 | 9/2003 |
| JP | 2009-269652 | 9/2003 |
| JP | 2012-246075 | 9/2003 |
| JP | 2005-169012 | 6/2005 |
| JP | 2011-529245 | 9/2009 |
| JP | 2015-010950 | 9/2009 |
| JP | 2016-201503 | 9/2009 |
| JP | 2012-548169 | 1/2011 |
| JP | 2013-1951 | 1/2011 |
| JP | 2015-540810 | 11/2013 |
| JP | 2017-156808 | 11/2013 |
| JP | 2018-088547 | 5/2018 |
| JP | 2018-232891 | 12/2018 |
| JP | 2021-026929 | 2/2021 |
| JP | 2023-537522 | 6/2023 |
| JP | 2023-555601 | 9/2023 |
| KR | 2003-0017897 | 3/2003 |
| WO | WO96/36289 | 11/1996 |
| WO | WO98/27876 | 7/1998 |
| WO | WO98/34550 | 8/1998 |
| WO | WO99/19025 | 4/1999 |
| WO | WO99/44519 | 9/1999 |
| WO | WO99/48621 | 9/1999 |
| WO | WO00/21448 | 4/2000 |
| WO | WO00/33909 | 6/2000 |
| WO | WO00/49978 | 8/2000 |
| WO | WO00/56237 | 9/2000 |
| WO | WO00/67648 | 11/2000 |
| WO | WO00/67656 | 11/2000 |
| WO | WO01/01877 | 1/2001 |

(56) References Cited

FOREIGN PATENT DOCUMENTS

| | | |
|---|---|---|
| WO | WO01/45579 | 6/2001 |
| WO | WO01/57655 | 8/2001 |
| WO | WO 2002/05699 | 1/2002 |
| WO | WO 2002/05897 | 1/2002 |
| WO | WO 2002/026319 | 4/2002 |
| WO | WO 2002/28302 | 4/2002 |
| WO | WO 2002/054941 | 7/2002 |
| WO | WO 2002/067797 | 9/2002 |
| WO | WO 2002/096304 | 12/2002 |
| WO | WO 2006/044794 | 4/2006 |
| WO | WO 2007/001981 | 1/2007 |
| WO | WO2007/008954 | 1/2007 |
| WO | WO 2007/031264 | 3/2007 |
| WO | WO 2008/001385 | 1/2008 |
| WO | WO 2008/008522 | 1/2008 |
| WO | WO 2008/076330 | 6/2008 |
| WO | WO 2008/076357 | 6/2008 |
| WO | WO 2008/121259 | 10/2008 |
| WO | WO 2008/140519 | 11/2008 |
| WO | WO 2008/141104 | 11/2008 |
| WO | WO2008/144709 | 11/2008 |
| WO | WO 2009/042172 | 4/2009 |
| WO | WO 2009/076461 | 6/2009 |
| WO | PCT/US2009/058329 | 9/2009 |
| WO | WO 2009/124192 | 10/2009 |
| WO | WO 2009/155319 | 12/2009 |
| WO | WO 2010/111246 | 9/2010 |
| WO | WO 2010/135606 | 11/2010 |
| WO | PCT/US2011/020535 | 1/2011 |
| WO | WO 2011/041038 | 4/2011 |
| WO | WO 2012/024162 | 2/2012 |
| WO | WO 2012/065753 | 3/2012 |
| WO | WO 2012/074932 | 6/2012 |
| WO | PCT/US2012/071465 | 12/2012 |
| WO | WO 2013/009516 | 1/2013 |
| WO | WO 2013/134452 | 9/2013 |
| WO | PCT/US2013/068012 | 11/2013 |
| WO | WO 2013/168006 | 11/2013 |
| WO | WO 2013/180947 | 12/2013 |
| WO | WO 2014/004051 | 1/2014 |
| WO | WO 2014/130231 | 8/2014 |
| WO | WO 2014/141207 | 9/2014 |
| WO | WO 2014/165194 | 10/2014 |
| WO | WO 2014/176141 | 10/2014 |
| WO | WO 2015/038317 | 3/2015 |
| WO | WO 2015/047817 | 4/2015 |
| WO | WO 2015/066295 | 5/2015 |
| WO | WO 2015/066303 | 5/2015 |
| WO | WO 2015/079319 | 6/2015 |
| WO | WO 2015/148105 | 10/2015 |
| WO | WO 2014/145222 | 1/2016 |
| WO | WO 2014/145659 | 1/2016 |
| WO | WO 2014/146029 | 1/2016 |
| WO | WO 2016/033380 | 3/2016 |
| WO | WO 2016/048965 | 3/2016 |
| WO | WO 2014/197596 | 4/2016 |
| WO | WO 2014/210373 | 5/2016 |
| WO | WO 2016/069157 | 5/2016 |
| WO | WO 2016/075544 | 5/2016 |
| WO | WO 2015/024013 | 6/2016 |
| WO | WO 2016/090420 | 6/2016 |
| WO | WO 2016/105448 | 6/2016 |
| WO | WO 2016/105449 | 6/2016 |
| WO | WO 2015/044945 | 8/2016 |
| WO | WO 2015/057696 | 8/2016 |
| WO | WO 2015/060927 | 8/2016 |
| WO | WO 2016/127130 | 8/2016 |
| WO | WO 2016/130686 | 8/2016 |
| WO | WO 2016/134273 | 8/2016 |
| WO | WO 2011/157714 | 9/2016 |
| WO | WO 2016/148954 | 9/2016 |
| WO | WO 2016/154091 | 9/2016 |
| WO | WO 2016/168381 | 10/2016 |
| WO | WO 2016/209682 | 12/2016 |
| WO | WO 2017/009472 | 1/2017 |
| WO | WO2017/010930 | 1/2017 |
| WO | WO 2017/019863 | 2/2017 |
| WO | WO 2017/027703 | 2/2017 |
| WO | WO 2017/027809 | 2/2017 |
| WO | WO 2018/116273 | 6/2018 |
| WO | PCT/US2020/050249 | 9/2020 |
| WO | WO 2020/198150 | 10/2020 |
| WO | WO 2021/016699 A1 | 2/2021 |
| WO | PCT/US2021/040843 | 7/2021 |
| WO | PCT/US2021/82125 | 10/2021 |
| WO | PCT/US2022/019954 | 3/2022 |
| WO | WO 2022/066743 A2 | 3/2022 |
| WO | WO 2022/125875 A1 | 6/2022 |
| WO | WO 2022/191978 A1 | 9/2022 |
| WO | WO 2022/207105 A1 | 10/2022 |
| WO | WO 2023/009697 A1 | 2/2023 |
| WO | PCT/US2023/017913 | 4/2023 |

OTHER PUBLICATIONS

U.S. Appl. No. 10/401,854 U.S. Pat. No. 7,258,690, filed Mar. 28, 2003, Windowed Thermal Ablation Probe.
U.S. Appl. No. 11/745,446, filed May 7, 2007.
U.S. Appl. No. 12/643,997, filed Dec. 21, 2009.
U.S. Appl. No. 13/655,683 U.S. Pat. No. 8,882,764, filed Oct. 19, 2012, Thermal Denervation Devices.
U.S. Appl. No. 14/535,868 U.S. Pat. No. 9,848,944, filed Nov. 7, 2014, Thermal Denervation Devices and Methods.
U.S. Appl. No. 15/845,699, filed Dec. 18, 2017, Thermal Denervation Devices and Methods.
U.S. Appl. No. 16/153,407 U.S. Pat. No. 10,463,423, filed Oct. 5, 2018, Thermal Denervation Devices and Methods.
U.S. Appl. No. 10/260,879 U.S. Pat. No. 6,907,884, filed Sep. 30, 2002, Method of Straddling an Intraosseous Nerve.
U.S. Appl. No. 11/123,766 U.S. Pat. No. 7,749,218, filed May 6, 2005, Method of Straddling an Intraosseous Nerve.
U.S. Appl. No. 12/683,555 U.S. Pat. No. 8,613,744, filed Jan. 7, 2010, Systems and Methods for Navigating an Instrument Through Bone.
U.S. Appl. No. 13/612,561 U.S. Pat. No. 8,425,507, filed Sep. 12, 2012, Basivertebral Nerve Denervation.
U.S. Appl. No. 13/617,470 U.S. Pat. No. 8,623,014, filed Sep. 14, 2012, Systems for Denervation 0f Basivertebral Nerves.
U.S. Appl. No. 13/862,306 U.S. Pat. No. 8,628,528, filed Apr. 12, 2013, Vertebral Denervation.
U.S. Appl. No. 14/136,763 U.S. Pat. No. 9,023,038, filed Dec. 20, 2013, Denervation Methods.
U.S. Appl. No. 14/174,024 U.S. Pat. No. 9,017,325, filed Jan. 3, 2014, Nerve Modulation Systems.
U.S. Appl. No. 14/153,922 U.S. Pat. No. 9,173,676, filed Jan. 13, 2014, Nerve Modulation Systems.
U.S. Appl. No. 14/695,330 U.S. Pat. No. 9,421,064, filed Apr. 24, 2015, Nerve Modulation Systems.
U.S. Appl. No. 14/701,908, filed May 1, 2015, Denervation Methods.
U.S. Appl. No. 14/928,037 U.S. Pat. No. 10,028,753, filed Oct. 30, 2015, Spine Treatment Kits.
U.S. Appl. No. 15/241,523 U.S. Pat. No. 9,724,107, filed Aug. 19, 2016, Nerve Modulation Systems.
U.S. Appl. No. 15/669,399 U.S. Pat. No. 10,905,440, filed Aug. 4, 2017, Nerve Modulation Systems.
U.S. Appl. No. 16/152,834 U.S. Pat. No. 11,471,171, filed Oct. 5, 2018, Bipolar Radiofrequency Ablation Systems for Treatment Within Bone.
U.S. Appl. No. 16/156,850, filed Oct. 10, 2018, Systems for Treating Nerves Within Bone Using Steam.
U.S. Appl. No. 16/747,830, filed Jan. 21, 2020, Denervation Methods.
U.S. Appl. No. 18/451,539, filed Aug. 17, 2023, Systems for Treating Nerves Within Bone.
U.S. Appl. No. 13/612,541 U.S. Pat. No. 8,361,067, filed Sep. 12, 2012, Methods of Therapeutically Heating a Vertebral Body to Treat Back Pain.

(56) References Cited

OTHER PUBLICATIONS

U.S. Appl. No. 13/615,001 U.S. Pat. No. 8,419,731, filed Sep. 13, 2012, Methods of Treating Back Pain.
U.S. Appl. No. 13/615,300, filed Sep. 13, 2012, System for Heating a Vertebral Body to Treat Back Pain.
U.S. Appl. No. 13/862,317 U.S. Pat. No. 8,992,522, filed Apr. 12, 2013, Back Pain Treatment Methods.
U.S. Appl. No. 13/923,798 U.S. Pat. No. 8,992,522, filed Jun. 12, 2013, Vertebral Treatment.
U.S. Appl. No. 14/673,172 U.S. Pat. No. 9,486,279, filed Mar. 30, 2015, Intraosseous Nerve Treatment.
U.S. Appl. No. 15/344,284 U.S. Pat. No. 10,111,704, filed Nov. 4, 2016, Intraosseous Nerve Treatment.
U.S. Appl. No. 16/153,234 U.S. Pat. No. 10,478,246, filed Oct. 5, 2018, Ablation of Tissue Within Vertebral Body Involving Internal Cooling.
U.S. Appl. No. 16/153,242 U.S. Pat. No. 10,588,691, filed Oct. 5, 2018, Radiofrequency Ablation of Tissue Within a Vertebral Body.
U.S. Appl. No. 16/160,155 U.S. Pat. No. 11,596,468, filed Oct. 15, 2018, Intraosseous Nerve Treatment.
U.S. Appl. No. 16/818,092 U.S. Pat. No. 11,737,814, filed Mar. 13, 2020, Radiofrequency Ablation of Tissue Within a Vertebral Body.
U.S. Appl. No. 17/394,189 U.S. Pat. No. 11,701,168, filed Aug. 4, 2021, Radiofrequency Ablation of Tissue Within a Vertebral Body.
U.S. Appl. No. 17/394,166 U.S. Pat. No. 11,690,667, filed Aug. 4, 2021, Radiofrequency Ablation of Tissue Within a Vertebral Body.
U.S. Appl. No. 18/360,724, filed Jul. 27, 2023, Radiofrequency Ablation of Tissue Within a Vertebral Body.
U.S. Appl. No. 13/541,591 (Reissue of U.S. Pat. No. 7,749,218) U.S. Pat. No. Re. 46,356, filed Jul. 3, 2012, Method of Treating an Intraosseous Nerve.
U.S. Appl. No. 15/469,315 (Reissue of U.S. Pat. No. 7,749,218) U.S. Pat. No. Re. 48,460, filed Mar. 24, 2017, Method of Treating an Intraosseuos Nerve.
U.S. Appl. No. 16/153,598, filed Oct. 5, 2018, Method of Treating an Intraosseous Nerve.
U.S. Appl. No. 16/153,603, filed Oct. 5, 2018, Method of Treating an Intraosseous Nerve.
U.S. Appl. No. 17/193,491, filed Mar. 5, 2021, Method of Treating an Intraosseous Nerve.
U.S. Appl. No. 12/566,895 U.S. Pat. No. 8,419,730, filed Sep. 25, 2009, Systems and Methods for Navigating an Instrument Through Bone.
U.S. Appl. No. 13/963,767 U.S. Pat. No. 9,039,701, filed Aug. 9, 2013, Channeling Paths Into Bone.
U.S. Appl. No. 13/862,242 U.S. Pat. No. 9,259,241, filed Apr. 12, 2013, Systems for Accessing Nerves Within Bone.
U.S. Appl. No. 15/040,268 U.S. Pat. No. 10,265,099, filed Feb. 10, 2016, Systems for Accessing Nerves Within Bones.
U.S. Appl. No. 16/368,453, filed Mar. 28, 2019, Systems for Accessing Nerves Within Bones.
U.S. Appl. No. 12/868,818 U.S. Pat. No. 8,808,284, filed Aug. 26, 2010, Systems for Navigating an Instrument Through Bone.
U.S. Appl. No. 14/462,371 U.S. Pat. No. 9,265,522, filed Aug. 18, 2014, Methods for Navigating an Instrument Through Bone.
U.S. Appl. No. 13/543,712 U.S. Pat. No. 8,535,309, filed Jul. 6, 2012, Vertebral Bone Channeling Systems.
U.S. Appl. No. 13/543,723 U.S. Pat. No. 8,414,571, filed Jul. 6, 2012, Vertebral Bone Navigation Systems.
U.S. Appl. No. 13/543,721, filed Jul. 6, 2012, Intraosseous Nerve Denervation Methods.
U.S. Appl. No. 10/103,439 U.S. Pat. No. 6,736,835, filed Mar. 21, 2002, Novel Early Intervention Spinal Treatment Methods and Devices for Use Therein.
U.S. Appl. No. 14/369,661 U.S. Pat. No. 10,369,661, filed Jun. 27, 2014, Systems and Methods for Treating Back Pain.
U.S. Appl. No. 16/205,050 U.S. Pat. No. 11,471,210, filed Nov. 29, 2018, Methods of Denervating Vertebral Body Using External Energy Source.
U.S. Appl. No. 18/047,164, filed Oct. 17, 2022, Methods of Denervating Vertebral Body Using External Energy Source.
U.S. Appl. No. 14/440,050 U.S. Pat. No. 9,775,627, filed Apr. 30, 2015, Systems and Methods for Creating Curved Paths Through Bone and Modulating Nerves Within the Bone.
U.S. Appl. No. 15/722,392 U.S. Pat. No. 10,357,258, filed Oct. 2, 2017, Systems and Methods for Creating Curved Paths Through Bone and Modulating Nerves Within the Bone.
U.S. Appl. No. 16/370,264 U.S. Pat. No. 10,517,611, filed Mar. 29, 2019, Systems for Navigation and Treatment Within a Vertebral Body.
U.S. Appl. No. 16/717,985 U.S. Pat. No. 11,160,563, filed Dec. 17, 2019, Systems for Navigation and Treatment Within a Vertebral Body.
U.S. Appl. No. 17/488,116 U.S. Pat. No. 11,234,764, filed Sep. 28, 2021, Systems for Navigation and Treatment Within a Vertebral Body.
U.S. Appl. No. 17/488,111 U.S. Pat. No. 11,291,502, filed Sep. 28, 2021, Methods of Navigation and Treatment Within a Vertebral Body.
U.S. Appl. No. 17/657,864, filed Apr. 4, 2022, Methods of Navigation and Treatment Within a Vertebral Body.
U.S. Appl. No. 14/454,643 U.S. Pat. No. 9,724,151, filed Aug. 7, 2014, Modulating Nerves Within Bone Using Bone Fasteners.
U.S. Appl. No. 15/669,292 U.S. Pat. No. 10,456,187, filed Aug. 4, 2017, Modulating Nerves Within Bone Using Bone Fasteners.
U.S. Appl. No. 16/661,271 U.S. Pat. No. 11,065,046, filed Oct. 23, 2019, Modulating Nerves Within Bone Using Bone Fasteners.
U.S. Appl. No. 17/378,457, filed Jul. 16, 2021, Modulating Nerves Within Bone.
U.S. Appl. No. 17/138,203 U.S. Pat. No. 11,123,103, filed Dec. 30, 2020, Introducer Systems for Bone Access.
U.S. Appl. No. 17/138,234 U.S. Pat. No. 11,007,010, filed Dec. 30, 2020, Curved Bone Access Systems.
U.S. Appl. No. 17/302,949 U.S. Pat. No. 11,202,655, filed Mar. 17, 2021, Accessing and Treating Tissue Within a Vertical Body.
U.S. Appl. No. 17/303,254 U.S. Pat. No. 11,426,199, filed May 25, 2021, Methods of Treating a Vertebral Body.
U.S. Appl. No. 17/303,267 U.S. Pat. No. 11,207,100, filed May 25, 2021, Methods of Detecting and Treating Back Pain.
U.S. Appl. No. 17/645,658, filed Dec. 22, 2021, Methods of Detecting and Treating Back Pain.
U.S. Appl. No. 17/822,700, filed Aug. 26, 2022, Methods of Treating a Vertebral Body.
U.S. Appl. No. 18/003,760, filed Dec. 29, 2022, Vertebral Denervation in Conjunction With Vertebral Fusion.
U.S. Appl. No. 17/449,051, filed Sep. 27, 2021, Introducer Drill.
U.S. Appl. No. 18/258,734, filed Jun. 21, 2023, Prediction of Candidates for Spinal Neuromodulation.
U.S. Appl. No. 18/339,007, filed Jun. 21, 2023, Prediction of Candidates for Spinal Neuromodulation.
U.S. Appl. No. 18/550,040, filed Sep. 11, 2023, Robotic Spine Systems and Robotic-Assisted Methods for Tissue Modulation.
A Novel Approach for Treating Chronic Lower Back Pain Abstract for Presentation at North American Spine Society 26th Annual Meeting in Chicago IL on Nov. 4, 2011.
Antonacci M. Darryl et al.; Innervation of the Human Vertebral Body: A Histologic Study; Journal of Spinal Disorder vol. 11 No. 6 pp. 526-531 1998 Lippincott Williams & Wilkins Philadelphia.
Arnoldi Carl C.; Intraosseous Hypertension—A Possible Cause of Low Back Pain?; Clinical Orthopedics and Related Research No. 115 Mar.-Apr. 1976.
Bailey, Jeannie F., "Innervation Patterns of PGP 9.5-Positive Nerve Fibers within the Human Lumbar Vertebra," Journal of Anatomy, (2011) 218, pp. 263-270, San Francisco, California.
Becker, Stephan, et al., "Ablation of the basivertebral nerve for treatment of back pain: a clinical study," The Spine Journal, vol. 17, pp. 218-223 (Feb. 2017).
Bergeron et al. "Fluoroscopic-guided radiofrequency ablation of the basivertebral nerve: application and analysis with multiple imaging modalities in an ovine model" Thermal Treatment of Tissue: Energy Delivery and Assessment III edited by Thomas P. Ryan Proceedings of SPIE vol. 5698 (SPIE Bellingham WA 2005) pp. 156-167.

(56) References Cited

OTHER PUBLICATIONS

Bogduk N. The anatomy of the lumbar intervertebral disc syndrome Med J. Aust. 1976 vol. 1 No. 23 pp. 878-881.
Bogduk Nikolai et al.; Technical Limitations to the efficacy of Radiofrequency Neurotomy for Spinal Pain; Neurosurgery vol. 20 No. 4 1987.
Caragee, EG et al.; "Discographic, MRI and psychosocial determinants of low back pain disability andremission: A prospective study in subjects with benign persistent back pain", The Spine Journal: The Official Journal of the North American Spine Society, vol. 5(1), pp. 24-35 (2005).
Choy Daniel SS.J. et al.; Percutaneous Laser Disc Decompression A New Therapeutic Modality; SPINE vol. 17 No. 8 1992.
Cosman E.R. et al. Theoretical Aspects of Radiofrequency Lesions in the Dorsal Root Entry Zone. Neurosurgery vol. 1 No. 6 1984 pp. 945-950.
Deardorff Dana L. et al.; Ultrasound applicators with internal cooling for interstitial thermal therapy; SPIE vol. 3594 1999.
Deramond H. et al. Temperature Elevation Caused by Bone Cement Polymerization During Vertebroplasty Bone Aug. 1999 pp. 17S-21S vol. 25 No. 2 Supplement.
Diederich C. J. et al. "IDTT Therapy in Cadaveric Lumbar Spine: Temperature and thermal dosedistributions Thermal Treatment of Tissue: Energy Delivery and Assessment" Thomas P. Ryan Editor Proceedings of SPIE vol. 4247:104-108 (2001).
Diederich Chris J. et al.; Ultrasound Catheters for Circumferential Cardiac Ablation; SPIE vol. 3594 (1999).
Dupuy D.E. et al. Radiofrequency ablation of spinal tumors: Temperature distribution in the spinal canal AJR vol. 175 pp. 1263-1266 Nov. 2000.
Dupuy Damian E.; Radiofrequency Ablation: An Outpatient Percutaneous Treatment; Medicine and Health/Rhode Island vol. 82 No. Jun. 6, 1999.
Esses Stephen I. et al.; Intraosseous Vertebral Body Pressures; SPINE vol. 17 No. 6 Supplement 1992.
FDA Response to 510(k) Submission by Relievant Medsystems Inc. submitted on Sep. 27, 2007 (date stamped on Oct. 5, 2007) and associated documents.
Fields, AJ et al; "Innervation of pathologies in the lumbar vertebral endplate and intervertebral disc", The Spine Journal: Official Journal of the North American Spine Society, vol. 14(3), pp. 513-521 (2014).
Fields, Aaron J. et al.; "Cartilage endplate damage strongly associates with chronic low back pain,independent of modic changes", Abstract form Oral Presentation at the ISSLS Annual Meeting in Banff, Canada (May 14-18, 2018).
Fischgrund JS, et al.; "Intraosseous Basivertebral Nerve Ablation for the Treatment of Chronic LowBack Pain: 2-Year Results from a Prospective Randomized Double-Blind Sham-Controlled Multicenter Study", International Journal of Spine Surgery, vol. 13 (2), pp. 110-119 (2019).
Fras M.D., Christian et al., "Substance P-containing Nerves within the Human Vertebral Body: An Immunohistochemical Study of the Basivertebral Nerve", The Spine Journal 3, 2003, pp. 63-67.
Gehl J. "Electroporation: theory and methods perspectives for drug delivery gene therapy and research" Acta Physiol. Scand. vol. 177 pp. 437-447 (2003).
Goldberg S.N. et al. Tissue ablation with radiofrequency: Effect of probe size gauge duration and temperature on lesion vol. Acad. Radiol. vol. 2 pp. 399-404 (1995).
Gornet, Matthew G et al.; "Magnetic resonance spectroscopy (MRS) can identify painful lumbar discsand may facilitate improved clinical outcomes of lumbar surgeries for discogenic pain", European Spine Journal, vol. 28, pp. 674-687 (2019).
Hanai Kenji et al.; Simultaneous Measurement of Intraosseous and Cerebrospinal Fluid Pressures in the Lumbar Region; SPINE vol. 10 No. 1 1985.
Heggeness Michael H. et al. The Trabecular Anatomy of Thoracolumbar Vertebrae: Implications for Burst Fractures Journal of Anatomy 1997 pp. 309-312 vol. 191 Great Britain.
Heggeness Michael H. et al. Discography Causes End Plate Deflection; SPINE vol. 18 No. 8 pp. 1050-1053 1993 J.B. Lippincott Company.
Heggeness, M. et al Ablation of the Basivertebral Nerve for the Treatment of Back Pain: A PilotClinical Study; The Spine Journal, 2011, vol. 11, Issue 10, Supplement, pp. S65-S66, ISSN 1529-9430.
Hoopes et al. "Radiofrequency Ablation of the Basivertebral Nerve as a Potential Treatment of Back Pain: Pathologic Assessment in an Ovine Model" Thermal Treatment of Tissue: Energy Delivery and Assessment III edited by Thomas P. Ryan Proceedings of SPIE vol. 5698 (SPIE Bellingham WA 2005) pp. 168-180.
Houpt Jonathan C. et al.; Experimental Study of Temperature Distributions and Thermal Transport During Radiofrequency Current Therapy of the Intervertebral Disc; SPINE vol. 21 No. 15 pp. 1808-1813 1996 Lippincott-Raven Publishers.
Jourabchi, Natanel et al.; "Irreversible electroporation (NanoKnife) in cancer treatment," Gastrointestinal Intervention, vol. 3, pp. 8-18 (2014).
Khalil, J et al.; "A Prospective, Randomized, Multi-Center Study of Intraosseous Basivertebral Nerve Ablation for the Treatment of Chronic Low Back Pain", The Spine Journal (2019), available at https://doi.org/10.1016/jspinee.2019.05.598.
Kleinstueck Frank S. et al.; Acute Biomechanical and Histological Effects of IntradiscalElectrothermal Therapy on Human Lumbar Discs; SPINE vol. 26 No. 20 pp. 2198-2207; 2001 Lippincott Williams & Wilkins Inc.
Kopecky Kenyon K. et al. "Side-Exiting Coaxial Needle for Aspiration Biopsy"—AJR—1996; 167 pp. 661-662.
Kuisma M et al.; "Modic changes in endplates of lumbar vertebral bodies: Prevalence and associationwith low back and sciatic pain among middle-aged male workers", Spine, vol. 32(10), pp. 1116-1122 (2007).
Lehmann Justus F. et al.; Selective Heating Effects of Ultrasound in Human Beings; Archives of Physical Medicine & Rehabilitation Jun. 1966.
Letcher Frank S. et al.; The Effect of Radiofrequency Current and Heat on Peripheral Nerve Action Potential in the Cat; U.S. Naval Hospital Philadelphia PA. (1968).
Lotz JC, et al.; "The Role of the Vertebral End Plate in Low Back Pain", Global Spine Journal, vol. 3, pp. 153-164 (2013).
Lundskog Jan; Heat and Bone Tissue—/an experimental investigation of the thermal properties of bone tissue and threshold levels for thermal injury; Scandinavian Journal of Plastic and Reconstructive Surgery Supplemental 9 From the Laboratory of Experimental Biology Department of anatomy University of Gothenburg Gothenburg Sweden Goteborg 1972.
Martin J.B. et al. Vertebroplasty: Clinical Experience and Follow-up Results Bone Aug. 1999 pp. 11S-15S vol. 25 No. 2 Supplement.
Massad Malek M.D. et al.; Endoscopic Thoracic Sympathectomy: Evaluation of Pulsatile Laser Non-Pulsatile Laser and Radiofrequency-Generated Thermocoagulation; Lasers in Surgery and Medicine; 1991; pp. 18-25.
Mehta Mark et al.; The treatment of chronic back pain; Anaesthesia 1979 vol. 34 pp. 768-775.
Modic MT et al.; "Degenerative disk disease: assessment of changes in vertebral body marrow with MR imaging" Radiology vol. 166 pp. 193-199 (1988).
Mok, Florence et al.; "Modic changes of the lumbar spine: Prevalence, risk factors, and association with disc degeneration and low back pain in a large-scale population-based cohort", The Spine Journal: Official Journal of the North American Spine Society, vol. 16(1), pp. 32-41 (2016).
Nau William H. Ultrasound interstitial thermal therapy (USITT) in the prostate; SPIE vol. 3594 Jan. 1999.
Osteocool Pain Management Brochure, Baylis Medical, copyright 2011.
Pang, Henry et al,; The UTE Disc Sign on MRI: A Novel Imaging Biomarker Associated With Degenerative Spine Changes, Low Back Pain, and Disability, Spine, vol. 42 (Aug. 2017).
Radiological Society of North America. "Pulsed radiofrequency relieves acute back pain and sciatica." ScienceDaily. ScienceDaily, Nov. 27, 2018. <www.sciencedaily.com/releases/2018/11/181127092604.htm>.

(56) References Cited

OTHER PUBLICATIONS

Rashbaum Ralph F.; Radiofrequency Facet Denervation A Treatment alternative in Refractory Low Back Pain with or without Leg Pain; Orthopedic Clinics of North America—vol. 14 No. 3 Jul. 1983.

Rosenthal D.I. Seminars in Musculoskeletal Radiology vol. 1 No. 2. pp. 265-272 (1997).

Ryan et al. "Three-Dimensional Finite Element Simulations of Vertebral Body Thermal Treatment" Thermal Treatment of Tissue: Energy Delivery and Assessment III edited by Thomas P. Ryan Proceedings of SPIE vol. 5698 (SPIE Bellingham WA 2005) pp. 137-155.

Shealy C. Norman; Percutaneous radiofrequency denervation of spinal facets Treatment for chronic back pain and sciatica; Journal of Neurosurgery/vol. 43/Oct. 1975.

Sherman Mary S.; The Nerves of Bone The Journal of Bone and Joint Surgery Apr. 1963 pp. 522-528 vol. 45-A No. 3.

Solbiati L. et al. Hepatic metastases: Percutaneous radio-frequency ablation with cooled-tip electrodes. Interventional Radiology vol. 205 No. 2 pp. 367-373 (1997).

Stanton Terry "Can Nerve Ablation Reduce Chronic Back Pain ?" AAOS Now Jan. 2012.

The AVAmax System—Cardinal Health Special Procedures Lit. No. 25P0459-01—www.cardinal.com (copyright 2007).

Tillotson L. et al. Controlled thermal injury of bone: Report of a percutaneous technique using radiofrequency electrode and generator. Investigative Radiology Nov. 1989 pp. 888-892.

Troussier B. et al.; Percutaneous Intradiscal Radio-Frequency Thermocoagulation A Cadaveric Study; SPINE vol. 20 No. 15 pp. 1713-1718 1995 Lippincott-Raven Publishers.

Ullrich Jr. Peter F. "Lumbar Spinal Fusion Surgery" Jan. 9, 2013 Spine-Health (available via wayback machine Internet archive at http://web.archive.org/web/20130109095419/http://www/spine-health.com/treatment/spinal-fusion/lumbar-spinal-fusion-surgery).

Weishaupt, D et al,; "Painful Lumbar Disk Derangement: Relevance of Endplate Abnormalities at MR Imaging", Radiology, vol. 218(2), pp. 420-427 (2001).

YouTube Video, "DFINE-STAR Procedure Animation," dated Sep. 30, 2013, can be viewed at https://www.youtube.com/watch?v=YxtKNyc2e-0.

Kim et al., Transforaminal epiduroscopic basivertebral nerve laser ablation for chronic low back painassociated with Modic changes: A preliminary open-label study. Pain Research and Management 2018; https://pubmed.ncbi.nlm.nih.gov/30186540.

Rahme et al., The Modic vertebral endplate and marrow changes: pathologic significance and relationto low back pain and segmental instability of the lumbar spine. American Journal of Neuroradiology 29.5 (2008): 838-842; http://www.ajnr.org/content/29/5/838.

Macadaeg et al, A prospective single arm study of intraosseous basivertebral nerve ablation for thetreatment of chronic low back pain: 12-month results. North American Spine Society Journal; May 27, 2020, 8 pages.

Vadala et al., "Robotic Spine Surgery and Augmented Reality Systems: A State of the Art", Neurospine Epub Mar. 31, 2020; revised: Feb. 22, 2020; accepted: Feb. 24, 2020; retrieved on [Oct. 6, 2022]. Retrieved from the internet URL:https://www.ncbi.nlm.nih.gov/pmc/articles/PMC7136092/pdf/ns-2040060-030.pdf entire document.

\* cited by examiner

IMPEDANCE STOPPAGE MITIGATION DURING RADIOFREQUENCY TISSUE ABLATION PROCEDURES

CROSS-REFERENCE TO RELATED APPLICATIONS

This application claims priority to U.S. Provisional Application No. 63/277,100 filed Nov. 8, 2021, the entire content of which is hereby incorporated by reference herein.

FIELD

Described herein are various embodiments of systems and methods for preventing, mitigating, or reducing the occurrence of impedance-related stoppages during radiofrequency procedures (e.g., radiofrequency ablation treatment procedures), such as intraosseous nerve or basivertebral nerve ablation procedures for treatment or prevention of back pain or other tissue ablation, stimulation, or other modulation or modification procedures.

BACKGROUND

Radiofrequency energy has been used to ablate tissue at various locations within the body. For example, radiofrequency probes have been used to ablate tissue within the heart to treat atrial fibrillation. Radiofrequency probes have also been used to ablate nerves to facilitate treatment of facet joint pain or joint pain within the knees, shoulders, elbows, hips, or ankles.

SUMMARY

One of the characteristics of radiofrequency ablation procedures is that energy transfer between the electrode(s) of a radiofrequency energy delivery device (e.g., radiofrequency probe) and tissue is dependent on sufficient electrical and thermal tissue conductivity. If power output rises quickly or power output is affected due to anatomical differences or physiological conditions such as blood flow direction, blood flow rate and vascularity at an ablation location (e.g., within a vertebral body), the tissue around the electrode can become desiccated (e.g., charred). Desiccated tissue acts as an insulating "sleeve" around the electrode(s), which limits the transmission of further electrical or thermal energy and can limit any further extension of desired tissue destruction or the ablation zone. Desiccated tissue impedance is typically high, which can lead to an automated treatment stoppage if the tissue impedance triggers pre-set threshold impedance levels, thereby causing the radiofrequency generator to automatically stop the radiofrequency ablation procedure.

Radiofrequency ablation procedures may be performed to ablate different types of tissue (including nerve tissue, adipose tissue, muscle tissue). The procedures may be performed at various different locations on an external surface of a subject or within a subject. Procedures performed within a subject may be performed in a minimally invasive manner (e.g., via a percutaneous, laparoscopic, endoscopic, or intravascular approach) or in a more invasive manner (e.g., via an open surgical procedure). For example, Applicant's existing technology (the Intracept® procedure by Relievant® Medsystems, Inc.) offers a safe and effective minimally invasive procedure that targets the basivertebral nerve for the relief of chronic low back pain that originates at least partly from one or more endplates of one or more vertebral bodies. The Intracept® procedure involves application of radiofrequency energy from a radiofrequency generator using a bipolar radiofrequency energy delivery device (e.g., probe), wherein the applied radiofrequency energy is sufficient to ablate the basivertebral nerve within a vertebral body. The procedure may be performed in multiple different vertebral bodies sequentially or simultaneously (using a single radiofrequency energy delivery device or multiple radiofrequency energy delivery devices coupled to a single generator). The basivertebral nerve trunk may be ablated. Other intraosseous nerves within the vertebral body that innervate the endplates and/or intervertebral disc may also be targeted and ablated.

During the Intracept® procedure, as tissue desiccates, the radiofrequency generator ("RFG") monitors the rising tissue impedance during the treatment. If tissue impedance rises above the RFG's pre-set threshold impedance level (e.g., maximum tolerance level), the RFG may automatically stop radiofrequency energy delivery and halt the treatment. To continue the treatment, the physician or other clinical professional removes the radiofrequency probe from the patient, cleans the electrodes by wiping away any coagulum or char that might have formed. The physician or other clinical professional then reinserts and repositions the radiofrequency probe in the vertebral body at a target region (e.g., posterior 50% of the vertebral body). When the RFG obtains an impedance value within an acceptable range (e.g., below the pre-set threshold impedance level by a certain percentage or by a certain value), the RFG notifies the physician or other clinical professional that the system is ready to re-start radiofrequency energy delivery. Although impedance-based stoppages may be common and expected during an RF ablation, they can delay the overall duration of the procedure and frustrate the physician and/or other clinical professionals (especially if there are multiple stoppage occurrences during the same treatment procedure), further extending the time to complete the procedure.

Radiofrequency procedures may result in impedance-related stoppages based on tissue desiccation, or tissue charring. Embodiments of monitoring algorithms described herein may advantageously result in reducing the number of impedance-related stoppages (e.g., by reducing power based on monitored impedance and allowing the tissue to revascularize and/or rehydrate such that the tissue does not get to the point of charring or desiccation that results in impedance-related stoppages). In accordance with several embodiments, the systems and methods described herein advantageously prevent, mitigate, or reduce the likelihood of desiccation or charring, thereby preventing, mitigating, or reducing the likelihood of impedance-related stoppage during radiofrequency ablation procedures, which can result in shorter procedure times and reduced clinician intervention.

In accordance with several embodiments, a radiofrequency tissue ablation system configured to reduce occurrences of impedance-related stoppages of radiofrequency energy delivery during a radiofrequency tissue ablation procedure includes a radiofrequency probe comprising one or more electrodes and one or more temperature sensors. The system also includes a radiofrequency generator comprising a power source electrically coupled to the one or more electrodes and one or more processors operatively coupled to the power source and to the one or more temperature sensors. The one or more processors are configured to execute program instructions stored in memory of the radiofrequency generator that, when executed, cause the power source to deliver radiofrequency energy to the one or more electrodes, the radiofrequency energy being sufficient to provide controlled heating of tissue surrounding the one or more electrodes; and cause the radiofrequency generator to transition between a steady-state phase of operation and a triggered impedance-limiting phase of operation so as to reduce temperature and tissue impedance prior to initiation of an automated impedance-related stoppage of radiofrequency energy delivery during a radiofrequency tissue ablation procedure. In some embodiments, the radiofrequency energy generator is also configured to operate in an initial ramp phase prior to the steady state phase.

When operating in the steady-state phase, the one or more processors are configured to receive temperature measurements from the one or more temperature sensors, calculate a magnitude and a rate of change of tissue impedance based on signals received from the one or more electrodes, and automatically transition to the impedance-limiting phase of operation when one or more trigger criteria are met. When operating in the impedance-limiting phase, the one or more processors are configured to cause the power source to temporarily reduce power output to reduce temperature (e.g., to a lower threshold temperature lower than a set target temperature) and to ramp power output back up after the tissue has at least partially rehydrated for a certain duration of time (e.g., after temperature maintenance at the lower threshold temperature for a certain period of time). In some embodiments, the set target temperature is between 43 degrees Celsius and 100 degrees Celsius, between 43 degrees and 70 degrees Celsius, between 43 degrees Celsius and 67 degrees Celsius, between 50 degrees Celsius and 60 degrees Celsius, between 60 degrees Celsius and 65 degrees Celsius, between 60 degrees Celsius and 90 degrees Celsius, between 70 degrees Celsius and 100 degrees Celsius, overlapping ranges thereof, or any value within the recited ranges. The lower threshold temperature may be a value less than the set target temperature and within the same ranges of the set target temperature previously listed. The ramp rate may be between 0.01 degrees Celsius per second and 5 degrees Celsius per second (e.g., between 0.01 and 1, between 0.5 and 1.5, between 1 and 3, between 2.5 and 5, between 0.1 and 0.5, between 0.1 and 1.5, between 0.5 and 2, between 1 and 2.5, overlapping ranges thereof, or any value within the recited ranges).

In some instances, the radiofrequency probe includes two electrodes positioned along a distal end portion of the radiofrequency probe configured to operate as a bipolar pair of electrodes. The radiofrequency probe may include one or more electrodes configured to operate as a monopolar electrode. When in the steady-state phase of operation, the radiofrequency energy may have a frequency between 300 kHz and 800 kHz (e.g., between 350 kHz and 650 kHz, between 400 kHz and 600 kHz, between 500 kHz and 700 kHz, overlapping ranges thereof, or any value within the recited ranges) and may be applied for a duration sufficient to generate a controlled ablation zone to ablate tissue within the controlled ablation zone. In some embodiments, the duration is between 1 minute and 20 minutes (e.g., between 5 minutes and 15 minutes, between 5 minutes and 10 minutes, between 6 minutes and 8 minutes, between 10 minutes and 15 minutes, overlapping ranges thereof, or any value within the recited ranges).

In some embodiments, the controlled ablation zone has a maximum cross-sectional dimension of 35 mm.

In some embodiments, the controlled ablation zone has a maximum cross-sectional dimension of 30 mm.

In some embodiments, the controlled ablation zone has a maximum cross-sectional dimension of 25 mm.

In some embodiments, the controlled ablation zone has a maximum cross-sectional dimension of 20 mm, 15 mm, or 10 mm.

When in the steady-state phase of operation, a power level may be a power level sufficient to ablate tissue (e.g., between 0 and 20 Watts, greater than 0 Watts to 10 Watts, between 1 Watt and 8 Watts, between 2 Watts and 10 Watts, between 5 Watts and 15 Watts, between 8 Watts and 20 Watts, overlapping ranges thereof, or any value within the recited ranges). In the impedance-limiting phase, the power output may be reduced until a lower threshold temperature is reached. When in the impedance-limiting phase of operation, a power level may be reduced to a lower level at which impedance can be monitored but at which no significant radiofrequency energy is being delivered. The ramp up in power in the impedance-limiting phase of operation may not occur until after a dwell period once the lower threshold temperature has been reached.

In some embodiments, the signals received from the one or more electrodes are received at a certain interval (e.g., between 5 ms and 100 ms, between 5 ms and 20 ms, between 10 ms and 30 ms, between 20 ms and 40 ms, between 30 ms and 50 ms, between 40 ms and 60 ms, between 50 ms and 70 ms, between 60 ms and 80 ms, between 50 ms and 100 ms, overlapping ranges thereof, or any value within the recited ranges).

The system may include one or more access instruments configured to facilitate access to a target treatment location within a bone (e.g., a vertebral body), organ, or other external or internal target treatment location. The tissue to be ablated may be a basivertebral nerve or other intraosseous nerve within a vertebral body. The nerves may be nerves that innervate one or more endplates and/or intravertebral discs of the spine at one or more levels of the spine (e.g., cervical, thoracic, lumbar, sacral, or lumbosacral). Of course, the tissue may be another nerve or body tissue at other locations within other bones or outside of bones.

Calculation of the rate of change of tissue impedance may involve calculation of a rolling average of tissue impedance measurements over a particular time duration. The particular time duration may be between 25 ms and 20,000 ms (e.g., between 25 ms and 500 ms, between 50 ms and 1000 ms, between 500 ms and 10,000 ms, between 1000 ms and 20,000 ms, overlapping ranges thereof, or any value within the recited ranges). The particular time duration may alternatively be based on a number of Impedance measurement datapoints instead of directly being based on a time duration (e.g., 5 to 200 datapoints, 5 to 50 datapoints, 20 to 100 datapoints, 50 to 150 datapoints, 100 to 200 datapoints, overlapping ranges thereof, or any value within the recited ranges). The one or more trigger criteria can include at least one criterion based on rate of change of tissue impedance and/or at least one criterion based on the temperature.

In some embodiments, the one or more trigger criteria include a predetermined upper threshold rate of change of tissue impedance.

In some embodiments, the one or more trigger criteria have to be met for a certain number of data points or for a certain duration of time before the transition to the impedance-limiting phase of operation.

The certain number of data points may be between 1 and 50 (e.g., between 1 and 15, between 5 and 15, between 10 and 20, between 10 and 25, between 15 and 30, between 15 and 45, between 20 and 50, between 25 and 50, between 30 and 50, overlapping ranges thereof, or any value within the recited ranges). The certain duration of time may be between 5 ms and 5000 ms (e.g., between 5 ms and 100 ms, between 100 ms and 500 ms, between 250 ms and 750 ms, between 500 ms and 1000 ms, between 1000 ms and 2500 ms, between 1500 ms and 3000 ms, between 2000 ms and 4000 ms, between 2500 ms and 5000 ms, between 3000 ms and 5000 ms, between 4000 ms and 5000 ms, overlapping ranges thereof, or any value within the recited ranges).

When in the impedance-limiting phase of operation, the one or more processors may also be configured to continue to receive temperature measurements from the one or more temperature sensors and signals from the one or more electrodes to be used to calculate and monitor impedance.

The one or more processors may be configured to transition the radiofrequency generator back to the steady-state phase of operation after a pre-set target temperature has been reached following the ramp up in power in the impedance-limiting phase.

The system may include multiple radiofrequency probes operatively coupled to the radiofrequency generator that are configured to operate in the steady-state phase and the impedance-limiting phase and are controlled and monitored independently by the radiofrequency generator.

In accordance with several embodiments, a radiofrequency tissue ablation system configured to reduce occurrences of impedance-related stoppages of radiofrequency energy delivery during a radiofrequency tissue ablation procedure includes a radiofrequency probe comprising a plurality of electrodes and at least one temperature sensor. The system also includes a radiofrequency generator including a power source electrically coupled to the plurality of electrodes and one or more processors operatively coupled to the power source and to the at least one temperature sensor. The one or more processors are configured to execute program instructions that, when executed: cause the power source to deliver radiofrequency energy to the plurality of electrodes, the radiofrequency energy being sufficient to provide controlled heating of tissue surrounding the plurality of electrodes; and cause the radiofrequency generator to transition between a steady-state phase of operation and an impedance-limiting phase of operation so as to reduce temperature and tissue impedance prior to initiation of an automated impedance-related stoppage of radiofrequency energy delivery during a radiofrequency tissue ablation procedure.

When operating in the steady-state phase, the one or more processors are configured to: receive temperature measurements from the at least one temperature sensor; calculate a magnitude and a rate of change of tissue impedance based on signals received from the plurality of electrodes; and automatically transition to the impedance-limiting phase of operation when one or more trigger criteria are met. The one or more trigger criteria include at least one criterion based on the rate of change of tissue impedance.

When in the impedance-limiting phase of operation, the one or more processors are configured to cause the power source to temporarily reduce power output to reduce temperature to a lower threshold temperature and to ramp power output back up after achieving the lower threshold temperature.

In some embodiments, the radiofrequency generator is configured to provide radiofrequency energy having a frequency between 400 kHz and 600 kHz and to apply the radiofrequency energy for a duration sufficient to generate a controlled ablation zone to ablate tissue within the controlled ablation zone.

In some embodiments, the calculation of the rate of change of tissue impedance involves calculation of a rolling average of tissue impedance measurements over a particular time duration.

In some embodiments, the one or more trigger criteria include at least one criterion based on temperature and/or at least one criterion based on the rate of change of tissue impedance.

In accordance with several embodiments, a computer-implemented method to reduce occurrences of impedance-related stoppages of radiofrequency energy delivery by a radiofrequency generator during a radiofrequency tissue ablation procedure includes executing stored program instructions via one or more hardware processors. The stored program instructions may be configured to cause the generator to operate in a steady-state phase of operation after an initial ramp up of power output. When operating in the steady-state phase, the one or more hardware processors are configured to, upon execution of the program instructions, cause the radiofrequency generator to deliver radiofrequency energy to one or more electrodes of a radiofrequency probe sufficient to generate a controlled heating zone sufficient to ablate tissue surrounding the one or more electrodes. The one or more processors are configured to continuously receive temperature measurements from one or more temperature sensors positioned along the radiofrequency probe and to calculate a magnitude and a rate of change of tissue impedance based on signals received from the one or more electrodes. The one or more processors are further configured to, upon execution of the stored program instructions, cause the generator to automatically transition to an impedance-limiting phase of operation when one or more trigger criteria are met based, at least in part, on the temperature measurements and/or the calculated rate of change of tissue impedance.

When operating in the impedance-limiting phase, the one or more hardware processors are configured to, upon execution of stored program instructions, cause the generator to temporarily reduce power output (e.g., to a reduced power level) to maintain temperature at a lower threshold temperature than the set target temperature and then to ramp power output back up (e.g., to increase temperature to the set target temperature) after temperature reduction at the lower threshold temperature has been maintained (e.g., after at least partially rehydrating the tissue) for a certain time duration.

The signals received from the one or more electrodes may be signals indicative of current levels. The magnitude and the rate of change of tissue impedance may be calculated based on known voltage levels and on the received current signals (e.g., by application of Ohm's law). The calculation of the rate of change of tissue impedance may involve calculation of a rolling average of tissue impedance measurements over a particular time duration. The one or more trigger criteria may include a predetermined upper threshold value for temperature and/or a predetermined upper threshold value for rate of change of tissue impedance.

The method may also include executing stored program instructions via one or more hardware processors to cause the generator to transition back to the steady-state phase of operation after a set target temperature has been reached (e.g., as determined from temperature measurements received from the one or more temperature sensors) following ramping of the power output back up after temperature reduction at the lower threshold temperature level has been maintained for a certain time duration (e.g., after temperature reduction has achieved at least partial revascularization and/or rehydration of tissue for a certain time duration). In some embodiments, the generator is prevented from re-entering the impedance limiting phase for a period of time after transitioning back to the steady-state phase.

The power output reduction upon entry of the impedance-limiting phase may comprise a reduction of power to a power level that still allows calculation of the magnitude and the rate of change of tissue impedance. When in the impedance-limiting phase of operation, the one or more processors may be configured to continue to receive temperature measurements from the one or more temperature sensors and signals from the one or more electrodes to facilitate impedance calculations.

In accordance with several embodiments, a computer-implemented method to reduce occurrences of impedance-related stoppages of radiofrequency energy delivery by a radiofrequency generator during a radiofrequency tissue ablation procedure is provided. The method includes detecting trigger criteria indicative of a likely impedance-based stoppage. The trigger criteria include a predetermined upper threshold value for temperature and a predetermined upper threshold value for rate of change of tissue impedance. The method also includes causing the radiofrequency generator to automatically transition to an impedance-limiting phase of operation when the trigger criteria are detected.

The method may be performed by executing stored program instructions via one or more hardware processors. When operating in the impedance-limiting phase of operation, the one or more hardware processors may be configured to cause the radiofrequency generator to temporarily reduce power output to reduce temperature to a lower threshold temperature and then to ramp power output back up after the lower threshold temperature has been maintained for a certain dwell time duration.

In some embodiments, the trigger criteria are detected based on signals received from one or more electrodes of a radiofrequency probe delivering the radiofrequency energy from the radiofrequency generator and from signals received from one or more temperature sensors of the radiofrequency probe.

In some embodiments, the signals are indicative of current levels and the predetermined upper threshold value for rate of change of tissue impedance is calculated based on known voltage and the received signals indicative of current levels.

In some embodiments, the predetermined upper threshold value for rate of change of tissue impedance is between 2 and 100 ohms per second squared (e.g., between 2 and 50, between 5 and 15, between 10 and 40, between 15 and 45, between 5 and 25, between 10 and 30 between 40 and 60 between 50 and 75, between 60 and 100, between 75 and 100, overlapping ranges thereof, or any value within the recited ranges).

In some embodiments, the one or more trigger criteria have to be met for a certain number of data points or for a certain duration of time before the transition to the impedance-limiting phase of operation.

The certain number of data points may be between 1 and 50 (e.g., between 1 and 15, between 5 and 15, between 10 and 20, between 10 and 25, between 15 and 30, between 15 and 45, between 20 and 50, between 25 and 50, between 30 and 50, overlapping ranges thereof, or any value within the recited ranges). The certain duration of time may be between 5 ms and 5000 ms (e.g., between 5 ms and 100 ms, between 100 ms and 500 ms, between 250 ms and 750 ms, between 500 ms and 1000 ms, between 1000 ms and 2500 ms, between 1500 ms and 3000 ms, between 2000 ms and 4000 ms, between 2500 ms and 5000 ms, between 3000 ms and 5000 ms, between 4000 ms and 5000 ms, overlapping ranges thereof, or any value within the recited ranges).

In some embodiments, the calculation of the rate of change of tissue impedance involves calculation of a rolling average of tissue impedance measurements over a particular time duration.

The particular time duration may be between 25 ms and 20,000 ms (e.g., between 25 ms and 500 ms, between 50 ms and 1000 ms, between 500 ms and 10,000 ms, between 1000 ms and 20,000 ms, overlapping ranges thereof, or any value within the recited ranges). The particular time duration may alternatively be based on a number of impedance measurement datapoints instead of directly being based on a time duration (e.g., 5 to 200 datapoints, 5 to 50 datapoints, 20 to 100 datapoints, 50 to 150 datapoints, 100 to 200 datapoints, overlapping ranges thereof, or any value within the recited ranges). The one or more trigger criteria can include at least one criterion based on rate of change of tissue impedance and/or at least one criterion based on the temperature.

In some embodiments, the method further includes causing the generator to generate an output for display indicative that the impedance-limiting phase of operation has been initiated.

In some embodiments, the methods described herein do not involve calculation of the magnitude of the tissue impedance.

In some embodiments, the radiofrequency energy delivered is not sufficient to ablate but otherwise modulates (e.g., stimulates, denervates) the tissue.

In some embodiments, the radiofrequency energy delivered does not thermally heat the tissue but effects pulsed field ablation or electroporation.

In accordance with several embodiments, a method of treating back pain (e.g., chronic low back pain) by ablating a basivertebral nerve and/or other intraosseous nerves within one or more vertebral bodies includes inserting at least a distal end portion of a radiofrequency probe within a vertebral body of a subject. The distal end of the radiofrequency probe includes one or more electrodes (e.g., one, two, three, or more than three electrodes) and one or more temperature sensors (e.g., one, two, three, or more than three temperature sensors) electrically coupled to a radiofrequency generator. The method also includes applying power from the radiofrequency generator to the one or more electrodes to deliver radiofrequency energy sufficient to ablate a basivertebral nerve within the vertebral body. The radiofrequency generator is configured to operate in a steady-state phase of operation and a triggered impedance-limiting phase of operation so as to reduce occurrences of automatic impedance-related stoppages during delivery of the radiofrequency energy delivery. The radiofrequency generator may also be configured to operate in an initial ramp phase prior to operation in the steady state phase.

The radiofrequency generator is configured to transition to the impedance-limiting phase of operation when one or more trigger criteria are met based, at least in part, on monitoring of temperature measurements received from the one or more temperature sensors and/or on monitoring of a rate of change of tissue impedance calculated based on signals received from the one or more electrodes. When in the impedance-limiting phase of operation, the radiofrequency generator temporarily reduces power output to reduce temperature to a lower threshold temperature level (e.g., lower than a set target temperature level of the radiofrequency tissue ablation procedure) and then ramps power output back up after temperature reduction and maintenance at the lower threshold temperature level for a certain duration of time, which may allow the tissue to at least partially revascularize and/or rehydrate.

The radiofrequency generator may be configured to transition back to the steady-state phase of operation once a set target temperature has been reached following ramping of the power output back up after temperature reduction to the lower threshold temperature level. In some embodiments, the reduced power output is a power output level at which impedance may still be monitored.

The method may further include accessing the basivertebral nerve within the vertebral body by inserting one or more access instruments within the vertebral body. Inserting the distal end portion of the radiofrequency probe within the vertebral body may include inserting the distal end portion of the radiofrequency probe through at least one of the one or more access instruments.

In accordance with several embodiments, a method of treating back pain (e.g., chronic low back pain) by ablating a basivertebral nerve and/or other intraosseous nerves within one or more vertebral bodies includes inserting at least a distal end portion of a radiofrequency probe within a vertebral body of a subject. The distal end portion of the radiofrequency probe comprises one or more electrodes electrically coupled to a radiofrequency generator. The method also includes applying a thermally conductive gel or a high-viscosity material to at least partially surround the one or more electrodes. The method further includes applying power from the radiofrequency generator to the one or more electrodes to deliver radiofrequency energy sufficient to ablate a basivertebral nerve or other intraosseous nerves within the vertebral body. The thermally conductive gel or high-viscosity material is configured to facilitate directed and/or improved thermal conduction of heat generated by delivery of the radiofrequency energy by the one or more electrodes.

Applying the thermally conductive gel or high-viscosity material may be performed percutaneously after insertion of the distal end of the radiofrequency probe within the vertebral body. Applying the thermally conductive gel or high-viscosity material may alternatively be performed by applying the thermally conductive gel or high-viscosity material prior to insertion of the distal end of the radiofrequency probe within the vertebral body. Applying the thermally conductive gel or high-viscosity material may include coating the one or more electrodes with the thermally conductive gel or high-viscosity material.

The thermally conductive gel or high-viscosity material may completely surround the one or more electrodes (e.g., at least an active electrode of the one or more electrodes if multiple electrodes). Alternatively, the thermally conductive gel or high-viscosity material is positioned only on one side of the one or more electrodes so as to facilitate directed propagation of heat, and therefore, ablation in a particular direction as opposed to omnidirectional propagation of heat.

In accordance with several embodiments, a method of treating chronic low back pain by ablating a basivertebral nerve within one or more vertebral bodies includes inserting at least a distal end portion of a radiofrequency probe within a vertebral body of a subject. The distal end portion of the radiofrequency probe includes one or more electrodes electrically coupled to a radiofrequency generator. The method also includes applying a high-viscosity material to at least partially surround the one or more electrodes and applying power from the radiofrequency generator to the one or more electrodes to deliver radiofrequency energy sufficient to ablate a basivertebral nerve within the vertebral body. The high-viscosity material is configured to facilitate reduction of concentrated heat immediately surrounding the one or more electrodes during delivery of the radiofrequency energy by the one or more electrodes.

Applying the high-viscosity material may be performed percutaneously after insertion of the distal end of the radiofrequency probe within the vertebral body. Alternatively, applying the high-viscosity material may be performed by applying the high-viscosity material prior to insertion of the distal end portion of the radiofrequency probe within the vertebral body. Applying the high-viscosity material may comprise coating the one or more electrodes with the high-viscosity material. In some embodiments, the high-viscosity material completely surrounds the one or more electrodes.

Several embodiments of the invention have one or more of the following advantages: (i) increased treatment accuracy; (ii) increased efficacy and enhanced safety; (iii) increased efficiency as a result of fewer impedance-related stoppages during radiofrequency ablation procedures; (iv) shorter overall duration of radiofrequency ablation procedures; and/or (v) improved user experience and satisfaction.

For purposes of summarizing the disclosure, certain aspects, advantages, and novel features of embodiments of the disclosure have been described herein. It is to be understood that not necessarily all such advantages may be achieved in accordance with any particular embodiment of the disclosure provided herein. Thus, the embodiments disclosed herein may be embodied or carried out in a manner that achieves or optimizes one advantage or group of advantages as taught or suggested herein without necessarily achieving other advantages as may be taught or suggested herein.

The methods summarized above and set forth in further detail below describe certain actions taken by a practitioner; however, it should be understood that they can also include the instruction of those actions by another party. For example, actions such as "applying power" include "instructing the applying of power." Further aspects of embodiments of the disclosure will be discussed in the following portions of the specification. With respect to the drawings, elements from one figure may be combined with elements from the other figures.

BRIEF DESCRIPTION OF THE DRAWINGS

Several embodiments of the disclosure will be more fully understood by reference to the following drawings which are for illustrative purposes only.

DETAILED DESCRIPTION

Several embodiments described herein are directed to systems and methods for preventing, mitigating, or reducing the likelihood of occurrence of, impedance-related stoppages during a radiofrequency tissue ablation procedure or other tissue modification procedure or tissue modulation procedure. In some embodiments, an intraosseous nerve (e.g., basivertebral nerve) within a bone (e.g., vertebral body) of the spine is accessed so as to facilitate treatment, or prevention of, back pain (e.g., chronic low back pain originating from one or more vertebral bodies (e.g., nerves innervating one or more endplates and/or discs of one or more vertebral bodies) or other ailments or conditions associated with the spine (e.g., vertebral fractures, spinal tumors, scoliosis, spondylosis). The vertebral body may be located in any level of the vertebral column (e.g., cervical, thoracic, lumbar and/or sacral). Multiple vertebral bodies may be accessed in a single visit or procedure (simultaneously or sequentially). The multiple vertebral bodies may be located in a single spine segment (e.g., two adjacent vertebral bodies in the sacral spine segment (e.g., S1 and S2) or lumbar spine segment (e.g., L3, L4 and/or L5) or thoracic spine segment or cervical spine segment) or in different spine segments (e.g., an L5 vertebra in the lumbar spine segment and an S1 vertebra in the sacral spine segment).

Although described primarily in connection with procedures for the treatment within the spine, the systems and methods may also be used for radiofrequency tissue ablation procedures intended to treat ailments or conditions other than those associated with the spine or back pain. The procedures may involve ablation of nerves outside of bones but related to the spine (e.g., sacroiliac joints, facet joints, etc.). Target treatment locations within bones other than vertebral bodies may also be accessed. For example, target treatment locations within a humerus, radius, femur, tibia, calcaneus, tarsal bones, hips, knees, phalanges, and/or other orthopedic targets may be accessed. The ablation procedures may include, for example, ablation of nerves within or surrounding other bones other than the vertebral column, cardiac tissue ablation for treatment of atrial fibrillation or other abnormal heart rhythms irregularities, tumor ablation at any location within the body (e.g., within bones, lungs, breasts, thyroids, livers, or other organs or tissues), peripheral nerve ablation, pulmonary artery ablation, renal denervation procedures, uterine fibroid ablation, endometrial ablation, and/or the like. The systems and methods described herein may be used in connection with any radiofrequency procedure during which impedance (e.g., tissue impedance or impedance between two electrodes) is monitored.

Figure 1:
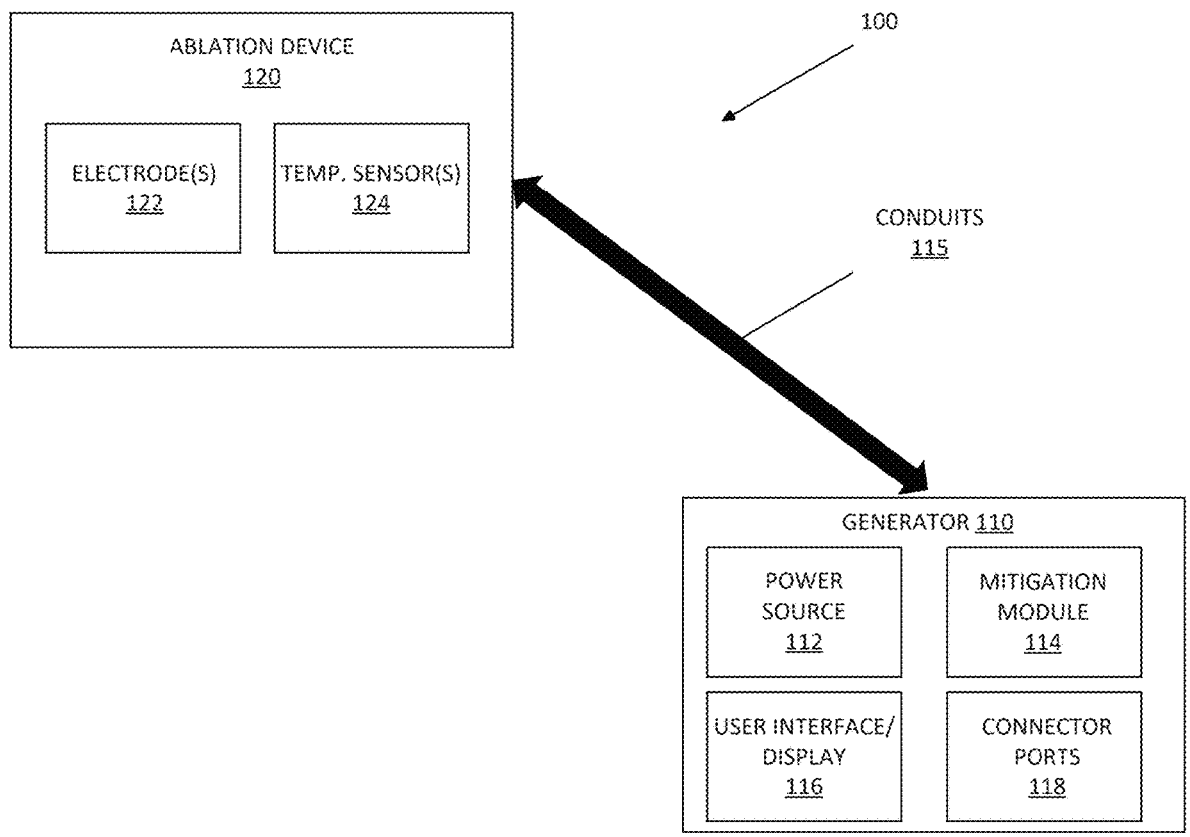
FIG. 1 is a block diagram illustrating an embodiment of a tissue ablation system.

FIG. 1 is a block diagram illustrating an embodiment of a tissue ablation system 100. The tissue ablation system 100 includes a generator 110. The generator 110 may be a radiofrequency generator or other source of ablative radiofrequency energy. The generator 110 is communicatively and/or electrically coupled to an ablation device 120 via one or more conduits 115. The conduits 115 may facilitate bidirectional communication of electrical signals and/or data between the generator 110 and the ablation device 120. For example, the conduits 115 may include one or more electrical wires or lines. The tissue ablation system 100 could alternatively or additionally comprise a tissue modification system adapted to modify tissue in a manner other than ablation (e.g., stimulation, electroporation).

The generator 110 includes a power source 112 adapted to apply radiofrequency energy or power to the ablation device 120 and a mitigation module 114 comprising one or more processors (e.g., implemented in hardware, software, and/or firmware) configured to execute program instructions stored on a non-transitory computer-readable medium (e.g., memory) to monitor temperature, power, and/or impedance in connection with a tissue ablation procedure performed by the tissue ablation system 100. The mitigation module 114 may include hardware circuitry and/or executable software algorithms stored in memory. The one or more hardware processors may be processors of the generator 110 or one or more specific-purpose processors (e.g., microprocessors) dedicated to the mitigation module 114. The generator 110 may also include a user interface and display 116 to facilitate receipt of user input and display of output generated by the mitigation module 114. The generator 110 also includes one, two, three, four or more connector ports 118 to which one or more ablation devices 120 may be connected. In some embodiments, the user interface and display 116 is integrated with the generator 110 (e.g., a touch-screen display and/or integrated user input devices, such as buttons, dials, switches, or knobs). In other embodiments, the user interface and display 116 may be separate from the generator 110 and communicatively and electrically coupled via a wired or wireless connection. User input devices may also include a keyboard, mouse, trackpad, voice-activated input device, or other user input device.

The ablation device 120 may comprise a radiofrequency ablation catheter or probe. The ablation device 120 includes one or more electrodes 122 and one or more temperature sensors 124. The ablation device 120 may include a single monopolar electrode or two electrodes configured to act as a bipolar pair of electrodes. The one or more electrodes 122 may be used to apply or deliver the radiofrequency power or energy generated by the generator 110. The one or more electrodes 122 may additionally be used to monitor tissue impedance (e.g., for safety reasons and/or to reduce the likelihood of tissue desiccation (e.g., charring)). In some embodiments, the same electrode(s) is (are) used to both apply radiofrequency energy and monitor tissue impedance. In other embodiments, the electrode(s) used to apply radiofrequency energy is (are) different than the electrode(s) used to monitor tissue impedance. The one or more temperature sensors 124 may be positioned at one or more locations along the ablation device 120. For example, a temperature sensor may be positioned between two electrodes 122, may be positioned within the one or more electrodes 122, or may be positioned proximal to the one electrode if there is only one electrode or proximal to the proximal-most electrode if multiple electrodes. The ablation device 120 may alternatively or additionally comprise a radiofrequency device adapted to deliver non-ablative radiofrequency energy.

The mitigation module 114 may be configured to receive impedance measurements from the electrodes 122 and temperature measurements from the one or more temperature sensors 124 and may comprise one or more hardware processors configured or programmed to execute one or more algorithms (e.g., stored program instructions) to prevent, mitigate, or reduce the likelihood of, impedance-related stoppages during the radiofrequency ablation procedure, which may advantageously reduce the overall time duration of the radiofrequency ablation procedure. The algorithms may also prevent, mitigate, or reduce the likelihood, of char formation or tissue desiccation, which may be a main cause of treatment-related stoppages. In some embodiments, the mitigation module 114 may be configured to continuously monitor temperature and impedance throughout the radiofrequency ablation procedure, or at least while radiofrequency energy is being applied or delivered.

In some embodiments, during a radiofrequency ablation treatment, the mitigation module 114 of the generator 110 continuously monitors temperature and adjusts power applied by the power source 112 of the generator 110 until the temperature sensor(s) 124 provide signals to the mitigation module 114 indicative of the tissue temperature reaching a preset target temperature (e.g., a temperature between 43 degrees Celsius and 100 degrees Celsius, between 43 degrees Celsius and 70 degrees Celsius, between 60 degrees Celsius and 75 degrees Celsius, between 70 degrees Celsius and 100 degrees Celsius, between 70 degrees Celsius and 85 degrees Celsius, between 65 degrees Celsius and 80 degrees Celsius, between 70 degrees Celsius and 80 degrees Celsius, overlapping ranges thereof, or any value within the recited ranges). If the current temperature is below the target temperature, power is increased at a certain rate to not violate any limits defined in the software specification. If the temperature is above the target temperature, the mitigation module 114 may reduce power, allowing the ablation catheter 120 to cool until the target temperature is met. This temperature-controlled feedback loop is continuously active during a treatment maintaining the target temperature. In some embodiments, continuous comprises real-time or substantially in real-time without pausing. In some embodiments, the feedback may be conducted at periodic intervals.

Applying ablative radiofrequency energy to the target treatment location within the bone may be performed according to the following example treatment parameters: a frequency between 400 kHz and 600 kHz (e.g., between 400 kHz and 500 kHz, between 450 kHz and 500 kHz, between 470 kHz and 490 kHz, between 500 kHz and 600 kHz, overlapping ranges thereof, or any value within the recited ranges); a target temperature of between 43 degrees Celsius and 90 degrees Celsius (e.g., between 43 degrees Celsius and 70 degrees Celsius, between 60 degrees Celsius and 90 degrees Celsius, between 60 degrees Celsius and 80 degrees Celsius, between 65 degrees Celsius and 75 degrees Celsius, between 70 degrees Celsius and 85 degrees Celsius, between 65 degrees Celsius and 80 degrees Celsius, between 70 degrees Celsius and 90 degrees Celsius, overlapping ranges thereof, or any value within the recited ranges); a temperature ramp of between 0.01 and 5 degrees Celsius per second (e.g., between 0.1 and 5 degrees Celsius per second, between 0.1 and 3 degrees Celsius per second, between 0.5 and 3 degrees Celsius per second, between 1 degree and 2.5 degrees Celsius per second, between 1.5 and 4 degrees Celsius per second, between 2 and 5 degrees Celsius per second, between 0.01 and 1 degrees Celsius per second, overlapping ranges thereof, or any value within the recited ranges); and an active energy delivery time of between 1 minute and 20 minutes (e.g., between 1 minute and 5 minutes, between 2 minutes and 8 minutes, between 5 minutes and 15 minutes, between 8 minutes and 12 minutes, between 10 minutes and 20 minutes, overlapping ranges thereof, or any value within the recited ranges). In some embodiments, a target ablation zone is controlled and focused and has a maximum cross-sectional dimension (e.g., major diameter along a long axis) of between 2 mm and 35 mm (e.g., between 2 mm and 30 mm, between 2 mm and 15 mm, between 2 mm and 25 mm, between 10 mm and 30 mm, between 15 mm and 30 mm, between 15 mm and 35 mm, between 5 mm and 20 mm, between 5 mm and 25 mm, overlapping ranges thereof, or any value within the recited ranges) and, if ellipsoidal, a minor diameter along a short axis of between 1 mm and 25 mm (e.g., between 1 mm and 10 mm, between 1 mm and 15 mm, between 5 mm and 15 mm, between 10 mm and 15 mm, between 1 mm and 5 mm, between 10 mm and 25 mm, overlapping ranges thereof, or any value within the recited ranges). In some embodiments, the target ablation zone generally comprises a sphere or approximately a sphere (e.g., a 1 cm sphere) such that the major diameter and minor diameter are equal or substantially equal.

Figure 2:
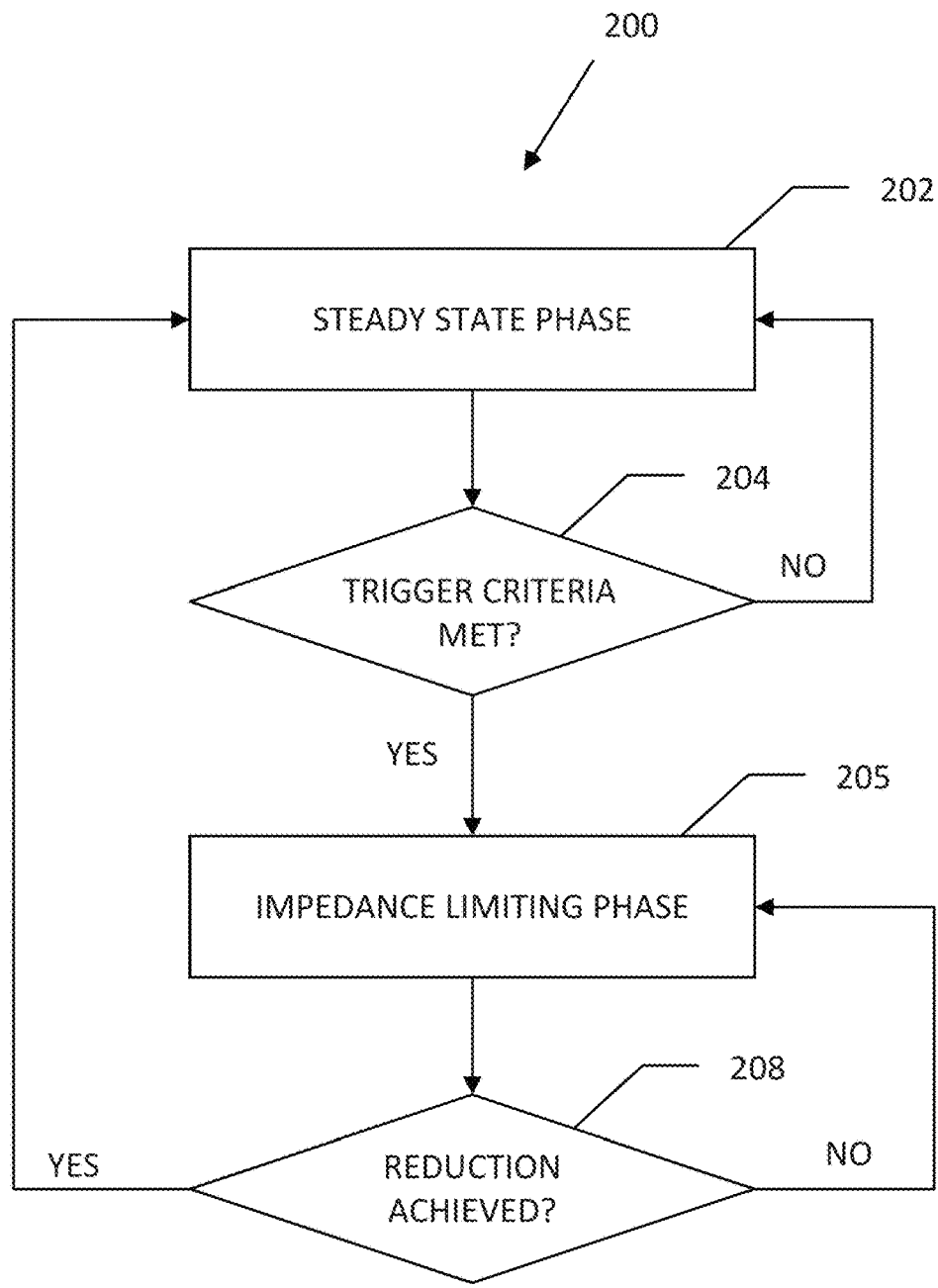
FIG. 2 is a flow diagram illustrating an embodiment of a method of preventing or mitigating impedance-related stoppages during an ablation procedure.

FIG. 2 is a flow diagram illustrating an embodiment of a method 200 of preventing or mitigating impedance-related stoppages during an ablation procedure. In accordance with several embodiments, the impedance-related stoppage mitigation method 200 is configured to detect the start of an impedance event and implement software-based mitigation steps to prevent impedance-based treatment stoppages from occurring. In accordance with several embodiments, the impedance-related stoppage mitigation method 200 advantageously does not require user intervention to operate; however, in some embodiments, an output may be generated for display (e.g., via the user interface and display 116 of the generator 110) to notify a user or operator of its activation.

With reference to Block 202, the method 200 starts in a steady state phase in which the mitigation module 114 executes stored program instructions that involve continuously monitoring impedance magnitude changes and a rate of change of the impedance, based on impedance measurements received from the ablation device 120 (e.g., from the one or more electrodes 122 of a radiofrequency probe). If certain predetermined or preset trigger criteria are met (at Decision Block 204), the method 200 enters an impedance limiting phase at Block 205. The trigger criteria may include trigger levels based on temperature and/or trigger limits based on impedance changes (e.g., magnitude and/or rate of change). In some embodiments, only rate of change is monitored and magnitude is not monitored. In some embodiments, quality of contact between the electrodes and tissue is not assessed.

If one or more trigger criteria are met (e.g., a potential impedance violation is detected), the mitigation module 114 in the impedance limiting phase at Block 205 momentarily reduces the target temperature, which in turn causes the mitigation module 114 to reduce power output provided by the power source 112 of the generator 110. The power reduction allows the probe temperature to decrease to a specific lower threshold value and then dwell at the lower threshold value for a duration of time. In accordance with several embodiments, temperature reduction and dwell duration advantageously allows the tissue to "revascularize" (e.g., be refreshed with blood flow) and potentially rehydrate desiccated tissue closest to the electrode(s) 122 of the ablation device 120. Return of blood flow may also remove, to a certain extent, coagulum and char that may have formed.

With reference to decision block 208, once reduction (e.g., maintenance) of temperature and impedance have been achieved at a lower threshold level (e.g., lower temperature than a set target temperature level of the radiofrequency tissue ablation procedure), the method 200 exits the impedance limiting phase and returns to the steady state phase. The mitigation module 114 (e.g., software executed by one or more hardware processors) continues monitoring impedance and, if another impending impedance event is detected, the mitigation module 114 will transition to the impedance limiting phase to mitigate and/or prevent any impedance-based treatment stoppages.

Figure 3:
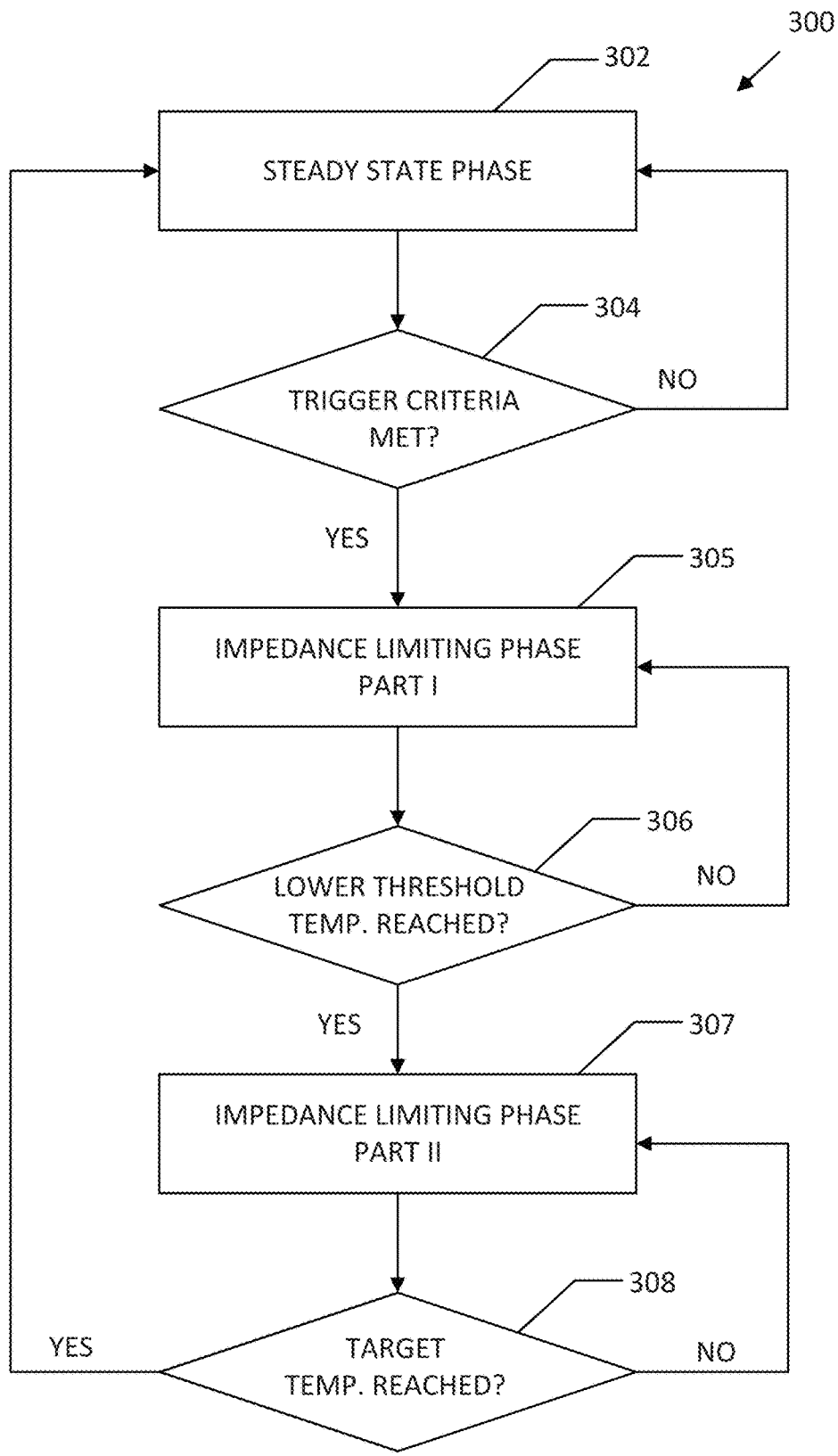
FIG. 3 is a flow diagram illustrating an embodiment of a method of preventing or mitigating impedance-related stoppages during an ablation procedure.

FIG. 3 is a flow diagram illustrating an embodiment of a method 300 of preventing or mitigating impedance-related stoppages during an ablation procedure. The method 300 of FIG. 3 may be similar to method 200 but may include additional details or steps. Similar to method 200, the method 300 begins in the steady state phase at Block 302 and remains in the steady state phase until certain trigger criteria are met (Decision Block 304). In the steady state phase, the mitigation module 114 monitors rate of change of impedance by taking a periodic impedance reading at a certain interval (e.g., every 5 ms-100 ms, 5 ms-50 ms, 5 ms-15 ms, 10 ms-30 ms, 15 ms-40 ms, 20 ms-50 ms, 15 ms-30 ms, 30 ms-50 ms, 50 ms-100 ms, overlapping ranges thereof, or any value within the recited ranges). The mitigation module 114 calculates the rate of change of impedance by taking a current impedance value and comparing with (e.g., subtracting from) previous impedance reading values. In some embodiments, the monitoring of rate of change is continuously performed substantially in real time.

In some embodiments, the trigger criteria (e.g., impedance rate of change monitoring) are not evaluated or monitored during an initial ramp phase of the generator 110 (e.g., initial increase of temperature to a target temperature). In other embodiments, the trigger criteria are evaluated during the initial ramp phase. The mitigation module 114 calculates a rolling average of a certain number of data points of impedance rate of change values. For example, an oldest data point is replaced with a new data point at a time each new data point is received). The certain number of data points for which a rolling average is calculated may be between 5 and 200 (e.g., between 5 and 100, between 5 and 20, between 5 and 10, between 10 and 40, between 15 and 45, between 20 and 50, between 25 and 75, between 40 and 80, between 50 and 100, between 20 and 80, between 25 and 75, between 5 and 50, between 50 and 150, between 100 and 200, overlapping ranges thereof, or any value within the recited ranges).

The method 300 may include an anti-bump (or anti-spike) prevention condition that requires that the trigger criteria (e.g., impedance rate of change threshold level) is/are violated or triggered for a certain number of data points (e.g., more than 1-50 data points, 5-50 data points, 5-20 data points, 10-30 data points, 20-40 data points, 30-50 data points, 25-35 data points, overlapping ranges thereof, or any value within the recited ranges) and/or a certain duration of time (e.g., 5 ms-5000 ms, 5 ms-100 ms, 5 ms-50 ms, 10 ms-40 ms, 20 ms-60 ms, 30 ms-80 ms, 50 ms-100 ms, 60 ms-90 ms, 100 ms-500 ms, 250 ms-750 ms, 500 ms-1000 ms, 1000 ms-2500 ms, 1500 ms-3000 ms, 2000 ms-4000 ms, 2500 ms-5000 ms, 3000 ms-5000 ms, 4000 ms-5000 ms, overlapping ranges thereof, or any value within the recited ranges) consecutively before the mitigation module 114 will allow the trigger criteria to be met and enable the transition to a first part of an impedance limiting phase at Block 305. In some embodiments, if the rolling average is above 0-100 (e.g., 0-5, 1-8, 2-6, 3-9, 0-50, 10-40, 20-60, 30-90, 40-80, 50-100, overlapping ranges thereof, or any value within the recited ranges), and passes the anti-bump, or anti-spike, test, the method 300 is allowed to enter the first part of the impedance limiting phase. The units of the rolling average of rate of impedance change over time may be ohms per seconds squared.

At Block 305 in the first part of the impedance limiting phase, the mitigation module 114 reduces power to the one or more electrodes 122 of the ablation device 120 to a reduced level (e.g., a minimum level that allows impedance monitoring to continue) at which no significant energy (e.g., energy insufficient to increase thermal heating) is delivered to the patient. During this temperature "freefall", the temperature naturally falls and is monitored by the mitigation module 114 while an overall radiofrequency ablation procedure timer displayed on the user interface/display 116 is paused. In some embodiments, the timer blinks or otherwise indicates that the impedance mitigation method is active.

With reference to decision Block 306, the mitigation module 114 determines whether the current monitored temperature (as indicated by signals received from the temperature sensor(s) 124) reaches a lower threshold temperature (e.g., temperature between 43 degrees Celsius and 100 degrees Celsius, between 43 degrees and 70 degrees Celsius, between 43 degrees Celsius and 67 degrees Celsius, between 50 degrees Celsius and 60 degrees Celsius, between 60 degrees Celsius and 65 degrees Celsius, between 60 degrees Celsius and 90 degrees Celsius, between 70 degrees Celsius and 100 degrees Celsius, overlapping ranges thereof, or any value within the recited ranges). If the current temperature does not reach the lower threshold temperature, the mitigation module 114 continues to operate the ablation device 120 in the first part of the impedance limiting phase at the reduced power level and continues monitoring the current temperature. Once the current temperature reaches the lower threshold temperature, the mitigation module 114 proceeds to a second part of the impedance limiting phase (Block 307) and causes the power source 112 to apply power from the generator 110 to the ablation device 120 to maintain the temperature at or near the lower threshold temperature.

At Block 307, the mitigation module 114 may hold at the lower threshold temperature for a dwell period (e.g., between greater than 0 and less than or equal to 200 seconds, between 1 and 20 seconds, between 5 and 30 seconds, between 10 and 45 seconds, between 15 and 60 seconds, between 45 and 90 seconds, between 60 and 120 seconds, between 100 and 200 seconds, overlapping ranges thereof, or any value within the recited ranges). Once the dwell period has expired, the mitigation module 114 may ramp back to the set target temperature using a ramp rate of 0.01-5 degrees Celsius per second (e.g., 0.01-0.10 degrees Celsius per second, 0.05-1.5 degrees Celsius per second, 0.10 to 2.0 degrees Celsius per second, 0.1 to 1.0 degrees Celsius per second, 1.0 to 5.0 degrees Celsius per second, overlapping ranges thereof, or any value within the recited ranges). Although both the hold and ramp up steps are included in the second part of the impedance limiting phase, they may be considered two separate subparts (e.g., second and third parts, respectively).

Once the measured temperature reaches the set target temperature (decision Block 308), the mitigation module 114 exits the impedance phase and proceeds back to the steady state phase (Block 302) to complete the treatment. In some embodiments, the method 300 is not allowed to re-enter the first part of the impedance limiting phase at Block 305 until after a particular duration of time has elapsed after returning to the steady state phase (e.g., between greater than 0 and less than or equal to 200 seconds, between 1 and 20 seconds, between 5 and 30 seconds, between 10 and 45 seconds, between 15 and 60 seconds, between 45 and 90 seconds, between 60 and 120 seconds, between 100 and 200 seconds, overlapping ranges thereof, or any value within the recited ranges).

Figure 4:
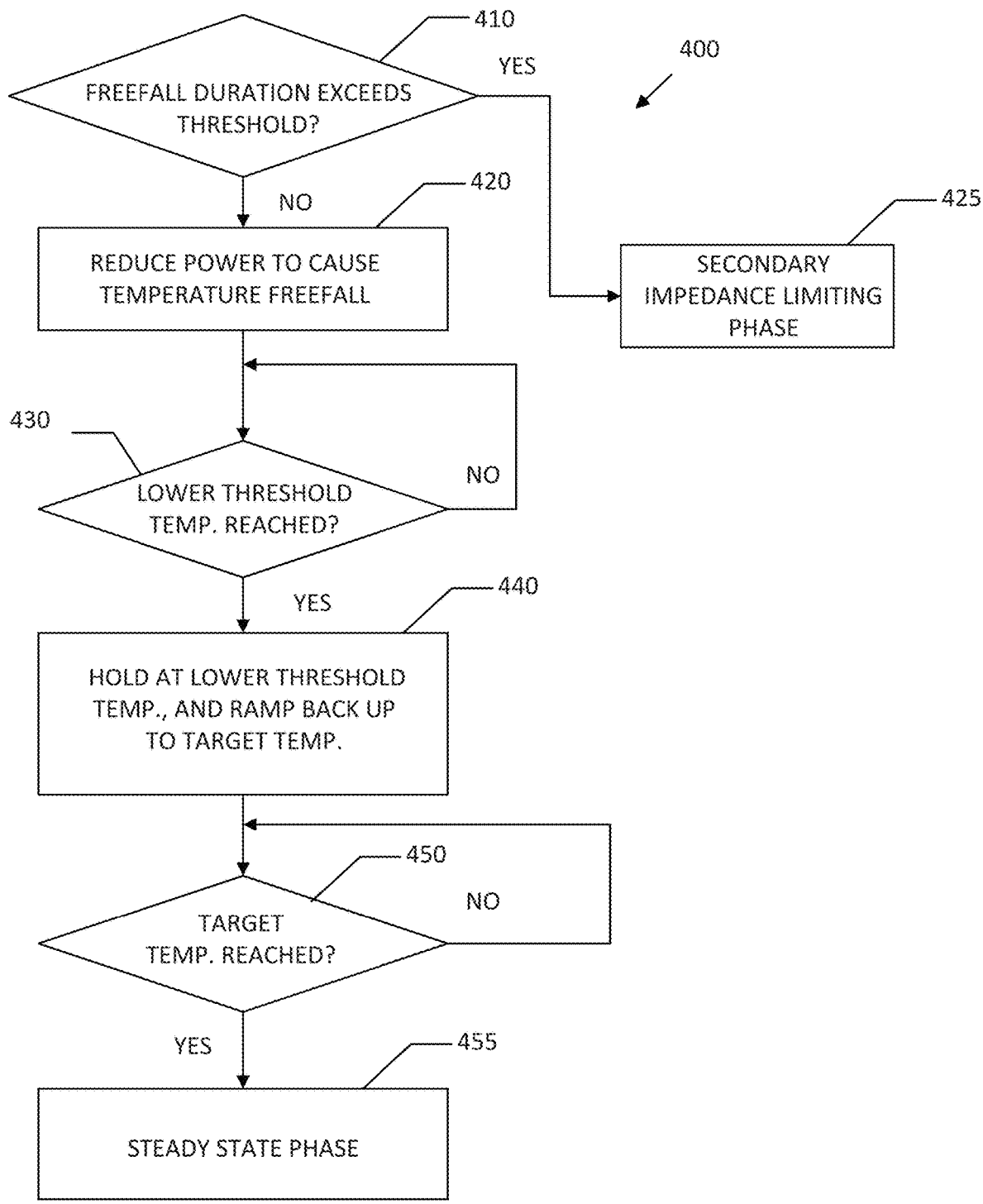
FIG. 4 is a flow diagram illustrating an embodiment of the impedance limiting phase of the method of FIG. 3.

FIG. 4 is a flow diagram illustrating an embodiment of the impedance limiting phase of the method 300 of FIG. 3 (e.g., steps involved at Blocks 305, 306, 307 and 308). With reference to decision Block 410, the mitigation module 114 may keep track of the overall time spent in a temperature freefall portion of the impedance limiting phase (e.g., Part 1 of the impedance limiting phase described in connection with FIG. 3) during a particular radiofrequency tissue ablation procedure. If the total freefall duration for the procedure exceeds a threshold duration (e.g., greater than 0 minutes to less than or equal to 15 minutes, 1-15 minutes, 1-5 minutes, 2-8 minutes, 3-10 minutes, 5-15 minutes, overlapping ranges thereof, or any value within the recited ranges), the mitigation module 114 executes a secondary impedance limiting phase (Block 425) for any future impedance events or triggers. If the total overall time spent in a temperature freefall portion does not exceed the threshold duration, then the method 400 proceeds to Block 420. In some embodiments, the method 400 continues with the current impedance limiting phase with no changes if the overall time spent in the temperature freefall portion exceeds the threshold duration while the impedance limiting phase is in process. At Block 420, the mitigation module 114 reduces power (e.g., to a minimum level that allows impedance monitoring to continue, but no significant energy (e.g., energy insufficient to cause thermal heating) to be delivered to the patient), thereby causing a temperature "freefall." During this temperature "freefall", the temperature naturally falls and is monitored by the mitigation module 114 (e.g., via the temperature sensor(s) 124 of the ablation device 120).

With reference to decision Block 430, the mitigation module 114 determines whether the temperature reaches the lower threshold temperature, as discussed previously in connection with method 300 of FIG. 3. If the temperature does not reach the lower threshold temperature, the mitigation module continues operating the ablation device 120 at the reduced power level and continues monitoring the temperature. Once the current temperature reaches the lower threshold temperature, the mitigation module 114 (at Block 440) instructs the power source 112 to provide sufficient power to the ablation device 120 to maintain the temperature at the lower threshold temperature. The stored program instructions executed by the mitigation module 114 cause the ablation system 100 to hold at the lower threshold temperature for the dwell period (as described previously). Once the dwell period has expired, the mitigation module 114 increases power to the one or more electrodes, using the ramp rate (as also described previously), to increase the temperature to the set target temperature. With reference to decision Block 450, the mitigation module 114 monitors the temperature to determine whether the temperature reaches the target temperature. Once the target temperature is reached again, the mitigation module 114 exits the impedance limiting phase and proceeds back to the steady state phase at Block 455 to complete the treatment. As discussed previously, the impedance limiting phase may not be allowed to be re-entered for a predetermined duration after being exited.

Figure 5:
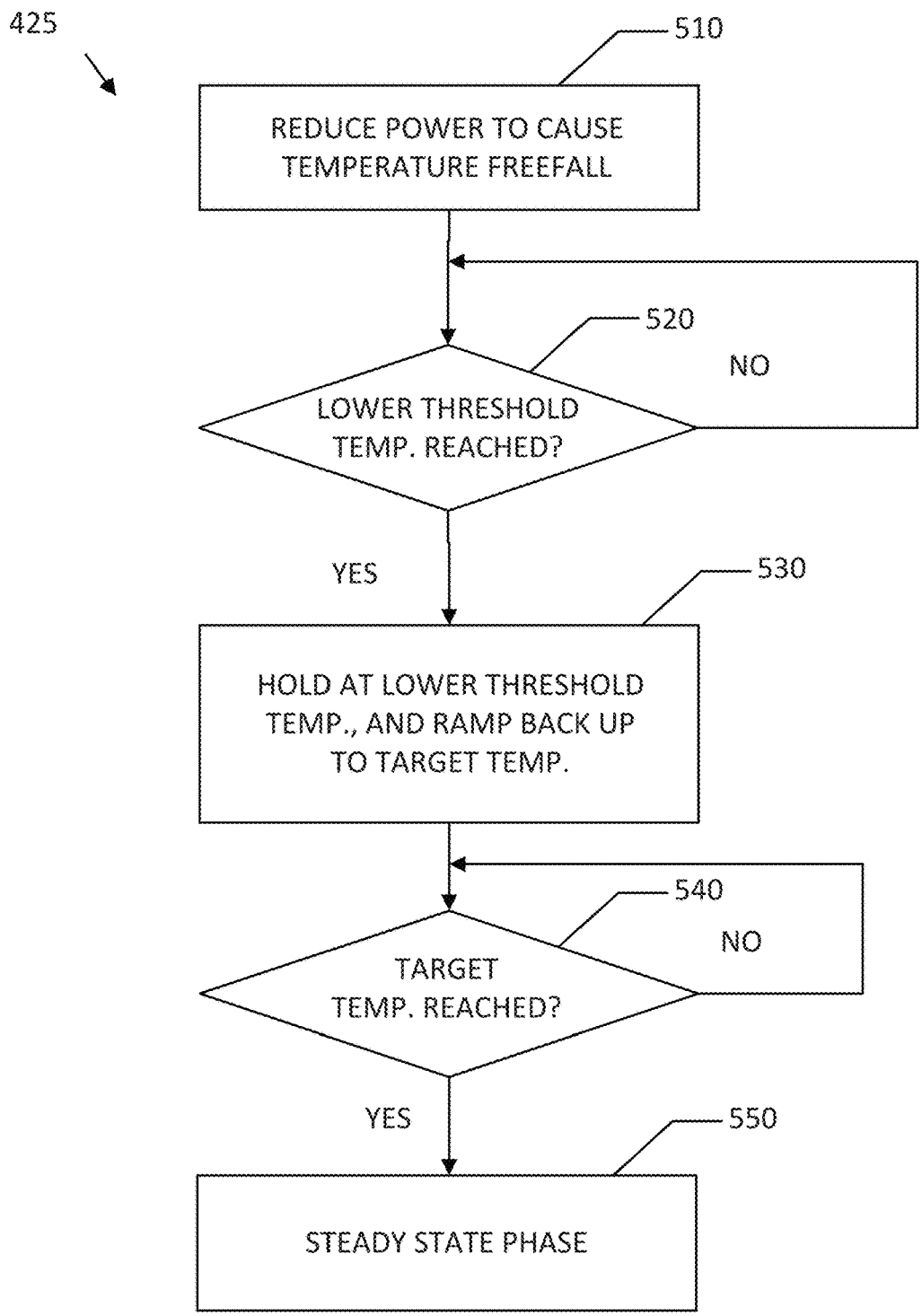
FIG. 5 is a flow diagram illustrating an embodiment of the secondary impedance limiting phase shown in FIG. 4.

FIG. 5 is a flow diagram illustrating an embodiment of the secondary impedance limiting phase 425 shown in FIG. 4. For example, if the freefall duration time expires, the mitigation module 114 may execute a secondary set of program instructions (e.g., involving a second, different set of parameters) for the secondary impedance limiting phase 425. In some embodiments, the secondary impedance limiting phase 425 includes the same procedural steps as the primary impedance limiting phase but using different parameter values for at least some of the parameters. At Block 510, the mitigation module 114 may cause a reduction of power output (e.g., to a minimum level allowing impedance readings, but no significant energy to be delivered to the patient sufficient to cause thermal heating), thereby causing the temperature freefall as described previously. During this temperature freefall, the temperature naturally falls and is monitored by the mitigation module 114 (e.g., via the temperature sensor(s) 124 of the ablation device 120). In some embodiments, the timer displayed on the user interface/display 116 does not stop or blink during the secondary impedance limiting phase 425.

With reference to decision Block 520, the mitigation module 114 determines whether the temperature reaches a lower threshold temperature (e.g., temperature between 43 degrees Celsius and 70 degrees Celsius, between 43 degrees Celsius and 67 degrees Celsius, between 50 degrees Celsius and 60 degrees Celsius, between 60 degrees Celsius and 65 degrees Celsius, between 43 degrees Celsius and 100 degrees Celsius, overlapping ranges thereof, or any value within the recited ranges). If the temperature does not reach the lower threshold temperature, the mitigation module 114 continues operating the ablation device at the reduced power level and continues monitoring the temperature. Once the temperature reaches the lower threshold temperature, the mitigation module 114 (at block 530) causes the power source 112 to provide sufficient power to the ablation device 120 to maintain the temperature at or near the lower threshold temperature. The temperature is caused to be held at the lower threshold temperature for a dwell period (e.g., between greater than 0 and less than or equal to 200 seconds, between 1 and 20 seconds, between 5 and 30 seconds, between 10 and 45 seconds, between 15 and 60 seconds, between 45 and 90 seconds, between 60 and 120 seconds, between 100 and 200 seconds, overlapping ranges thereof, or any value within the recited ranges). Once the dwell period has expired, the mitigation module 114 may ramp temperature back to the normal target temperature using a predetermined ramp rate, as described previously.

With reference to decision Block 540, the mitigation module 114 monitors the temperature to determine whether the temperature reaches the target temperature. Once the target temperature is reached, the mitigation module 114 exits the secondary impedance limiting phase and proceeds back to the steady state phase at Block 550 to complete the treatment.

Thermally Conductive Gels or Non-Software-Based Approaches

The prevention, mitigation, or reduction of likelihood of impedance-related stoppages during a radiofrequency ablation procedure may also be supplemented or replaced by non-software-based approaches. For example, thermally conductive gels or high-viscosity materials may be used to facilitate thermal conduction, and thus reduce impedance spikes or bumps that may cause impedance-based stoppages.

During a thermal ablation procedure, heat generated by application of radiofrequency energy to tissue surrounds the electrode(s) 122 of the ablation device 120 because tissue thermal conductivity may generally be poor in certain target locations. Poor tissue thermal conductivity can lead to very steep temperature gradients radiating from the electrode(s) 122 and can quickly desiccate the tissue closest to the electrode(s) 122, thereby causing high impedance and subsequent impedance-based treatment stoppages. Furthermore, the thermal dose necessary to achieve optimal tissue ablation typically does not radiate more than a certain depth (e.g., about two centimeters or other depths depending on the tissue) into the tissue.

One method to overcome poor tissue conductivity is to modulate the tissue characteristics by modifying the tissue's thermal conductivity. By administering (e.g., percutaneously administering) a thermally conductive gel on or near the electrode(s) 122 of the ablation device (e.g., radiofrequency probe) 120, heat can more easily pass through the conductive gel, thereby heating tissue further away from the electrode(s) 122 and increasing depth of penetration. Furthermore, the gel may reduce the buildup of heat and high temperatures on the electrode surfaces and tissue closest to the electrode(s) 122, thereby reducing tissue desiccation and potentially preventing impedance-based treatment stoppage.

Figure 6:
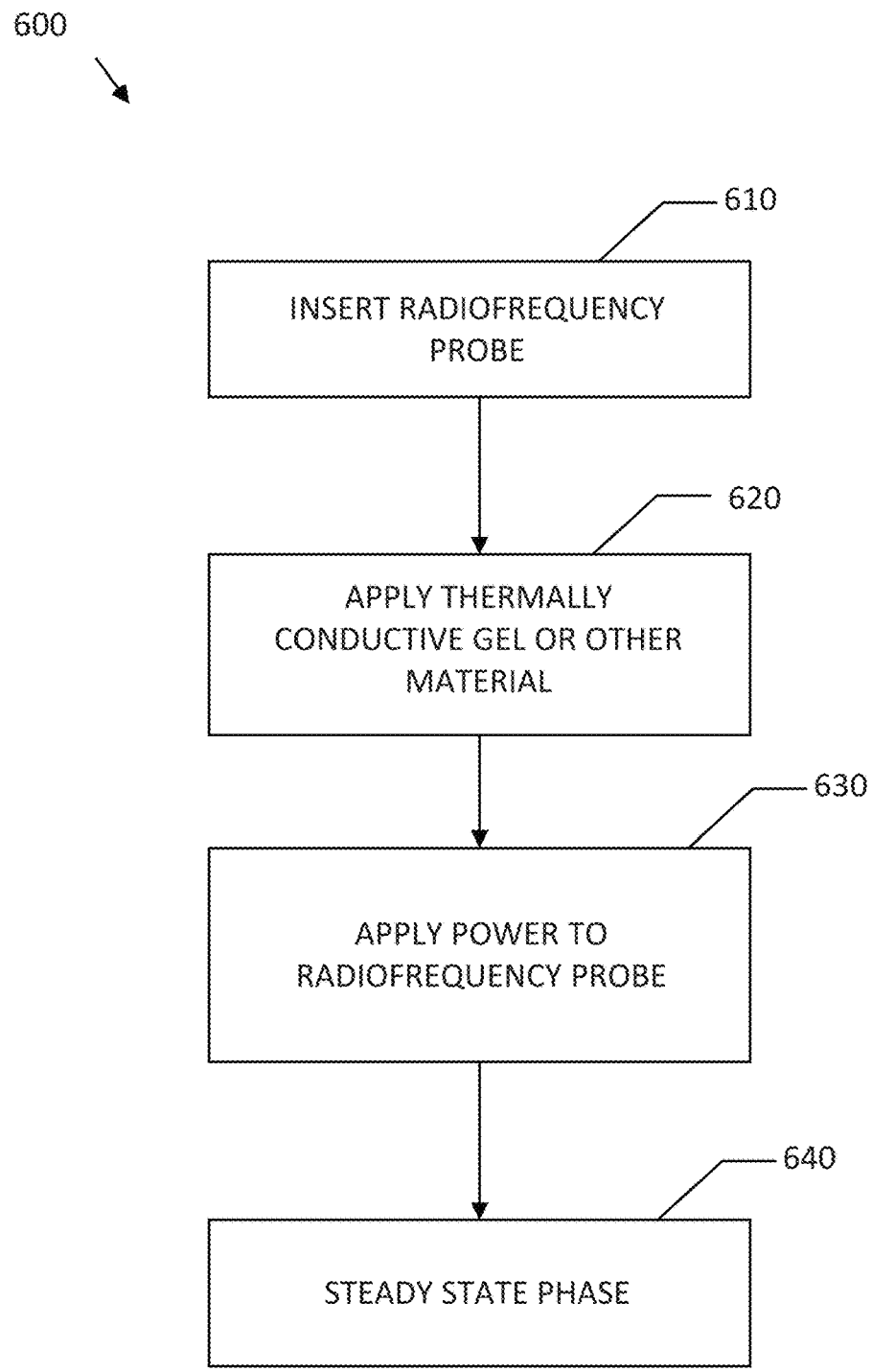
FIG. 6 is a flow diagram illustrating an embodiment of a method of preventing or mitigating impedance-related stoppages during an ablation procedure.

FIG. 6 is a flow diagram illustrating an embodiment of a method 600 of preventing or mitigating impedance-related stoppages during an ablation procedure. At Block 610, an ablation device comprising a radiofrequency probe is inserted into a vertebral body. In some embodiments, the radiofrequency probe is generally similar to the radiofrequency ablation catheter or probe 120 described above in connection with FIG. 1. For example, the radiofrequency probe includes one or more electrodes that are electrically connected to a generator and are configured to receive radiofrequency energy from a power source within the generator. The electrodes are configured to deliver the radiofrequency energy from the power source to a target ablation location within the vertebral body. In some embodiments, the radiofrequency probe is inserted into the vertebral body through an access instrument that is inserted into the vertebral body. In some embodiments, the radiofrequency probe is configured to also function as an access instrument.

At Block 620, a thermally conductive gel or other material (e.g., high-viscosity material) is administered to the one or more electrodes on the radiofrequency probe or to the target ablation location within the vertebral body. In some embodiments, the gel or other material is administered through a lumen of the same access instrument through which the ablation device 120 is inserted. In some embodiments, a separate access instrument is used to administer the thermally conductive gel or high-viscosity material. In these embodiments, the separate access instrument may be inserted through the same incision as the incision in which the radiofrequency probe was inserted or may be inserted into a different incision.

In some embodiments, the thermally conductive gel or high-viscosity material can be administered such that the gel or other material at least partially surrounds one or more of the electrodes on the radiofrequency probe. More specifically, the thermally conductive gel or other material can be administered on either side of the electrode(s) on the radiofrequency probe such that the gel or other material is within a sufficiently close vicinity to the electrodes to transfer heat to the target ablation location. Administering the thermally conductive gel or other material in this way allows for the thermally conductive gel to direct or focus heat generated by the electrodes in a particular direction so as to preferentially heat an area of interest within the tissue. In some embodiments, the thermally conductive gel or other material can be administered such that it completely surrounds the one or more electrodes on the radiofrequency probe. In embodiments where multiple vertebral bodies are accessed simultaneously using multiple radiofrequency probes, the thermally conductive gel or other material may be administered such electrodes on each of the multiple radiofrequency probes are at least partially surrounded by the thermally conductive gel or other material.

In the illustrated embodiment, the thermally conductive gel or other material is administered after the radiofrequency probe is inserted into the vertebral body. In some embodiments, however, the thermally conductive gel or other material is administered before the probe is inserted. For example, in some embodiments, the electrodes on the radiofrequency probe are coated with the thermally conductive gel prior to radiofrequency probe being inserted into the body of a subject. In some embodiments, the thermally conductive gel or other material is administered adjacent to the one or more electrode(s) along a distal end portion of the radiofrequency probe prior to insertion of the probe within a body of the subject. In some embodiments, the thermally conductive gel or other material may be administered simultaneously with the radiofrequency probe being inserted into the body of the subject. In some embodiments, Blocks 610 and 620 can be reversed such that thermally conductive gel or other material is inserted into the vertebral body prior to insertion of the radiofrequency probe.

At optional Block 630, the radiofrequency generator begins to apply power to the one or more electrodes on the radiofrequency probe. As explained above in connection with FIG. 3, the radiofrequency generator can be initially run in an initial ramp phase in which the power output by the radiofrequency generator increases over time until a measured temperature reaches a target temperature. At this point, at Block 640, the system can operate in a steady-state phase. In some embodiments, the steady state phase can be generally similar to the steady state phase described above in connection with FIGS. 2-5. The method 600 may also be performed in a location other than a vertebral body (e.g., another bone or non-bone location).

The method 600 to reduce or prevent impedance-based treatment stoppages may involve use of a high-viscosity material such as a SURGICEL® hemostat or similar absorbable hemostat to stop or slow blood flow around or near the electrode(s) 122 of the ablation device 120 (e.g., radiofrequency probe). The high-viscosity material may be in a powder form or a fluid form. The high-viscosity material can have a viscosity in a range sufficient to reduce blood flow (e.g., between 2500 cP and 7500 cP, between 2500 cP and 10,000 cP, between 5000 cP and 15,000 cP, between 5000 cP and 10,000 cP, overlapping ranges thereof, or any value within the recited ranges).

In accordance with several embodiments, the generator 110 is a temperature-controlled radiofrequency ablation system. The generator 110 controls the temperature at an active tip of the ablation device 120 by constantly modulating power output to maintain the target temperature. Blood flow acts as a heat sink and reduces the volume of tissue heated to the target temperature either through large blood vessels or capillary-mediated perfusion. If the ablation device 120 is placed near or on a blood vessel, the excess blood flow will wick away heat quickly causing the generator 110 to increase power output in order to reach and maintain the target temperature. The increase in power output to maintain target temperature in the presence of blood flow can cause the formation of coagulum or char (desiccated tissue) on the electrode(s) 122 of the ablation device 120, leading to a high impedance-based treatment stoppage. Adding a high viscosity material to the target treatment location can slow or stop blood flow which may prevent, or reduce the likelihood of, a premature treatment stoppage. In some embodiments, the high-viscosity material may be administered percutaneously before the insertion of the ablation device 120. In some embodiments, the high-viscosity material may be administered percutaneously after the insertion of the ablation device. In embodiments where an access instrument is used to insert the ablation device 120, the access instrument may also be used to administer the high-viscosity material. For example, in some embodiments, the high-viscosity material may be administered through a lumen of an access instrument through which the ablation device 120 is inserted or through. In some embodiments, however, a separate access instrument is used to administer the high-viscosity material than is used to insert the ablation device 120. In these embodiments, the separate access instrument may be inserted through either the same incision as the first access instrument or may be inserted a different incision as the first access instrument. In some embodiments, the high-viscosity material may be coated along the one or more electrode(s) 122 and/or adjacent the one or more electrode(s) 122 along the distal end portion of the ablation device 120 prior to insertion of the ablation device 120 within a body of the subject. A portion of the one or more electrodes (122) or one side of the ablation device 120 may be coated or surrounded so as to preferentially direct thermal conduction and heating in a particular direction.

Additional System Embodiments and Non-Limiting Examples

The tissue ablation system 100 may also include one or more access tools to facilitate access to a treatment location (e.g., an intraosseous location, such as a location within a vertebral body). Access tools may include an introducer assembly including an outer cannula and a sharpened stylet, an inner cannula configured to be introduced through the outer cannula, and/or one or more additional stylets, curettes, or drills to facilitate access to an intraosseous location within a vertebral body or other bone. The access tools (e.g., outer cannula, inner cannula, stylets, curettes, drills) may have pre-curved distal end portions or may be actively steerable or curveable. Any of the access tools may have beveled or otherwise sharp tips or they may have blunt or rounded, atraumatic distal tips. Curved drills may be used to facilitate formation of curved access paths within bone. Any of the access tools may be advanced over a guidewire in some embodiments.

In some embodiments, an outer cannula assembly (e.g., introducer assembly) includes a straight outer cannula and a straight stylet configured to be received within the outer cannula. The outer cannula assembly may be inserted first to penetrate an outer cortical shell of a bone and provide a conduit for further access tools to the inner cancellous bone. An inner cannula assembly may include a cannula having a pre-curved or steerable distal end portion and a stylet having a corresponding pre-curved or steerable distal end portion. Multiple stylets having distal end portions with different curvatures may be provided in a kit and selected from by a clinician. The inner cannula assembly may alternatively be configured to remain straight and non-curved.

In some embodiments, the tissue ablation system 100 comprises various features that are present as single features (as opposed to multiple features). For example, in one embodiment, the ablation device includes a single electrode. A single temperature sensor 124 (thermocouple or other means for measuring temperature) may also be included. Multiple features or components are provided in alternate embodiments. For example, multiple ablation devices 120 may be coupled to the generator 110 and the ablation device(s) 120 may include multiple electrodes 122 and/or multiple temperature sensors 124.

The generator 110 can include multiple engines or modules for performing the processes and functions described herein, such as the mitigation module 114 described above. The engines or modules can include programmed instructions for performing processes as discussed herein. The programming instructions can be stored in a memory. The programming instructions can be implemented in C, C++, JAVA, or any other suitable programming languages. In some embodiments, some or all of the portions of the mitigation module 114 can be implemented in application specific circuitry such as ASICs and FPGAs.

Any methods described herein may be embodied in, and partially or fully automated via, software code modules (e.g., in the form of an algorithm or machine readable instructions) stored in a memory or tangible, non-transitory computer-readable medium executed by one or more processors or other computing devices. The one or more processors or other computing devices may be located within the generator 110 or stored on a remote server and accessed by a communications interface of the generator 110. The software may be downloaded to a processor in electronic form. In embodiments involving multiple processors, the processors may operate in parallel to form a parallel processing system in which a process is split into parts that execute simultaneously on different processors of the ablation system. The methods may be executed on the computing devices (e.g., the generator 110) in response to execution of software instructions or other executable machine-readable code read from a tangible computer readable medium. A tangible computer readable medium is a data storage device that can store data that is readable by a computer system. Examples of computer readable mediums include read-only memory (e.g., ROM or PROM, EEPROM), random-access memory, other volatile or non-volatile memory devices, CD-ROMs, magnetic tape, flash drives, and optical data storage devices. The modules described herein (for example, the mitigation module 114) may comprise structural hardware elements and/or non-structural software elements stored in memory (for example, algorithms or machine-readable instructions executable by processing or computing devices).

In addition, embodiments may be implemented as computer-executable instructions stored in one or more tangible computer storage media. As will be appreciated by a person of ordinary skill in the art, such computer-executable instructions stored in tangible computer storage media define specific functions to be performed by computer hardware such as computer processors. In general, in such an implementation, the computer-executable instructions are loaded into memory accessible by at least one computer processor (for example, a programmable microprocessor or microcontroller or an application specific integrated circuit). The at least one computer processor then executes the instructions, causing computer hardware to perform the specific functions defined by the computer-executable instructions. As will be appreciated by a person of ordinary skill in the art, computer execution of computer-executable instructions is equivalent to the performance of the same functions by electronic hardware that includes hardware circuits that are hardwired to perform the specific functions. As such, while embodiments illustrated herein are typically implemented as some combination of computer hardware and computer-executable instructions, the embodiments illustrated herein could also be implemented as one or more electronic circuits hardwired to perform the specific functions illustrated herein.

Although certain embodiments and examples have been described herein, aspects of the methods and devices shown and described in the present disclosure may be differently combined and/or modified to form still further embodiments. Optional features of various device and system embodiments may be included in some embodiments and not in others. Additionally, the methods described herein may be practiced using any device suitable for performing the recited steps. Further, the disclosure (including the figures) herein of any particular feature, aspect, method, property, characteristic, quality, attribute, element, or the like in connection with various embodiments can be used in all other embodiments set forth herein. Any section headings used herein are merely provided to enhance readability and are not intended to limit the scope of the embodiments disclosed in a particular section to the features or elements disclosed in that section.

While the embodiments are susceptible to various modifications, and alternative forms, specific examples thereof have been shown in the drawings and are herein described in detail. It should be understood, however, that the embodiments are not to be limited to the particular forms or methods disclosed, but to the contrary, the embodiments are to cover all modifications, equivalents, and alternatives falling within the spirit and scope of the various embodiments described and the appended claims. Any methods disclosed herein need not be performed in the order recited and in other alternative embodiments one or more method steps may be skipped altogether. The methods disclosed herein include certain actions taken by a practitioner; however, they can also include any third-party instruction of those actions, either expressly or by implication.

Various embodiments of the disclosure have been presented in a range format. It should be understood that the description in range format is merely for convenience and brevity and should not be construed as an inflexible limitation on the scope of the invention. The ranges disclosed herein encompass any and all overlap, sub-ranges, and combinations thereof, as well as individual numerical values within that range. For example, description of a range such as from 70 to 115 degrees should be considered to have specifically disclosed subranges such as from 70 to 80 degrees, from 70 to 100 degrees, from 70 to 110 degrees, from 80 to 100 degrees etc., as well as individual numbers within that range, for example, 70, 80, 90, 95, 100, 70.5, 90.5 and any whole and partial increments therebetween. Language such as "up to," "at least," "greater than," "less than," "between," and the like includes the number recited. Numbers preceded by a term such as "about" or "approximately" include the recited numbers. For example, "approximately 30-50%" includes 30% and 50%. The terms "generally" and "substantially" as used herein represent an amount close to the stated amount that still performs a desired function or achieves a desired result. As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "70" is disclosed, then "about 70" is also disclosed. Any numerical range recited herein is intended to include all sub-ranges subsumed therein.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

What is claimed is:

1. A radiofrequency tissue ablation system configured to reduce occurrences of impedance-related stoppages of radiofrequency energy delivery during a radiofrequency tissue ablation procedure, the system comprising:
   a radiofrequency probe comprising one or more electrodes and one or more temperature sensors;
   a radiofrequency generator comprising a power source electrically coupled to the one or more electrodes and one or more processors operatively coupled to the power source and to the one or more temperature sensors,
   wherein the one or more processors are configured to execute program instructions stored in memory of the radiofrequency generator that, when executed:
      cause the power source to deliver radiofrequency energy to the one or more electrodes, the radiofrequency energy being sufficient to provide controlled heating of tissue surrounding the one or more electrodes; and
      cause the radiofrequency generator to transition between a steady-state phase of operation and an impedance-limiting phase of operation so as to reduce temperature and tissue impedance prior to initiation of an automated impedance-related stoppage of radiofrequency energy delivery during a radiofrequency tissue ablation procedure,
   when operating in the steady-state phase, the one or more processors are configured to:
      receive temperature measurements from the one or more temperature sensors;
      calculate a magnitude and a rate of change of tissue impedance based on signals received from the one or more electrodes; and
      automatically transition to the impedance-limiting phase of operation when one or more trigger criteria are met; and
   when in the impedance-limiting phase of operation, the one or more processors are configured to:
      cause the power source to temporarily reduce power output to reduce temperature to a lower threshold temperature and to ramp power output back up after achieving the lower threshold temperature.

2. The system of claim 1, wherein the radiofrequency probe comprises two electrodes positioned along a distal end portion of the radiofrequency probe configured to operate as a bipolar pair of electrodes.

3. The system of claim 2, wherein the radiofrequency energy has a frequency between 400 kHz and 600 kHz and is applied for a duration sufficient to generate a controlled ablation zone to ablate tissue within the controlled ablation zone.

4. The system of claim 3, wherein the duration is between 5 minutes and 15 minutes.

5. The system of claim 4, wherein the ablated tissue comprises a basivertebral nerve within a vertebral body.

6. The system of claim 1, wherein the signals received from the one or more electrodes are received at a certain interval, and wherein the interval is between 5 ms and 100 ms.

7. The system of claim 1, wherein the calculation of the rate of change of tissue impedance involves calculation of a rolling average of tissue impedance measurements over a particular time duration.

8. The system of claim 7, wherein the particular time duration is between 5 ms and 20,000 ms.

9. The system of claim 1, wherein the one or more trigger criteria include at least one criterion based on temperature and at least one criterion based on the rate of change of tissue impedance.

10. The system of claim 9, wherein the one or more trigger criteria include a predetermined upper threshold rate of change of tissue impedance.

11. The system of claim 10, wherein the one or more trigger criteria have to be met for a certain number of data points or for a certain duration of time before the transition to the impedance-limiting phase of operation.

12. The system of claim 11, wherein the certain number of data points is between 1 and 50.

13. The system of claim 11, wherein the certain duration of time is between 5 ms and 5000 ms.

14. The system of claim 1, wherein the power output is reduced until the lower threshold temperature is reached.

15. The system of claim 14, wherein, when in the impedance-limiting phase of operation, the one or more processors are configured to cause the temperature to remain at the lower threshold temperature for a dwell period and wherein the ramp up in power does not occur until after the dwell period has passed.

16. The system of claim 15, wherein the one or more processors are configured to transition the radiofrequency generator back to the steady-state phase of operation after a pre-set target temperature has been reached following the ramp up in power.

17. A computer-implemented method to reduce occurrences of impedance-related stoppages of radiofrequency energy delivery by a radiofrequency generator during a radiofrequency tissue ablation procedure, the method comprising executing stored program instructions via one or more hardware processors to:

cause the generator to operate in a steady-state phase of operation after an initial ramp up of power output, wherein when operating in the steady-state phase, the one or more hardware processors are configured to:

deliver radiofrequency energy to one or more electrodes of a radiofrequency probe sufficient to generate a controlled heating zone sufficient to ablate tissue surrounding the one or more electrodes;

continuously receive temperature measurements from one or more temperature sensors positioned along the radiofrequency probe; and calculate a magnitude and a rate of change of tissue impedance based on signals received from the one or more electrodes; and cause the generator to automatically transition to an impedance-limiting phase of operation when one or more trigger criteria are met based, at least in part, on the temperature measurements and/or the rate of change of tissue impedance, wherein, when operating in the impedance-limiting phase, the one or more hardware processors are configured to:

cause the generator to temporarily reduce power output to reduce temperature to a lower threshold temperature and then to ramp power output back up after the lower threshold temperature has been maintained for a certain time duration.

18. The method of claim 17, wherein the wherein the calculation of the rate of change of tissue impedance involves calculation of a rolling average of tissue impedance measurements over a particular time duration.

19. The method of claim 17, wherein the one or more trigger criteria comprise a predetermined upper threshold value for temperature and a predetermined upper threshold value for rate of change of tissue impedance.

20. The method of claim 17, further comprising executing stored program instructions via one or more hardware processors to cause the generator to transition back to the steady-state phase of operation after a set target temperature has been reached following ramping of the power output back up after temperature maintenance at the lower threshold temperature.

* * * * *